United States Patent
Kawata et al.

(10) Patent No.: US 9,702,035 B2
(45) Date of Patent: Jul. 11, 2017

(54) HIGH-STRENGTH HOT-DIP GALVANIZED STEEL SHEET EXCELLENT IN IMPACT RESISTANCE PROPERTY AND MANUFACTURING METHOD THEREOF, AND HIGH-STRENGTH ALLOYED HOT-DIP GALVANIZED STEEL SHEET AND MANUFACTURING METHOD THEREOF

(71) Applicant: NIPPON STEEL & SUMITOMO METAL CORPORATION, Tokyo (JP)

(72) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Takuya Kuwayama, Tokyo (JP); Hiroyuki Ban, Tokyo (JP); Kaoru Hiramatsu, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 414 days.

(21) Appl. No.: 14/559,252

(22) Filed: Dec. 3, 2014

(65) Prior Publication Data
US 2015/0083278 A1  Mar. 26, 2015

Related U.S. Application Data

(62) Division of application No. 14/348,526, filed as application No. PCT/JP2012/075098 on Sep. 28, 2012, now Pat. No. 8,932,729.

(30) Foreign Application Priority Data

Sep. 30, 2011  (JP) ................................ 2011-218774

(51) Int. Cl.
*C22C 38/04* (2006.01)
*C23C 2/02* (2006.01)
*B21B 1/26* (2006.01)
*B21B 3/00* (2006.01)
*C23C 2/06* (2006.01)
*C23C 2/28* (2006.01)
*C21D 9/46* (2006.01)
*C22C 18/04* (2006.01)
*C22C 38/00* (2006.01)
*C22C 38/06* (2006.01)
(Continued)

(52) U.S. Cl.
CPC .................. *C23C 2/02* (2013.01); *B21B 1/26* (2013.01); *B21B 3/00* (2013.01); *B32B 15/013* (2013.01); *C21D 1/26* (2013.01); *C21D 1/72* (2013.01); *C21D 8/0257* (2013.01); *C21D 8/0263* (2013.01); *C21D 8/0284* (2013.01); *C21D 9/46* (2013.01); *C22C 18/04* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/58* (2013.01); *C23C 2/06* (2013.01); *C23C 2/12* (2013.01); *C23C 2/28* (2013.01); *C21D 8/0278* (2013.01); *C21D 2211/002* (2013.01); *C21D 2211/008* (2013.01); *C21D 2251/02* (2013.01); *Y10T 428/12618* (2015.01); *Y10T 428/12799* (2015.01); *Y10T 428/12972* (2015.01); *Y10T 428/265* (2015.01)

(58) Field of Classification Search
CPC ........................................................ C22C 38/04
See application file for complete search history.

(56) References Cited

U.S. PATENT DOCUMENTS

| 8,932,729 B2 * | 1/2015 | Kawata | ..................... B21B 1/26 |
| | | | 428/336 |
| 9,162,422 B2 * | 10/2015 | Kawata | ..................... B21B 3/00 |
| 2010/0132849 A1 | 6/2010 | Takagi et al. | |
| 2010/0304183 A1 | 12/2010 | Honda et al. | |

FOREIGN PATENT DOCUMENTS

| JP | 07-150294 A | 6/1995 |
| JP | 09-143570 A | 6/1997 |
(Continued)

OTHER PUBLICATIONS

International Preliminary Report on Patentability (Forms PCT/IB/338, PCT/IB/373 and PCT/ISA/237) issued in PCT/JP2012/075098 mailed Apr. 10, 2014.
(Continued)

*Primary Examiner* — Roy King
*Assistant Examiner* — Jophy S Koshy
(74) *Attorney, Agent, or Firm* — Birch, Stewart, Kolasch & Birch, LLP

(57) ABSTRACT

A base steel sheet has a hot-dip galvanized layer formed on a surface thereof, in which, in a steel sheet structure in a range of ⅛ thickness to ⅜ thickness centered around ¼ thickness of a sheet thickness from a surface, a volume fraction of a retained austenite phase is 5% or less, and a total volume fraction of phases of bainite, bainitic ferrite, fresh martensite, and tempered martensite is 40% or more, an average effective crystal grain diameter is 5.0 μm or less, a maximum effective crystal grain diameter is 20 μm or less, and a decarburized layer with a thickness of 0.01 μm to 10.0 μm is formed on a surface layer portion, in which a density of oxides dispersed in the decarburized layer is $1.0 \times 10^{12}$ to $1.0 \times 10^{16}$ oxides/m$^2$, and an average grain diameter of the oxides is 500 nm or less.

7 Claims, No Drawings

(51) Int. Cl.

| | | |
|---|---|---|
| *C22C 38/58* | (2006.01) | |
| *B32B 15/01* | (2006.01) | |
| *C21D 8/02* | (2006.01) | |
| *C22C 38/02* | (2006.01) | |
| *C21D 1/26* | (2006.01) | |
| *C21D 1/72* | (2006.01) | |
| *C23C 2/12* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/18* | (2006.01) | |

(56) References Cited

FOREIGN PATENT DOCUMENTS

| JP | 10-130776 A | 5/1998 |
|---|---|---|
| JP | 2004-277858 A | 10/2004 |
| JP | 2004-300452 A | 10/2004 |
| JP | 2005-256020 A | 9/2005 |
| JP | 2006-233333 A | 9/2006 |
| JP | 2006-342387 A | 12/2006 |
| JP | 2007-211279 A | 8/2007 |
| JP | 2008-255441 A | 10/2008 |
| JP | 2008-266758 A | 11/2008 |
| JP | 2008-285741 A | 11/2008 |
| JP | 2009-068039 A | 4/2009 |
| JP | 2010-156016 A | 7/2010 |
| JP | 2011-111675 A | 6/2011 |
| JP | 2011-117041 A | 6/2011 |
| JP | 2011-153349 A | 8/2011 |

OTHER PUBLICATIONS

International Search Report for PCT/JP2012/075098 dated Dec. 25, 2012.

Notice of Allowance dated Sep. 5, 2014 in U.S. Appl. No. 14/348,526.

* cited by examiner

HIGH-STRENGTH HOT-DIP GALVANIZED STEEL SHEET EXCELLENT IN IMPACT RESISTANCE PROPERTY AND MANUFACTURING METHOD THEREOF, AND HIGH-STRENGTH ALLOYED HOT-DIP GALVANIZED STEEL SHEET AND MANUFACTURING METHOD THEREOF

This application is a Divisional co-pending application Ser. No. 14/348,526, filed Mar. 28, 2014, which is the U.S. National Phase of PCT/JP2012/075098, filed Sep. 28, 2012. Priority is claimed thereto under 35 U.S.C. §120. This application also claims priority under 35 U.S.C. §119(a) to Japanese patent application no. 2011-218774, filed in Japan on Sep. 30, 2011. The entire contents of all are herein incorporated by reference.

TECHNICAL FIELD

The present invention relates to a high-strength hot-dip galvanized steel sheet excellent in impact resistance property and a manufacturing method thereof, and a high-strength alloyed hot-dip galvanized steel sheet and a manufacturing method thereof, and the present invention particularly relates to a high-strength hot-dip galvanized steel sheet, a high-strength alloyed hot-dip galvanized steel sheet excellent in impact resistance property at low temperature, and manufacturing methods thereof.

BACKGROUND ART

In recent years, a demand for further improving an impact resistance property in a high-strength plated steel sheet used for an automobile and the like has been increasing. As techniques regarding a high-strength plated steel sheet excellent in impact resistance property, techniques described in Patent Literature 1 to Patent Literature 11, for example, have been proposed.

Patent Literature 1 describes a high-strength hot-rolled steel sheet excellent in bending workability and anisotropy of toughness which contains, by mass %, C: 0.08 to 0.15%, Si: 0.3 to 1.5%, Mn: 1.5 to 2.5%, P: ≤0.01%, S: ≤0.01%, Al: 0.01 to 0.05%, Ti: 0.03 to 0.15%, N: ≤0.004%, B: 0.0003 to 0.001%, O: ≤0.005%, and a balance composed of Fe and inevitable impurities, and has a ratio between an energy absorption amount Eab-L in a Charpy test specified in JISZ2242 (energy absorption amount in Charpy test (conducted at −40° C.) of test piece in which longitudinal direction is L direction) and Eab-C (Eab-L/Eab-C (energy absorption amount in Charpy test (conducted at −40° C.) of test piece in which longitudinal direction is C direction)) of not less than 0.9 nor more than 1.3.

Further, Patent Literature 2 describes a technique of manufacturing a high-strength hot-rolled steel sheet with a strength of tensile strength of 980 MPa or more, having a steel composition containing C: 0.08 to 0.20%, Si: less than 0.2%, Mn: greater than 1.0% and equal to or less than 3.0%, N: 0.01% or less, V: greater than 0.1% and equal to or less than 0.5%, Ti: 0.05% or more and less than 0.25%, and Nb: 0.005 to 0.10%, having a steel structure in which an area ratio of ferrite is 60% or more, and an area ratio of martensite is 5% or less, having an average grain diameter of ferrite of 5 μm or less, having a cleanliness d of 0.05% or less, and having a total number density of inclusions and precipitates each having an average grain diameter of 5 μm or more of 300 pieces/mm$^2$ or less.

Further, Patent Literature 3 describes a high-tensile steel product excellent in low temperature toughness and with small strength anisotropy, having an X-ray random intensity ratio of {110} plane at a position of ¼ thickness of a sheet thickness from a surface of a steel sheet of 1.2 to 4.0, and having an X-ray random intensity ratio of {211} plane at a position of ½ thickness of the sheet thickness from the surface of the steel sheet of 1.2 to 4.0.

Patent Literature 4 describes a high-strength hot-rolled steel sheet having a composition in which, by mass %, C is limited to be 0.05% or more and less than 0.20%, Mn is limited to be 0.5% or more and less than 1.5%, sol.Al is limited to be 0.002% or more and less than 0.05%, Si is limited to be less than 0.1%, Cr is limited to be less than 0.1%, Ti is limited to be 0.01% or less, Nb is limited to be less than 0.005%, V is limited to be 0.01% or less, N is limited to be less than 0.005%, and a balance is composed of Fe and impurities, having a structure at a position at which a depth from a surface of steel sheet is ¼ thickness of a sheet thickness from the surface containing a ferrite phase, as a main phase, and a martensite phase of 10 to 30% in a volume ratio, in which an average crystal grain diameter of the ferrite phase is 1.1 to 3.0 μm, and an average grain diameter of the martensite phase is 3.0 μm or less.

Further, Patent Literature 5 describes a manufacturing method of a high-tensile hot-rolled steel sheet having a microscopic structure in which a volume ratio of ferrite is 80% or more, and an average ferrite grain diameter is less than 10 μm, in which a steel containing C: 0.05 to 0.30 wt %, Si: 2.0 wt % or less, Mn: 1.0 to 2.5 wt %, and Al: 0.05 wt % or less, containing one or two of Ti: 0.05 to 0.3 wt %, and Nb: 0.10 wt % or less, and containing a balance composed of Fe and inevitable impurities, is heated to a temperature of 950 to 1100° C., reduction in which a rolling reduction per one time becomes 20% or more is then performed at least two times or more, hot rolling is performed so that a finishing temperature becomes an Ar$_3$ transformation point or more, cooling is performed in a temperature range of the Ar$_3$ transformation point to 750° C. at a rate of 20° C./sec or more, retention in a temperature range of less than 750° C. to 600° C. is subsequently performed for a period of time of 5 to 20 sec, cooling is then performed again at a rate of 20° C./sec or more until the temperature reaches 550° C. or less, and the resultant is coiled into a coil at a temperature of 550° C. or less.

Further, Patent Literature 6 describes a high-strength hot-rolled thin steel sheet excellent in workability, fatigue property and low temperature toughness containing, as main components, C=0.04 to 0.15 mass %, Si≥1.0 mass %, Mn≥1.0 mass %, Nb≥0.005 mass %, Al=0.005 to 0.10 mass %, S≤ 0.01 mass % and Fe, having a microstructure mainly formed of ferrite and martensite, in which a space factor of ferrite ($V_F$) is greater than 50%, an average grain diameter of ferrite (dF) is equal to or less than 5 μm and an average grain diameter of martensite ($d_M$) is equal to or less than 5 μm, and having, as properties, a tensile strength (TS) of greater than 590 MPa, a yield ratio (YR) of equal to or less than 70%, a strength-ductility balance (tensile strength×total elongation) of equal to or greater than 18000 (MPa·%), a hole expansion ratio ($d/d_0$) of equal to or greater than 1.2, a fatigue ratio of equal to or greater than 0.40, and a fracture transition temperature of equal to or less than −40° C.

However, each of the techniques described in Patent Literature 1 to Patent Literature 6 is the technique regarding the hot-rolled steel sheet, and thus cannot be applied to a manufacturing method of a steel sheet including a cold-rolling step and an annealing step. As a manufacturing method of a steel sheet excellent in impact resistance property including a cold-rolling step and an annealing step, techniques described in Patent Literature 7 to Patent Literature 11 have been proposed.

Further, Patent Literature 7 describes a high-strength alloyed hot-dip galvanized steel sheet excellent in energy absorption property that uses a steel sheet, as a base material, having a component composition containing C: 0.05 to 0.20 mass %, Si: 0.3 to 1.5 mass %, Mn: 1.0 to 2.5 mass %, P: 0.1 mass % or less, and a balance composed of Fe and inevitable impurities, and having a microstructure containing one or two of martensite and retained austenite of 25 to 50 volume % in total, and a balance composed of ferrite and bainite, and alloyed hot-dip galvanizing is applied to both surfaces of the steel sheet.

Further, Patent Literature 8 describes a high-tensile hot-dip galvanized steel sheet having a chemical composition containing, by mass %, C: 0.035 to 0.150%, Si: 0.05 to 0.60%, Mn: 2.0 to 4.0%, P: 0.015% or less, S: less than 0.0015%, sol.Al: 0.8% or less, N: 0.0031 to 0.015%, O: 0.0030% or less, Ti: 0.005 to 0.130%, Nb: 0 to 0.130%, in which a total amount of Ti and Nb is 0.055% or more, and a balance composed of Fe and impurities, and having a metallic structure in which an average crystal grain diameter of ferrite is 5.0 μm or less and an average grain diameter of hard second phase is 5.0 μm or less.

Further, Patent Literature 9 describes a manufacturing method of a high-strength cold-rolled steel sheet excellent in impact resistance property and shape fixability in which a slab having a composition of C: 0.08 to 0.18 mass %, Si: 1.00 to 2.0 mass %, Mn: 1.5 to 3.0 mass %, P: 0.03 mass % or less, S: 0.005 mass % or less, and T.Al: 0.01 to 0.1 mass %, and having a segregation degree of Mn (=(Mn concentration at center portion of slab−base Mn concentration)/ base Mn concentration) of 1.05 to 1.10 is hot-rolled, the resultant is further cold-rolled, the resultant is then heated for a retention time of 60 seconds or more in a two-phase region or a single-phase region at 750 to 870° C. in a continuous annealing line, cooling is then performed in a temperature region of 720 to 600° C. at an average cooling rate of 10° C./s or less, cooling is then performed until the temperature reaches 350 to 460° C. at an average cooling rate of 10° C./s or more, retention is performed for 30 seconds to 20 minutes, and cooling is then performed until the temperature reaches room temperature to obtain a five-phase structure of polygonal ferrite, acicular ferrite, bainite, retained austenite, and martensite.

Patent Literature 10 describes a cold-rolled steel sheet excellent in impact absorption property having a hyperfine grain structure containing C, Si, Mn, Ni, Ti, Nb, Al, P, S, and N, having a ferrite phase whose volume fraction is 75% or more in which an average crystal grain diameter of ferrite is 3.5 μm or less, and having a structure of balance, other than the ferrite phase, which practically becomes a steel structure of tempered martensite.

Patent Literature 11 describes a high-ductility-type high-tensile cold-rolled steel sheet excellent in surface property and impact absorbency containing, by mass percent, C: 0.06 to 0.25%, Si: 2.5% or less, Mn: 0.5 to 3.0%, P: 0.1% or less, S: 0.03% or less, Al: 0.1 to 2.5%, Ti: 0.003 to 0.08%, N: 0.01% or less, and a balance composed of Fe and inevitable impurities, in which the Ti content satisfies a relation of $(48/14)N \leq Ti \leq (48/14)N+(48/32)S+0.01$, and having a structure after cold rolling-recrystallization annealing being a structure containing retained austenite of 5% or more by volume ratio.

CITATION LIST

Patent Literature

Patent Literature 1: Japanese Laid-open Patent Publication No. 2010-156016
Patent Literature 2: Japanese Laid-open Patent Publication No. 2008-285741
Patent Literature 3: Japanese Laid-open Patent Publication No. 2008-266758
Patent Literature 4: Japanese Laid-open Patent Publication No. 2006-342387
Patent Literature 5: Japanese Laid-open Patent Publication No. 09-143570
Patent Literature 6: Japanese Laid-open Patent Publication No. 07-150294
Patent Literature 7: Japanese Laid-open Patent Publication No. 2009-68039
Patent Literature 8: Japanese Laid-open Patent Publication No. 2008-255441
Patent Literature 9: Japanese Laid-open Patent Publication No. 2004-300452
Patent Literature 10: Japanese Laid-open Patent Publication No. 2004-277858
Patent Literature 11: Japanese Laid-open Patent Publication No. 10-130776

SUMMARY OF INVENTION

Technical Problem

However, in the conventional high-strength galvanized steel sheet whose tensile strength "TS" is 900 MPa or more, it is not possible to sufficiently obtain the impact resistance property at low temperature, and thus it has been demanded to further improve the impact resistance property at low temperature.

In view of the actual situation as described above, the present invention provides a high-strength hot-dip galvanized steel sheet, and a high-strength alloyed hot-dip galvanized steel sheet excellent in impact resistance property at low temperature and with a tensile strength of 900 MPa or more, and manufacturing methods thereof.

Solution to Problem

The present inventors repeatedly conducted earnest studies for obtaining a high-strength hot-dip galvanized steel sheet excellent in impact resistance property at low temperature and with a tensile strength of 900 MPa or more. As a result of this, the present inventors found out that it is required to manufacture a high-strength galvanized steel sheet in which a base steel sheet having a hot-dip galvanized layer formed on a surface thereof is set to have predetermined chemical components with which a tensile strength of 900 MPa or more can be achieved, a steel sheet structure in a range of ⅛ thickness to ⅜ thickness centered around ¼ thickness of a sheet thickness from a surface has a retained austenite phase of 5% or less by volume fraction, and a bainite phase, a bainitic ferrite phase, a fresh martensite phase and a tempered martensite phase of 40% or more in total by volume fraction, an average effective crystal grain diameter is 5.0 μm or less, maximum effective crystal grain diameter is 20 μm or less, and a decarburized layer with a thickness of 0.01 μm to 10.0 μm is formed on a surface layer portion, in which a density of oxides dispersed in the decarburized layer is $1.0\times10^{12}$ to $1.0\times10^{16}$ oxides/m$^2$, and an average grain diameter of the oxides is 500 nm or less.

Specifically, in such a high-strength galvanized steel sheet, the volume fraction of retained austenite phase of the base steel sheet to be a starting point of fracture is small to be 5% or less. Further, the average effective crystal grain diameter and the maximum effective crystal grain diameter of the base steel sheet in the range of ⅛ thickness to ⅜ thickness centered around ¼ thickness of the sheet thickness from the surface are 5.0 μm or less and 20 μm or less, respectively, and thus both of the average effective crystal grain diameter and the maximum effective crystal grain diameter are small, resulting in that the high-strength galvanized steel sheet becomes one with excellent low temperature toughness and with excellent impact resistance property at low temperature.

Besides, in such a high-strength galvanized steel sheet, the decarburized layer with a thickness of 0.01 μm to 10.0 μm and with a small amount of hard structures is formed on the surface layer portion of the base steel sheet, the density of oxides dispersed in the decarburized layer is $1.0\times10^{12}$ to $1.0\times10^{16}$ oxides/m$^2$, and the average grain diameter of the oxides is 500 nm or less, which is difficult to become a starting point of fracture, so that a difference of yield strength between the decarburized layer and a center portion of the base steel sheet is small. Accordingly, in the high-strength galvanized steel sheet, it is possible to prevent the fracture occurred from the surface layer portion of the base steel sheet, and a stress concentration at an interface between the decarburized layer and a layer under the decarburized layer, occurred at a time of giving an impact, is suppressed, so that the high-strength galvanized steel sheet becomes one in which brittle fracture is difficult to occur, and with excellent impact resistance property.

The present invention is completed based on such findings, and a gist thereof is as follows.

(1) A high-strength hot-dip galvanized steel sheet excellent in impact resistance property is characterized in that it has a hot-dip galvanized layer formed on a surface of a base steel sheet containing, by mass %,
- C: 0.075 to 0.400%,
- Si: 0.01 to 2.00%,
- Mn: 0.80 to 3.50%,
- P: 0.0001 to 0.100%,
- S: 0.0001 to 0.0100%,
- Al: 0.001 to 2.00%,
- O: 0.0001 to 0.0100%,
- N: 0.0001 to 0.0100%, and
- a balance composed of Fe and inevitable impurities, in which the base steel sheet has a steel sheet structure in a range of ⅛ thickness to ⅜ thickness centered around ¼ thickness of a sheet thickness from a surface, in which a volume fraction of a retained austenite phase is 5% or less, and a total volume fraction of a bainite phase, a bainitic ferrite phase, a fresh martensite phase and a tempered martensite phase is 40% or more, an average effective crystal grain diameter and a maximum effective crystal grain diameter in the range of ⅛ thickness to ⅜ thickness centered around ¼ thickness of the sheet thickness from the surface are 5.0 μm or less and 20 μm or less, respectively, and a decarburized layer with a thickness of 0.01 μm to 10.0 μm is formed on a surface layer portion, in which a density of oxides dispersed in the decarburized layer is $1.0\times10^{12}$ to $1.0\times10^{16}$ oxides/m$^2$, and an average grain diameter of the oxides is 500 nm or less.

(2) It is characterized in that in the high-strength hot-dip galvanized steel sheet excellent in impact resistance property according to (1), the base steel sheet further contains, by mass %, one or two or more selected from
- Ti: 0.001 to 0.150%,
- Nb: 0.001 to 0.100%, and
- V: 0.001 to 0.300%.

(3) It is characterized in that in the high-strength hot-dip galvanized steel sheet excellent in impact resistance property according to (1) or (2), the base steel sheet further contains one or two or more selected from
- Cr: 0.01 to 2.00%,
- Ni: 0.01 to 2.00%,
- Cu: 0.01 to 2.00%,
- Mo: 0.01 to 2.00%,
- B: 0.0001 to 0.0100%, and
- W: 0.01 to 2.00%.

(4) It is characterized in that in the high-strength hot-dip galvanized steel sheet excellent in impact resistance property according to any one of (1) to (3), the base steel sheet further contains 0.0001 to 0.0100% in total of one or two or more selected from Ca, Ce, Mg, Zr, La, and REM.

(5) A high-strength alloyed hot-dip galvanized steel sheet excellent in impact resistance property is characterized in that it has the hot-dip galvanized layer of the high-strength hot-dip galvanized steel sheet according to any one of (1) to (4), the hot-dip galvanized layer being alloyed.

(6) A manufacturing method of a high-strength hot-dip galvanized steel sheet excellent in impact resistance property is characterized in that it includes:

a step of obtaining a base steel sheet, the step including:
a hot-rolling step of performing hot rolling in which a slab containing, by mass %,
- C: 0.075 to 0.400%,
- Si: 0.01 to 2.00%,
- Mn: 0.80 to 3.50%,
- P: 0.0001 to 0.100%,
- S: 0.0001 to 0.0100%,
- Al: 0.001 to 2.00%,
- O: 0.0001 to 0.0100%,
- N: 0.0001 to 0.0100%, and
- a balance composed of Fe and inevitable impurities is heated to 1080° C. or more, the hot rolling is completed at a temperature of 850° C. to 950° C., and a rolling reduction in a temperature region of 1050° C. to a hot-rolling completion temperature satisfies the following (expression 1) to obtain a hot-rolled steel sheet;

a cold-rolling step of performing cold rolling at a reduction ratio of 30% to 75% on the hot-rolled steel sheet to obtain a cold-rolled steel sheet; and an annealing step of performing annealing in which the cold-rolled steel sheet is made to pass through a preheating zone in which heating is performed by using mixed gas whose air ratio being a ratio between a volume of air contained in the mixed gas per unit volume and a volume of air which is theoretically required to cause complete combustion of fuel gas contained in the mixed gas per unit volume in the mixed gas of air and fuel gas used for preheating, is 0.7 to 1.2, to generate an oxide coating film on a surface layer portion, the steel sheet is made to pass through a reduction zone in an atmosphere in which a partial pressure ratio between H$_2$O and H$_2$ (P(H$_2$O)/P(H$_2$)) is 0.0001 to 2.00 at a maximum heating temperature of Ac3 point—50° C. or more to reduce the oxide coating film to form a decarburized layer, and bending with a bending radius of 800 mm or less is performed one time or more while applying a tension of 3 to 100 MPa, while performing cooling in a temperature region of 740° C. to 500° C. at an average cooling rate of 1.0° C./s or more; and a plating step of making the base steel sheet to be immersed in a plating bath in which an effective Al amount is 0.01 to 0.18 mass % to form a hot-dip galvanized layer on a surface of the base steel sheet to produce a hot-dip galvanized steel sheet.

[Mathematical expression 1]

$$0.10 \leq \left\{ \sum_{i=1}^{N} \frac{\left(5.20 \times 10^{-6} \cdot T_i^3 - 1.06 \times 10^{-2} \cdot T_i^2 + 1.68 \times 10 \cdot T_i - 5.67 \times 10^3\right)^2}{\left(\frac{h_{i-1}}{h_i}\right)^2 \cdot \exp\left(-\frac{2.20 \times 10^4}{T_i}\right) \cdot t_i} \right\}^{0.5} \leq 1.00 \quad (1)$$

In the (expression 1), N indicates a total number of passes from a start of the hot rolling to a completion of the hot rolling, i indicates an order of pass, $T_i$ indicates a rolling temperature (° C.) at i-th pass, $h_i$ indicates a sheet thickness after processing (mm) at the i-th pass, and $t_i$ indicates an elapsed time from the i-th pass to a next pass. Note that when i equals to 1, h0 equals to a slab thickness. Further, an elapsed time from a final pass to a next pass is set to an elapsed time from the final pass to a point of time at which cooling is started after the completion of hot rolling.

(7) It is characterized in that in the manufacturing method of the high-strength hot-dip galvanized steel sheet excellent in impact resistance property according to (6), the slab further contains, by mass %, one or two or more selected from Ti: 0.001 to 0.150%,
Nb: 0.001 to 0.100%, and
V: 0.001 to 0.300%.

(8) It is characterized in that in the manufacturing method of the high-strength hot-dip galvanized steel sheet excellent in impact resistance property according to (6) or (7), the slab further contains one or two or more selected from Cr: 0.01 to 2.00%,
Ni: 0.01 to 2.00%,
Cu: 0.01 to 2.00%,
Mo: 0.01 to 2.00%,
B: 0.0001 to 0.0100%, and
W: 0.01 to 2.00%.

(9) It is characterized in that in the manufacturing method of the high-strength hot-dip galvanized steel sheet excellent in impact resistance property according to any one of (6) to (8), the slab further contains 0.0001 to 0.0100% in total of one or two or more selected from Ca, Ce, Mg, Zr, La, and REM.

(10) It is characterized in that in the manufacturing method of the high-strength hot-dip galvanized steel sheet excellent in impact resistance property according to any one of (6) to (9), the plating step is a step of making the base steel sheet of 430 to 490° C. enter and to be immersed in a plating bath of 450 to 470° C.

(11) It is characterized in that in the manufacturing method of the high-strength hot-dip galvanized steel sheet excellent in impact resistance property according to any one of (6) to (10), a bainite transformation process of retaining, before and/or after immersing the base steel sheet in the plating bath, the base steel sheet in a temperature range of 300 to 470° C. for 10 to 1000 seconds is performed.

(12) A manufacturing method of a high-strength alloyed hot-dip galvanized steel sheet excellent in impact resistance property is characterized in that it includes performing alloying treatment of retaining the high-strength hot-dip galvanized steel sheet according to any one of (6) to (11) in a temperature range of 470 to 620° C. for 2 seconds to 200 seconds.

Advantageous Effects of Invention

According to the present invention, it is possible to provide a high-strength hot-dip galvanized steel sheet and a high-strength alloyed hot-dip galvanized steel sheet excellent in impact resistance property at low temperature and capable of obtaining a tensile strength of 900 MPa or more, and manufacturing methods thereof.

DESCRIPTION OF EMBODIMENTS

A high-strength galvanized steel sheet according to an embodiment of the present invention is produced by forming a hot-dip galvanized layer on a surface of a base steel sheet containing, by mass %, C: 0.075 to 0.400%, Si: 0.01 to 2.00%, Mn: 0.80 to 3.50%, P: 0.0001 to 0.100%, S: 0.0001 to 0.0100%, Al: 0.001 to 2.00%, O: 0.0001 to 0.0100%, N: 0.0001 to 0.0100%, and a balance composed of Fe and inevitable impurities.

Note that a sheet thickness of the base steel sheet is appropriate to be 0.6 mm or more and less than 5.0 mm. If the sheet thickness of the base steel sheet is less than 0.6 mm, it becomes difficult to keep a shape of the base steel sheet flat, which is not appropriate. Further, if the sheet thickness of the base steel sheet is 5.0 mm or more, it becomes difficult to perform control of cooling. Further, if the sheet thickness is 5.0 mm or more, a distortion in accordance with bending is not sufficient, and a fine dispersion of bainite becomes difficult, resulting in that it becomes difficult to produce a predetermined microstructure.

First, chemical components (composition) of the base steel sheet that forms the high-strength galvanized steel sheet according to the embodiment of the present invention will be described. Note that [%] in the present invention indicates [mass %] unless otherwise noted.

[C: 0.075 to 0.400%]

C is contained to increase a strength of a high-strength steel sheet. However, if a C content exceeds 0.400%, toughness and weldability become insufficient. From a point of view of the toughness and the weldability, the C content is preferably 0.300% or less, and is more preferably 0.250% or less. On the other hand, if the C content is less than 0.075%, the strength is lowered, and it becomes difficult to secure a sufficient maximum tensile strength. In order to further increase the strength, the C content is preferably 0.085% or more, and is more preferably 0.100% or more.

[Si: 0.01 to 2.00%]

Si is an element that suppresses a generation of iron-based carbide in the steel sheet, and increases the strength and the formability. However, if a Si content exceeds 2.00%, a density of oxides dispersed in a decarburized layer is increased too much, resulting in that the decarburized layer easily fractures, and an impact resistance property is lowered. Further, if the Si content exceeds 2.00%, the steel sheet is embrittled and the ductility is deteriorated, resulting in that it becomes difficult to perform cold rolling. From a point of view of the impact resistance property, the Si content is preferably 1.80% or less, and is more preferably 1.50% or less. On the other hand, if the Si content is less than 0.01%, the density of oxides dispersed in the decarburized layer becomes insufficient, and the strength of the decarburized layer becomes insufficient, resulting in that the impact resistance property is lowered. Further, if the Si content is less than 0.01%, when a high-strength hot-dip galvanized steel sheet is alloyed, a large amount of coarse iron-based carbides is generated through the alloying, resulting in that the strength and the formability deteriorate. From a point of view of the impact resistance property, a lower limit value of Si is preferably 0.20% or more, and is more preferably 0.50% or more.

[Mn: 0.80 to 3.50%]

Mn is added to increase the strength of the steel sheet. However, if a Mn content exceeds 3.50%, the density of oxides dispersed in the decarburized layer is increased too much, resulting in that the decarburized layer easily fractures, and the impact resistance property is lowered. Further, if the Mn content exceeds 3.50%, a coarse Mn concentrated portion is generated at a center portion in a sheet thickness of the steel sheet, embrittlement occurs easily, and a trouble such as breaking of a cast slab occurs easily. Further, if the Mn content exceeds 3.50%, the weldability also deteriorates. From the above description, it is required to set the Mn content to 3.50% or less. From a point of view of the impact resistance property, the Mn content is preferably 3.00% or less, and is more preferably 2.70% or less.

On the other hand, if the Mn content is less than 0.80%, the density of oxides dispersed in the decarburized layer becomes insufficient, and the strength of the decarburized layer becomes insufficient, resulting in that the impact resistance property is lowered. Further, if the Mn content is less than 0.80%, a large amount of soft structures is formed during cooling after annealing, which makes it difficult to secure a sufficiently high maximum tensile strength. Therefore, it is required to set the Mn content to 0.80% or more. In order to further increase the strength, the Mn content is preferably 1.00% or more, and is more preferably 1.30% or more.

[P: 0.0001 to 0.100%]

P tends to be segregated at the center portion in the sheet thickness of the steel sheet, and embrittles a weld zone. If a P content exceeds 0.100%, significant embrittlement of the weld zone occurs, so that an upper limit of the P content is set to 0.100%. On the other hand, 0.0001% is set as a lower limit value since manufacturing costs greatly increase when the P content is set to less than 0.0001%, and the P content is preferably set to 0.0010% or more.

[S: 0.0001 to 0.0100%]

S exerts an adverse effect on the weldability and manufacturability during casting and hot rolling. For this reason, an upper limit value of S content is set to 0.0100% or less. Further, S couples with Mn to form coarse MnS and lowers the ductility and a stretch flangeability, so that the S content is preferably set to 0.0050% or less, and is more preferably set to 0.0030% or less. On the other hand, 0.0001% is set as a lower limit value since manufacturing costs greatly increase when the S content is set to less than 0.0001%, and the S content is preferably set to 0.0005% or more, and is more preferably set to 0.0010% or more.

[Al: 0.001 to 2.00%]

Al suppresses the generation of iron-based carbide and increases the strength and the formability of the steel sheet. However, if an Al content exceeds 2.00%, the weldability worsens, so that an upper limit of the Al content is set to 2.00%. Further, from this point of view, the Al content is more preferably set to 1.50% or less, and is still more preferably set to 1.20% or less. On the other hand, although the effect of the present invention is exhibited without particularly determining a lower limit of the Al content, the lower limit is set to 0.001% or more since Al is an inevitable impurity existed in a very small amount in a raw material, and manufacturing costs greatly increase when the Al content is set to less than 0.001%. Further, Al is an effective element also as a deoxidizing material, and in order to further sufficiently obtain an effect of deoxidation, the Al content is more preferably set to 0.010% or more.

[N: 0.0001 to 0.0100%]

N forms a coarse nitride and deteriorates the ductility and the stretch flangeability, so that an added amount thereof is required to be suppressed. If an N content exceeds 0.0100%, this tendency becomes evident, so that an upper limit of the N content is set to 0.0100%. Further, since N causes a generation of blowhole during welding, the content of N is preferably small. The N content is preferably 0.0070% or less, and is more preferably 0.0050% or less. Although the effect of the present invention is exhibited without particularly determining a lower limit of the N content, manufacturing costs greatly increase when the N content is set to less than 0.0001%. For this reason, the lower limit of the N content is set to 0.0001% or more. The N content is preferably 0.0003% or more, and is more preferably 0.0005% or more.

[O: 0.0001 to 0.0100%]

O forms an oxide and deteriorates the ductility and the stretch flangeability, so that a content thereof is required to be suppressed. If the O content exceeds 0.0100%, the deterioration of stretch flangeability becomes noticeable, so that an upper limit of the O content is set to 0.0100%. Further, the O content is preferably 0.0070% or less, and is more preferably 0.0050% or less. Although the effect of the present invention is exhibited without particularly determining a lower limit of the O content, 0.0001% is set as the lower limit since manufacturing costs greatly increase when the O content is set to less than 0.0001%. The O content is preferably 0.0003% or more, and is more preferably 0.0005% or more.

Other than the above, the following elements may also be added, according to need, to the base steel sheet of the hot-dip galvanized steel sheet according to the embodiment of the present invention.

[Ti: 0.001 to 0.150%]

Ti is an element which contributes to strength increase of the steel sheet by precipitate strengthening, fine grain strengthening by growth suppression of ferrite crystal grains, and dislocation strengthening through suppression of recrystallization. However, if a Ti content exceeds 0.150%, precipitation of carbonitride increases, and the formability deteriorates, so that the Ti content is more preferably 0.150% or less. From a point of view of the formability, the Ti content is more preferably 0.080% or less. Although the effect of the present invention is exhibited without particularly determining a lower limit of the Ti content, in order to sufficiently obtain the effect of increasing the strength provided by adding Ti, the Ti content is preferably 0.001% or more. In order to further increase the strength of the steel sheet, the Ti content is more preferably 0.010% or more.

[Nb: 0.001 to 0.100%]

Nb is an element which contributes to strength increase of the steel sheet by precipitate strengthening, fine grain strengthening by growth suppression of ferrite crystal grains, and dislocation strengthening through suppression of recrystallization. However, if a Nb content exceeds 0.100%, precipitation of carbonitride increases, and the formability deteriorates, so that the Nb content is more preferably 0.100% or less. From a point of view of the formability, the Nb content is more preferably 0.050% or less. Although the effect of the present invention is exhibited without particularly determining a lower limit of the Nb content, in order to sufficiently obtain the effect of increasing the strength provided by adding Nb, the Nb content is preferably 0.001% or more. In order to further increase the strength of the steel sheet, the Nb content is more preferably 0.010% or more.

[V: 0.001 to 0.300%]

V is an element which contributes to strength increase of the steel sheet by precipitate strengthening, fine grain strengthening by growth suppression of ferrite crystal grains, and dislocation strengthening through suppression of recrystallization. However, if a V content exceeds 0.300%, precipitation of carbonitride increases, and the formability deteriorates, so that the V content is more preferably 0.300% or less, and is still more preferably 0.200% or less. Although the effect of the present invention is exhibited without particularly determining a lower limit of the V content, in order to sufficiently obtain the effect of increasing the strength provided by adding V, the V content is preferably 0.001% or more, and is more preferably 0.010% or more.

[Cr: 0.01 to 2.00%]

Cr is an element effective for increasing strength by suppressing a phase transformation at high temperature, and may be added instead of a part of C and/or Mn. If a Cr content exceeds 2.00%, the workability during hot working is impaired and the productivity is lowered, so that the Cr content is preferably set to 2.00% or less, and is more preferably 1.40% or less. Although the effect of the present invention is exhibited without particularly determining a lower limit of the Cr content, in order to sufficiently obtain the effect of increasing the strength provided by adding Cr, the Cr content is preferably 0.01% or more, and is more preferably 0.10% or more.

[Ni: 0.01 to 2.00%]

Ni is an element effective for increasing strength by suppressing the phase transformation at high temperature, and may be added instead of a part of C and/or Mn. If a Ni content exceeds 2.00%, the weldability is impaired, so that the Ni content is preferably set to 2.00% or less, and is more preferably 1.40% or less. Although the effect of the present invention is exhibited without particularly determining a lower limit of the Ni content, in order to sufficiently obtain the effect of increasing the strength provided by adding Ni, the Ni content is preferably 0.01% or more, and is more preferably 0.10% or more.

[Cu: 0.01 to 2.00%]

Cu is an element that exists in the steel as a fine particle to increase the strength, and may be added instead of a part of C and/or Mn. If a Cu content exceeds 2.00%, the weldability is impaired, so that the Cu content is preferably set to 2.00% or less, and is more preferably 1.40% or less. Although the effect of the present invention is exhibited without particularly determining a lower limit of the Cu content, in order to sufficiently obtain the effect of increasing the strength provided by adding Cu, the Cu content is preferably 0.01% or more, and is more preferably 0.10% or more.

[Mo: 0.01 to 2.00%]

Mo is an element effective for increasing strength by suppressing the phase transformation at high temperature, and may be added instead of a part of C and/or Mn. If a Mo content exceeds 2.00%, the workability during hot working is impaired and the productivity is lowered, so that the Mo content is preferably set to 2.00% or less, and is more preferably 1.40% or less. Although the effect of the present invention is exhibited without particularly determining a lower limit of the Mo content, in order to sufficiently obtain the effect of increasing the strength provided by adding Mo, the Mo content is preferably 0.01% or more, and is more preferably 0.10% or more.

[B: 0.0001 to 0.0100%]

B is an element effective for increasing strength by suppressing the phase transformation at high temperature, and may be added instead of a part of C and/or Mn. If a B content exceeds 0.0100%, the workability during hot working is impaired and the productivity is lowered, so that the B content is preferably set to 0.0100% or less. From a point of view of the productivity, the B content is more preferably 0.0060% or less. Although the effect of the present invention is exhibited without particularly determining a lower limit of the B content, in order to sufficiently obtain the effect of increasing the strength provided by adding B, the B content is preferably set to 0.0001% or more. In order to further increase the strength, the B content is more preferably 0.0005% or more.

[W: 0.01 to 2.00%]

W is an element effective for increasing strength by suppressing the phase transformation at high temperature, and may be added instead of a part of C and/or Mn. If a W content exceeds 2.00%, the workability during hot working is impaired and the productivity is lowered, so that the W content is preferably 2.00% or less, and is more preferably 1.40% or less. Although the effect of the present invention is exhibited without particularly determining a lower limit of the W content, in order to sufficiently increase the strength with the use of W, the W content is preferably 0.01% or more, and is more preferably 0.10% or more.

The base steel sheet in the hot-dip galvanized steel sheet of the embodiment of the present invention may further contain, as elements other than the above, 0.0001 to 0.0100% in total of one or two or more of Ca, Ce, Mg, Zr, La, and REM. A reason of adding these elements is as follows.

Note that REM stands for Rare Earth Metal, and represents an element belonging to lanthanoid series. In the embodiment of the present invention, REM and Ce are often added in misch metal, and there is a case in which elements in the lanthanoid series are contained in a complex form, in addition to La and Ce. Even if these elements in the lanthanoid series other than La and Ce are contained as inevitable impurities, the effect of the present invention is exhibited. Further, the effect of the present invention is exhibited even if metal La and Ce are added.

Ca, Ce, Mg, Zr, La, and REM are elements effective for improving the formability, and one or two or more of them can be added. However, if a total content of one or two or more of Ca, Ce, Mg, Zr, La, and REM exceeds 0.0100%, the ductility may be impaired, so that a total content of the respective elements is preferably 0.0100% or less, and is more preferably 0.0070% or less. Although the effect of the present invention is exhibited without particularly determining a lower limit of the content of one or two or more of Ca, Ce, Mg, Zr, La, and REM, in order to sufficiently achieve the effect of improving the formability of the steel sheet, the total content of the respective elements is preferably 0.0001% or more. From a point of view of the formability, the total content of one or two or more of Ca, Ce, Mg, Zr, La, and REM is more preferably 0.0010% or more.

A balance of the above-described respective elements is composed of Fe and inevitable impurities. Note that it is tolerable that each of the aforementioned Ti, Nb, V, Cr, Ni, Cu, Mo, B, and W is contained in a very small amount which is less than the above-described lower limit value, as an impurity. Further, it is also tolerable that Ca, Ce, Mg, Zr, La, and REM are contained in an extremely small amount which is less than the lower limit value of the total amount thereof, as an impurity.

The reason why the structure of the base steel sheet of the high-strength galvanized steel sheet according to the embodiment of the present invention is specified, is as follows.

(Microstructure)

The base steel sheet of the high-strength galvanized steel sheet according to the embodiment of the present invention has a steel sheet structure in a range of ⅛ thickness to ⅜ thickness centered around ¼ thickness of a sheet thickness from a surface, in which a retained austenite phase (referred to as retained austenite, hereinafter) is 5% or less by volume fraction, and a total amount of a bainite phase (referred to as bainite, hereinafter), a bainitic ferrite phase (referred to as bainitic ferrite, hereinafter), a fresh martensite phase (referred to as fresh martensite, hereinafter), and a tempered martensite phase (referred to as tempered martensite, hereinafter) is 40% or more by volume fraction.

"Retained Austenite"

Retained austenite is a structure that increases a strength-ductility balance, and increases an impact absorption energy at room temperature. On the other hand, in an impact test at a temperature lower than the room temperature, the retained austenite is easily transformed into martensite by an impact. Martensite is very hard, and strongly acts as a starting point of brittle fracture, so that the retained austenite significantly deteriorates the toughness at low temperature. When the volume fraction of retained austenite exceeds 5%, there is a possibility that the brittle fracture occurs even at −40° C. For this reason, the volume fraction of retained austenite is set to 5% or less. In order to further increase the toughness, the volume fraction of retained austenite is preferably set to 3% or less, and is preferably set to 2% or less. The smaller the volume fraction of retained austenite is, the more preferable it is, and there is no problem even if the volume fraction of retained austenite is 0%.

"Ferrite"

Ferrite is a structure having an excellent ductility. However, since the ferrite has low strength, when the volume fraction of ferrite is excessively increased, there is a need to largely increase a strength of another hard structure for guaranteeing the strength. In this case, an interface between the hard structure and the ferrite easily becomes a starting point of fracture at the time of the impact test at low temperature, resulting in that the low temperature toughness deteriorates. From a point of view described above, the volume fraction of ferrite is preferably set to 50% or less. In order to further increase the toughness, the volume fraction of ferrite is preferably set to 45% or less, and is more preferably set to 40% or less. A lower limit of the volume fraction of ferrite is not particularly provided, and there is no problem even if it is 0%, but, from a point of view of the ductility, the volume fraction of ferrite is preferably set to 5% or more, and is more preferably 10% or more.

"Bainitic Ferrite and/or Bainite"

Bainitic ferrite and/or bainite are/is structure(s) excellent in strength, ductility, and toughness, and preferably contained in the steel sheet structure in an amount of 10 to 50% by volume fraction. Further, the bainitic ferrite and/or the bainite are/is microstructure(s) having a strength which is in the middle of a strength of soft ferrite and hard martensite, tempered martensite and retained austenite, and the bainitic ferrite and/or the bainite are/is more preferably contained in an amount of 15% or more, and still more preferably contained in an amount of 20% or more, from a point of view of the stretch flangeability. On the other hand, it is not preferable that the volume fraction of bainitic ferrite and/or bainite exceeds 50%, since there is a concern that a yield stress is excessively increased and the shape fixability deteriorates.

"Tempered Martensite"

Tempered martensite is a structure that largely improves the tensile strength, and it may be contained in the steel sheet structure in an amount of 50% or less by volume fraction. From a point of view of the tensile strength, the volume fraction of tempered martensite is preferably set to 10% or more. On the other hand, it is not preferable that the volume fraction of tempered martensite contained in the steel sheet structure exceeds 50%, since there is a concern that the yield stress is excessively increased and the shape fixability deteriorates.

"Fresh Martensite"

Fresh martensite largely improves the tensile strength, but, on the other hand, it becomes a starting point of fracture to deteriorate the low temperature toughness, so that it is preferably contained in the steel sheet structure in an amount of 20% or less by volume fraction. In order to increase the low temperature toughness, the volume fraction of fresh martensite is more preferably set to 15% or less, and is still more preferably set to 10% or less.

"Other Microstructures"

It is also possible that the steel sheet structure of the high-strength galvanized steel sheet according to the embodiment of the present invention contains a structure other than the above, such as perlite and/or coarse cementite. However, when an amount of perlite and/or coarse cementite is increased in the steel sheet structure of the high-strength steel sheet, the ductility deteriorates. For this reason, a volume fraction of perlite and/or coarse cementite contained in the steel sheet structure is preferably 10% or less in total, and is more preferably 5% or less in total.

The volume fraction of each structure contained in the base steel sheet of the high-strength galvanized steel sheet according to the embodiment of the present invention can be measured by a method to be described below, for example.

Regarding the volume fraction of retained austenite, an X-ray analysis is conducted by setting a surface parallel to and at ¼ thickness from the sheet surface of the base steel sheet as an observation surface to calculate an area fraction, and a result of the calculation can be regarded as the volume fraction.

Regarding the volume fractions of ferrite, perlite, bainitic ferrite, bainite, tempered martensite and fresh martensite contained in the structure of the base steel sheet of the high-strength galvanized steel sheet according to the embodiment of the present invention, a sample is collected while a thicknesswise cross section parallel to a rolling direction of the base steel sheet is set as an observation surface, the observation surface is polished and subjected to nital etching, and a range of ⅛ thickness to ⅜ thickness centered around ¼ thickness of the sheet thickness from the surface, is observed with an FE-SEM (Field Emission Scanning Electron Microscope) to measure area fractions, and results of the measurement can be regarded as the volume fractions.

The high-strength galvanized steel sheet according to the embodiment of the present invention is one in which an average effective crystal grain diameter and a maximum effective crystal grain diameter of the base steel sheet in the range of ⅛ thickness to ⅜ thickness centered around ¼ thickness of the sheet thickness from the surface, are 5.0 µm or less and 20 µm or less, respectively.

In order to increase the low temperature toughness and to increase the impact resistance property at low temperature, it is important to make the effective crystal grain of the base steel sheet to be fine. In order to obtain a sufficient low temperature toughness, it is required to set the average effective crystal grain diameter of the base steel sheet in the range of 1/8 thickness to 3/8 thickness centered around 1/4 thickness of the sheet thickness from the surface, namely, in a range where no decarburized layer exists, to 5.0 µm or less. In order to further increase the low temperature toughness, the average effective crystal grain diameter of the base steel sheet is preferably set to 4.0 µm or less, and is more preferably set to 3.0 µm or less.

Further, when a coarse effective crystal grain locally exists, the low temperature toughness deteriorates, so that the maximum effective crystal grain diameter is set to 20 µm or less. In order to further increase the low temperature toughness and to increase the impact resistance property at low temperature, the maximum effective crystal grain diameter is preferably set to 15 µm or less, and is more preferably set to 12 µm or less.

The effective crystal grain is evaluated by performing a high-resolution crystal orientation analysis based on an EBSD (Electron Bach-Scattering Diffraction) method using the FE-SEM (Field Emission Scanning Electron Microscopy). Note that a thicknesswise cross section parallel to the rolling direction is finished to be a mirror surface, a crystal orientation of iron of BCC (body-centered cubic structure) in regions of 50000 µm$^2$ in total is measured in a range of 1/8 thickness to 3/8 thickness centered around 1/4 thickness of a sheet thickness from a surface, by setting a measuring step to 0.5 µm or less, and a boundary at which a misorientation of (100) plane becomes 10° or more at the minimum, between adjacent measurement points, is defined as an effective crystal grain boundary. Note that structures whose crystal structure is BCC are ferrite, martensite, tempered martensite, bainite, bainitic ferrite, perlite, and a complex structure formed of two or more of the above.

The average effective crystal grain diameter is determined by an intercept method to be described below. Specifically, a grain boundary map is created by using the effective crystal grain boundary, lines, whose lengths are 300 µm or more in total, parallel to the rolling direction are written on the grain boundary map, and a value obtained by dividing the total lengths of the lines by a number of intersection points of the lines and the effective crystal grain boundary is set to the average effective crystal grain diameter. Further, a grain diameter at a position at which a distance between adjacent intersection points is the largest, is set to the maximum effective crystal grain diameter.

The high-strength galvanized steel sheet according to the embodiment of the present invention is one in which a decarburized layer with a thickness of 0.01 µm to 10.0 µm is formed on a surface layer portion of the base steel sheet, a density of oxides dispersed in the decarburized layer is $1.0 \times 10^{12}$ to $1.0 \times 10^{16}$ oxides/m$^2$, and an average grain diameter of the oxides is 500 nm or less.

In the embodiment of the present invention, to prevent a fracture occurred from a surface layer of the steel sheet in a impact test at low temperature, the surface layer portion is set to be formed by the decarburized layer with small amount of hard structures. Note that it is set that the decarburized layer indicates a region continued from an uppermost surface of the base steel sheet, and a region in which a volume fraction of hard structures is half or less a volume fraction of hard structures at 1/4 thickness. Note that the hard structures mean bainite, bainitic ferrite, fresh martensite and tempered martensite.

The thickness of the decarburized layer of the base steel sheet can be measured by finishing a thicknesswise cross section parallel to the rolling direction to be a mirror surface, and by performing observation using the FE-SEM. In the embodiment of the present invention, thicknesses of the decarburized layer are measured at three positions or more per one steel sheet, and an average value of the thicknesses is set to a thickness of the decarburized layer.

If the thickness of the decarburized layer is less than 0.01 µm, the fracture on the surface layer portion cannot be sufficiently suppressed, so that the thickness of the decarburized layer is set to 0.01 µm or more. In order to further improve the low temperature toughness, the thickness of the decarburized layer is preferably set to 0.10 µm or more, and is more preferably 0.30 µm or more. On the other hand, an excessively thick decarburized layer lowers tensile strength and fatigue strength of the high-strength galvanized steel sheet. From this point of view, the thickness of the decarburized layer is set to 10.0 µm or less. From a point of view of the fatigue strength, the thickness of the decarburized layer is preferably 9.0 µm or less, and is more preferably 8.0 µm or less.

The decarburized layer has low strength, so that a fracture whose starting point is the decarburized layer is difficult to occur on the surface layer potion of the base steel sheet. However, a strength difference is large between a normal portion (center portion) of the base steel sheet and the decarburized layer, so that an interface between the normal portion and the decarburized layer may become a new starting point of fracture. In order to avoid this, it is effective to make oxides containing Si and/or Mn to be dispersed in a crystal grain and/or a crystal grain boundary of the decarburized layer to increase the strength of the decarburized layer, thereby reducing the strength difference between the center portion of the base steel sheet and the decarburized layer. In the embodiment of the present invention, the impact resistance property at low temperature is improved by setting the average effective crystal grain diameter to 5 µm or less, setting the maximum effective crystal grain diameter to 20 µm or less, and by generating the decarburized layer on the surface, the low temperature toughness of the base material of the steel sheet is improved and the low temperature toughness at the surface layer is improved by making the oxides of $1.0 \times 10^{12}$ to $1.0 \times 10^{16}$ oxides/m$^2$ to be precipitated in the decarburized layer, and the impact resistance property at low temperature is improved by reducing the strength difference between the decarburized layer and the normal portion of the base material of the steel sheet.

In order to obtain the decarburized layer with sufficient strength, the density of oxides containing Si and/or Mn dispersed in the decarburized layer is set to $1.0 \times 10^{12}$ oxides/m$^2$ or more. In order to further improve the low temperature toughness, the density of oxides dispersed in the decarburized layer is preferably set to $3.0 \times 10^{12}$ oxides/m$^2$ or more, and is more preferably set to $5.0 \times 10^{12}$ oxides/m$^2$ or more. On the other hand, if the density of oxides dispersed in the decarburized layer exceeds $1.0 \times 10^{16}$ oxides/m$^2$, a distance between the oxides becomes excessively close, and the fracture of surface layer portion is caused by a low level of processing, which only lowers the strength of the decarburized layer, and accordingly, the low temperature toughness deteriorates. Further, the fracture of surface layer portion is caused by the low level of processing, so that a hot-dip galvanized layer on the surface layer portion is damaged.

For this reason, the density of oxides dispersed in the decarburized layer is set to $1.0 \times 10^{16}$ oxides/m² or less. In order to make the surface layer of the steel sheet have a sufficient formability, the density of oxides dispersed in the decarburized layer is preferably set to $5.0 \times 10^{15}$ oxides/m² or less, and is more preferably set to $1.0 \times 10^{15}$ oxides/m² or less.

When a size of the oxide dispersed in the decarburized layer is large, the oxide itself acts as a starting point of fracture, so that the finer the oxide is, the more the low temperature toughness is improved. For this reason, an average grain diameter of the oxides is set to 500 nm or less. In order to further increase the low temperature toughness, the average grain diameter of the oxides is preferably set to 300 nm or less, and is more preferably set to 100 nm or less. Although a lower limit of the average grain diameter of the oxides is not particularly provided, the average grain diameter of the oxides is preferably set to 30 nm or more, since there is a need to strictly control an atmosphere and a temperature in a later-described annealing step to set the diameter to less than 30 nm, which is practically difficult.

The oxides dispersed in the decarburized layer can be observed with the use of the FE-SEM by finishing a thicknesswise cross section parallel to the rolling direction to be a mirror surface. The density of oxides can be determined by observing the decarburized layer of 7 μm² with the use of the FE-SEM to count a number of the oxides, or by using an observation area required up to when 1000 oxides are counted. Further, the average grain diameter of the oxides is calculated by averaging randomly selected 100 to 1000 circle-equivalent diameters. Note that as the circle-equivalent diameter, a square root of a product of a minor axis length and a major axis length of a grain is used.

A high-strength hot-dip galvanized steel sheet of an embodiment of the present invention is produced by forming a hot-dip galvanized layer on a surface of the base steel sheet.

The hot-dip galvanized layer may also be alloyed.

In the embodiment of the present invention, the hot-dip galvanized layer or the alloyed hot-dip galvanized layer may contain one or two or more of Pb, Sb, Si, Sn, Mg, Mn, Ni, Cr, Co, Ca, Cu, Li, Ti, Be, Bi, Sr, I, Cs, and REM, or one or two or more of the elements may be mixed in the hot-dip galvanized layer or the alloyed hot-dip galvanized layer. Even if the hot-dip galvanized layer or the alloyed hot-dip galvanized layer contains one or two or more of the above-described elements, or one or two or more of the elements is (are) mixed in the hot-dip galvanized layer or the alloyed hot-dip galvanized layer, the effect of the present invention is not impaired, and there is sometimes a preferable case where the corrosion resistance and the workability are improved depending on the content of the element.

An adhesion amount of the hot-dip galvanized layer or the alloyed hot-dip galvanized layer is not particularly limited, but, it is desirably 20 g/m² or more from a point of view of the corrosion resistance, and is desirably 150 g/m² or less from a point of view of economical efficiency.

"Manufacturing Method of High-Strength Hot-Dip Galvanized Steel Sheet"

Next, a method of manufacturing the high-strength galvanized steel sheet according to an embodiment of the present invention will be described in detail.

The manufacturing method of the high-strength galvanized steel sheet according to the embodiment of the present invention is applied to a manufacture of a steel sheet in which a sheet thickness of base steel sheet is 0.6 mm or more and less than 5.0 mm. If the sheet thickness of the base steel sheet is less than 0.6 mm, it becomes difficult to keep a shape of the base steel sheet flat, which is not appropriate. Further, if the sheet thickness of the base steel sheet is 5.0 mm or more, it becomes difficult to perform control of cooling. Further, if the sheet thickness is 5.0 mm or more, a distortion in accordance with bending is not sufficient, and a fine dispersion of bainite becomes difficult, resulting in that it becomes difficult to produce a predetermined microstructure.

In order to manufacture the high-strength hot-dip galvanized steel sheet according to the embodiment of the present invention, a steel sheet to be a base steel sheet is firstly manufactured. In order to manufacture the steel sheet, a slab containing the above-described chemical components (composition) is firstly casted. As the slab subjected to hot rolling, it is possible to employ a continuously cast slab or a slab manufactured by a thin slab caster or the like. The manufacturing method of the high-strength galvanized steel sheet according to the embodiment of the present invention is compatible with a process like continuous casting-direct rolling (CC-DR) in which hot rolling is performed right after the casting.

"Hot-Rolling Step"

In a hot-rolling step, a heating temperature of slab is set to 1080° C. or more to suppress an anisotropy of crystal orientation caused by casting. The heating temperature of slab is more preferably set to 1180° C. or more. Although an upper limit of the heating temperature of slab is not particularly determined, it is preferably set to 1300° C. or less since a large amount of energy has to be input to perform heating at a temperature exceeding 1300° C.

After heating the slab, hot rolling is conducted. In the embodiment of the present invention, the hot rolling in which a completion temperature of the hot rolling is set to 850° C. to 950° C., and a rolling reduction in a temperature region of 1050° C. to the hot-rolling completion temperature is set to fall within a range of satisfying the following (expression 1), is conducted to obtain a hot-rolled steel sheet.

[Mathematical expression 2]

$$0.10 \leq \left\{ \sum_{i=1}^{N} \left( \frac{5.20 \times 10^{-6} \cdot T_i^3 - 1.06 \times 10^{-2} \cdot T_i^2 +}{1.68 \times 10 \cdot T_i - 5.67 \times 10^3} \right)^2 \cdot \left( \frac{h_{i-1}}{h_i} \right)^2 \cdot \exp\left( -\frac{2.20 \times 10^4}{T_i} \right) \cdot t_i \right\}^{0.5} \leq 1.00 \quad (1)$$

In the (expression 1), N indicates a total number of passes from a start of the hot rolling to a completion of the hot rolling, i indicates an order of pass, $T_i$ indicates a rolling temperature (° C.) at i-th pass, $h_i$ indicates a sheet thickness after processing (mm) at the i-th pass, and $t_i$ indicates an elapsed time from the i-th pass to a next pass. Note that when i equals to 1, h0 equals to a slab thickness. Further, an elapsed time from a final pass to a next pass is set to an elapsed time from the final pass to a point of time at which cooling is started after the completion of hot rolling.

If a value of the above-described (expression 1) exceeds 1.00, a crystal grain diameter of the hot-rolled steel sheet becomes coarse, and a crystal grain diameter after cold rolling and annealing becomes coarse, resulting in that the effective crystal grain diameter of the high-strength galvanized steel sheet is made to be coarse. For this reason, the value of the (expression 1) is set to 1.00 or less. In order to make the effective crystal grain diameter of the high-strength galvanized steel sheet to be fine to improve the low temperature toughness, the value of the (expression 1) is preferably set to 0.90 or less, and is more preferably set to 0.80 or less.

On the other hand, if the value of the (expression 1) is less than 0.10, a recrystallization of austenite in the steel sheet does not sufficiently proceed in the hot-rolling step, a structure that stretches in the rolling direction is produced, and the structure remains in a microstructure after cold rolling and annealing, resulting in that the effective crystal grain diameter of the base steel sheet in the rolling direction becomes coarse. For this reason, the value of the (expression 1) is set to 0.10 or more. In order to make the effective crystal grain diameter of the high-strength galvanized steel sheet to be fine to further improve the low temperature toughness, the value of the (expression 1) is preferably set to 0.20 or more, and is more preferably set to 0.30 or more. Accordingly, it is possible to improve the low temperature toughness which is one of factors of improving the impact resistance property at low temperature.

An average cooling rate up to when the hot-rolled steel sheet after being subjected to the hot rolling is coiled into a coil is preferably set to 10° C./second or more. This is for making a transformation proceed at lower temperature so that the grain diameter of the hot-rolled steel sheet is made to be fine to make the effective crystal grain diameter of the base steel sheet after cold rolling and annealing to be fine.

A coiling temperature of the hot-rolled steel sheet is preferably set to not less than 500° C. nor more than 650° C. This is for making the effective crystal grain of the base steel sheet after annealing to be fine by dispersing perlite and/or cementite having a major axis of 1 µm or more in the microstructure of the hot-rolled steel sheet, localizing a distortion introduced by the cold rolling, and by causing a reverse transformation into austenite with various crystal orientations in an annealing step. If the coiling temperature is less than 500° C., there is a case where perlite and/or cementite are (is) not generated, which is not favorable. On the other hand, if the coiling temperature exceeds 650° C., each of perlite and ferrite is generated in a long band shape in the rolling direction, and the effective crystal grain of the base steel sheet generated from the ferrite part after the cold rolling and the annealing tends to be coarse in which it stretches in the rolling direction, which is not favorable.

Next, it is preferable to perform pickling of the hot-rolled steel sheet manufactured as above. An oxide on the surface of the hot-rolled steel sheet is removed by the pickling, so that the pickling is important to improve a platability of the base steel sheet. The pickling may be performed one time or a plurality of times separately.

"Cold-Rolling Step"

Next, cold rolling is performed on the hot-rolled steel sheet after being subjected to the pickling, to thereby obtain a cold-rolled steel sheet. The cold rolling is conducted so that a total reduction ratio becomes not less than 30% nor mote than 75%. If the reduction ratio of the cold rolling is less than 30%, there is a case where a sufficient distortion is not accumulated in the steel sheet, a recrystallization does not sufficiently proceed in the annealing step after the cold rolling, a structure left as it is after processing remains, and a coarse effective crystal grain that stretches in the rolling direction is generated. In order to sufficiently accumulate the distortion through the cold rolling, the total reduction ratio is preferably set to 33% or more, and is more preferably set to 36% or more. On the other hand, if the total reduction ratio exceeds 75%, a risk of fracture of the steel sheet during the cold rolling becomes high, so that the total reduction ratio is set to 75% or less. From this point of view, the total reduction ratio is preferably set to 70% or less, and is more preferably set to 65% or less. Note that the cold rolling is preferably performed by a plurality of passes, in which a number of passes of the cold rolling and a distribution of reduction ratio with respect to each pass are not particularly limited.

"Annealing Step"

In the embodiment of the present invention, annealing is performed on the cold-rolled steel sheet. In the embodiment of the present invention, it is preferable that a continuous annealing plating line having a preheating zone, a reduction zone, and a plating zone is used, in which the steel sheet is made to pass through the preheating zone and the reduction zone while conducting the annealing step, the annealing step is completed up to when the steel sheet reaches the plating zone, and a plating step is conducted in the plating zone.

In the annealing step, there is performed annealing in which the cold-rolled steel sheet is made to pass through the preheating zone in which heating is performed by using mixed gas whose air ratio being a ratio between "a volume of air contained in the mixed gas per unit volume" and "a volume of air which is theoretically required to cause complete combustion of fuel gas contained in the mixed gas per unit volume" in the mixed gas of air and fuel gas used for a preheating burner, is 0.7 to 1.2, to generate an oxide coating film on a surface layer portion, the steel sheet is made to pass through the reduction zone in an atmosphere in which a partial pressure ratio between $H_2O$ and $H_2$ ($P(H_2O)/P(H_2)$) is 0.0001 to 2.00 at a maximum heating temperature of Ac3 point—50° C. or more to reduce the oxide coating film to form a decarburized layer, and bending with a bending radius of 800 mm or less is performed one time or more while applying a tension of 3 to 100 MPa, while performing cooling in a temperature region of 740° C. to 500° C. at an average cooling rate of 1.0° C./s or more.

The atmosphere of the preheating zone is only required to have the air ratio being the ratio between "the volume of air contained in the mixed gas per unit volume" and "the volume of air which is theoretically required to cause complete combustion of the fuel gas contained in the mixed gas per unit volume" in the mixed gas of the air and the fuel gas used for the preheating burner of 0.7 to 1.2, and the atmosphere may be any of an oxidation atmosphere, a non-oxidation atmosphere, and a direct reduction atmosphere.

When the cold-rolled steel sheet is made to pass through the preheating zone, an Fe-oxide coating film with a predetermined thickness is formed on a surface layer portion of the cold-rolled steel sheet. By setting the air ratio being the ratio between "the volume of air contained in the mixed gas per unit volume" and "the volume of air which is theoretically required to cause complete combustion of the fuel gas contained in the mixed gas per unit volume" in the mixed gas of the air and the fuel gas used for the preheating burner to 0.7 to 1.2, the Fe-oxide coating film of 0.01 to 20 µm is formed on the surface layer of the cold-rolled steel sheet. The Fe-oxide coating film is functioned as an oxygen supply source by being reduced in the reduction zone to generate Si and/or Mn oxides.

If the volume ratio between the air and the fuel gas in the mixed gas used for heating the preheating zone exceeds 1.2, the Fe-oxide coating film is excessively grown on the surface layer portion of the cold-rolled steel sheet, resulting in that a thickness of the decarburized layer of the base steel sheet obtained after the annealing becomes excessively thick. Further, if the volume ratio between the air and the fuel gas exceeds 1.2, the density of oxides dispersed in the decarburized layer sometimes becomes too large. Further, if the volume ratio between the air and the fuel gas exceeds 1.2, there is a case where the excessively grown Fe-oxide coating film is not reduced in the reduction zone, and is remained as it is, namely, as the oxide coating film with a thick film thickness, which impairs the platability of the base steel sheet.

Further, if the air ratio being the ratio between "the volume of air contained in the mixed gas per unit volume" and "the volume of air which is theoretically required to cause complete combustion of the fuel gas contained in the mixed gas per unit volume" in the mixed gas of the air and the fuel gas used for the preheating burner of the preheating zone is less than 0.7, the Fe-oxide coating film does not sufficiently grow on the surface layer portion of the cold-rolled steel sheet, and there is a possibility that the decarburized layer with a sufficient thickness is not formed on the base steel sheet. Further, if the air ratio is less than 0.7, there is a case where the density of oxides dispersed in the decarburized layer becomes insufficient.

A heating rate in the annealing step exerts an influence on a recrystallization behavior in the steel sheet. When the recrystallization is made to sufficiently proceed, it is possible to make a crystal grain diameter of reverse-transformed austenite to be fine, resulting in that the effective crystal grain diameter of the base steel sheet obtained after the annealing becomes fine. Further, when the recrystallization is made to proceed, it is possible to make a crystal grain diameter of ferrite which remains without being reverse-transformed to be fine. For making the recrystallization proceed, a heating rate at 600 to 750° C. is particularly important, and it is preferable to set an average heating rate in this temperature region to 20° C./second or less.

In the reduction zone, the Fe-oxide coating film generated in the preheating zone is reduced to form the decarburized layer, and Si and/or Mn oxides with a moderate average grain diameter are dispersed in the decarburized layer at a moderate density. For this reason, a ratio $P(H_2O)/P(H_2)$ between a water vapor partial pressure $P(H_2O)$ and a hydrogen partial pressure $P(H_2)$ in an atmosphere of the reduction zone is set to 0.0001 to 2.00. The $P(H_2O)/P(H_2)$ is preferably set to fall within a range of 0.001 to 1.50, and is more preferably set to fall within a range of 0.002 to 1.20.

Further, if the atmosphere $P(H_2O)/P(H_2)$ of the reduction zone is less than 0.0001, there is a case where oxides are generated on a surface of the steel sheet, and it becomes difficult to disperse predetermined oxides in the inside of the decarburized layer. Further, if the $P(H_2O)/P(H_2)$ exceeds 2.00, there is a case where the decarburization excessively proceeds, and a thickness of the decarburized layer cannot be controlled to fall within a predetermined range.

A temperature reaches a maximum heating temperature in the annealing step, in the reduction zone. If the maximum heating temperature is low, the reverse transformation into austenite does not sufficiently proceed, and the volume fraction of ferrite becomes excessively large. In order to reduce an amount of retained austenite, and to secure a sufficient volume fraction of hard structures, the maximum heating temperature is set to (Ac3 point—50° C. or more, and is preferably set to (Ac3 point—35)° C. or more. Although an upper limit of the maximum heating temperature is not particularly provided, heating at a temperature exceeding 1000° C. significantly impairs an appearance quality of surface and deteriorates a wettability of plating of the base steel sheet, so that the maximum heating temperature is preferably set to 1000° C. or less, and is more preferably set to 950° C. or less.

After that, in order to make the effective crystal grain diameter of the base steel sheet obtained after the annealing to be fine, cooling is conducted at an average cooling rate of 1.0° C./second or more in a temperature region of 740° C. to 500° C. for suppressing ferrite transformation and to make a transformation temperature as low as possible. In order to sufficiently suppress the ferrite transformation, the average cooling rate in the temperature region of 740° C. to 500° C. is preferably set to 2.5° C./second or more, and is more preferably set to 4.0° C./second or more. Although an upper limit of the average cooling rate in the temperature region of 740° C. to 500° C. is not particularly provided, an excessively large average cooling rate is not preferable since a special cooling facility and a coolant which does not interfere with the plating step become required to obtain the excessively large average cooling rate. From this point of view, the average cooling rate in the above-described temperature region is preferably set to 150° C./second or less, and is more preferably set to 100° C./second or less.

Further, in the temperature region of 740° C. to 500° C., bending with a bending radius of 800 mm or less is performed one time or more while applying a tension of 3 to 100 MPa. Accordingly, a nucleation of crystal grains with different crystal orientations is facilitated in the cold-rolled steel sheet to be the base steel sheet, so that the effective crystal grain diameter of the base steel sheet obtained after the annealing becomes finer.

When performing the bending, the tension (tensile stress) of not less than 3 MPa nor more than 100 MPa in which the rolling direction is set as a tension axis is applied. If the tension is less than 3 MPa, an effect of facilitating the nucleation cannot be recognized, so that 3 MPa is set to a lower limit. In order to further facilitate the nucleation to make the effective crystal grain diameter to be fine, the tension is preferably set to 5 MPa or more, and is more preferably set to 7 MPa or more. On the other hand, if the tension exceeds 100 MPa, there is a case where the steel sheet is largely deformed by performing the bending, so that the tension is set to 100 MPa or less. In order to further reduce the deformation of the steel sheet, the tension is preferably set to 70 MPa or less, and is more preferably set to 50 MPa or less. By this bending, it is possible to make the crystal grain to be finer, namely, it is possible to realize the average effective crystal grain diameter of 5 μm or less, and the maximum effective crystal grain diameter of 20 μm or less, and to make the oxides of $1.0 \times 10^{12}$ to $1.0 \times 10^{16}$ oxides/m$^2$ precipitate in the decarburized layer so that the difference between the strength of the decarburized layer and the strength of the normal portion of the base material of the steel sheet can be reduced.

In the bending, for example, processing with a bending radius of 800 mm or less is conducted by using a roll with a radius of 800 mm or less. The larger the degree of processing is, the more the nucleation is facilitated, so that the bending radius is preferably set to 650 mm or less. On the other hand, although a lower limit of the bending radius is not particularly set, it is difficult to homogeneously bend the entire area of the steel sheet with an excessively small radius, so that the bending radius is preferably set to 50 mm or more, and is more preferably set to 100 mm or more.

A number of times of the bending is set to one time or more, and is preferably set to two times or more since the larger the degree of processing is, the more the nucleation is facilitated. Although an upper limit of the number of times of the bending is not particularly determined, it is preferably set to 20 times or less, since it is difficult to conduct the bending of 20 times or more within a retention time in the above-described temperature region.

"Plating Step"

Next, the base steel sheet obtained as above is immersed in a plating bath. The plating bath has a composition mainly containing zinc, and in which an effective Al amount being a value as a result of subtracting a total Fe amount from a total Al amount in the plating bath is 0.01 to 0.18 mass %. Particularly, when alloying treatment is performed after the plating step, the effective Al amount in the plating bath is preferably set to 0.07 to 0.12 mass % to control a progress of alloying of a hot-dip galvanized layer.

Further, when the plating layer is not alloyed, there is no problem even if the effective Al amount in the bath is in a range of 0.18 to 0.30 mass %.

The plating bath may also be one in which one or two or more of elements of Pb, Sb, Si, Sn, Mg, Mn, Ni, Cr, Co, Ca, Cu, Li, Ti, Be, Bi, Sr, I, Cs, and REM, is (are) mixed, and there is sometimes a preferable case where the corrosion resistance and the workability of the hot-dip galvanized layer are improved depending on the contents of the respective elements.

Further, a temperature of the plating bath is preferably set to 450° C. to 470° C. If the plating bath temperature is less than 450° C., a viscosity of the plating bath is increased too much, resulting in that it becomes difficult to control a thickness of the plating layer, and an external appearance of the steel sheet is impaired. On the other hand, if the plating bath temperature exceeds 470° C., a large amount of fumes is generated, and it becomes difficult to realize safe manufacture, so that the plating bath temperature is preferably 470° C. or less.

Further, if a steel sheet temperature when the steel sheet enters the plating bath is less than 430° C., it becomes required to give a large heat quantity to the plating bath to stabilize the plating bath temperature to 450° C. or more, which is practically inappropriate. On the other hand, if the steel sheet temperature when the steel sheet enters the plating bath is more than 490° C., it is required to introduce a facility of removing a large heat quantity from the plating bath to stabilize the plating bath temperature to 470° C. or less, which is inappropriate in terms of manufacturing costs. Accordingly, in order to stabilize the bath temperature of the plating bath, the temperature of the base steel sheet when the base steel sheet enters the plating bath is preferably set to 430° C. to 490° C.

Further, in the present embodiment, it is preferable to perform a bainite transformation process of retaining, before and/or after immersing the base steel sheet in the plating bath, the base steel sheet in a temperature range of 300 to 470° C. for 10 to 1000 seconds, for the purpose of making a bainite transformation proceed. When the alloying treatment is conducted after the plating step, the bainite transformation process may be performed before or after the alloying treatment.

Note that when a temperature in the bainite transformation process is 430° C. or less, there is a case where a large amount of carbon is concentrated in non-transformed austenite in accordance with the progress of bainite transformation, and a volume fraction of retained austenite remained in the steel sheet after cooling the steel sheet to the room temperature becomes large. A solid solution carbon amount in austenite is reduced by performing reheating at a temperature higher than a temperature at which the bainite transformation occurs. For this reason, when the temperature in the bainite transformation process is 430° C. or less, it is preferable that the bainite transformation process is limited to be performed before immersing the base steel sheet in the plating bath, and by utilizing the reheating of the base steel sheet to the temperature of the plating bath, the solid solution carbon amount in the non-transformed austenite is reduced, and the amount of retained austenite remained in the steel sheet after cooling the steel sheet to the room temperature is reduced.

There is no problem even if alloying treatment of a hot-dip galvanized layer is conducted after immersing the steel sheet in the plating bath. The alloying does not sufficiently proceed at a temperature less than 470° C., so that an alloying treatment temperature is set to 470° C. or more. Further, if the alloying treatment temperature exceeds 620° C., coarse cementite is generated and the strength is significantly lowered, so that the alloying treatment temperature is set to 620° C. or less. The alloying treatment temperature is preferably set to 480 to 600° C., and is more preferably set to 490 to 580° C.

In order to make the alloying of the hot-dip galvanized layer sufficiently proceed, an alloying treatment time is set to 2 seconds or more, and is preferably set to 5 seconds or more. On the other hand, if the alloying treatment time exceeds 200 seconds, there is a concern that overalloying of plating layer occurs, and properties deteriorate. For this reason, the alloying treatment time is set to 200 seconds or less, and is more preferably set to 100 seconds or less.

Note that the alloying treatment is preferably performed right after the base steel sheet is immersed in the plating bath, but, there is no problem even if the base steel sheet is immersed in the plating bath, and then after a temperature of the obtained hot-dip galvanized steel sheet is lowered to 150° C. or less, the steel sheet is reheated to the alloying treatment temperature to conduct the alloying treatment.

Further, it is preferable that an average cooling rate up to when a temperature of the hot-dip galvanized steel sheet or the alloyed hot-dip galvanized steel sheet obtained after the plating step or after the alloying treatment becomes 150° C. or less, is set to 0.5° C./second or more. This is because if the cooling rate is less than 0.5° C./second, when the non-transformed austenite remains in the hot-dip galvanized steel sheet or the alloyed hot-dip galvanized steel sheet, the bainite transformation proceeds in the non-transformed austenite, and a concentration of carbon in austenite proceeds, so that there is a case where the volume fraction of retained austenite obtained after cooling is performed to the room temperature exceeds 5%. From this point of view, the above-described average cooling rate is more preferably set to 1.0° C./second or more.

Note that there is no problem even if reheat treatment is conducted for the purpose of tempering martensite in the middle of the cooling or after the cooling of the hot-dip galvanized steel sheet or the alloyed hot-dip galvanized steel sheet obtained after the plating step or after the alloying treatment. If a heating temperature when performing the reheat treatment is less than 200° C., the tempering does not sufficiently proceed, so that the heating temperature is preferably set to 200° C. or more. Further, if the temperature in the reheat treatment exceeds 620° C., the strength significantly deteriorates, so that the temperature is preferably set to 620° C. or less, and is more preferably set to 550° C. or less.

Note that the present invention is not limited to the above-described embodiments.

For example, in the embodiments of the present invention, there is no problem even if a coating film made of a composite oxide containing a P oxide and/or P is given to a surface of the galvanized layer of the galvanized steel sheet obtained by the aforementioned method.

The coating film made of the composite oxide containing the phosphorus oxide and/or phosphorus can be functioned as a lubricant when performing processing on the steel sheet, resulting in that the galvanized layer formed on the surface of the base steel sheet can be protected.

Further, in the present embodiment, there is no problem even if cold rolling is performed on the high-strength galvanized steel sheet cooled to the room temperature, at a reduction ratio of 3.00% or less for the purpose of shape correction.

EXAMPLES

Examples of the present invention will be described.

Slabs containing chemical components (composition) of A to AC presented in Table 1 to Table 3 were cast, hot rolling was performed under conditions (slab heating temperature, hot-rolling completion temperature, rolling reduction in temperature region of 1050° C. to hot-rolling completion temperature) presented in Table 4 to Table 8, and coiling was performed at temperatures presented in Table 4 to Table 8, thereby obtaining hot-rolled steel sheets.

After that, pickling was performed on the hot-rolled steel sheets, and cold rolling under a condition (reduction ratio) presented in Table 4 to Table 8 was performed, thereby obtaining cold-rolled steel sheets.

TABLE 1

| CHEMICAL COMPONENT | C MASS % | Si MASS % | Mn MASS % | P MASS % | S MASS % | Al MASS % | N MASS % | O MASS % | |
|---|---|---|---|---|---|---|---|---|---|
| A | 0.213 | 0.54 | 1.84 | 0.0145 | 0.0060 | 0.043 | 0.0030 | 0.0005 | EXAMPLE |
| B | 0.094 | 1.44 | 2.31 | 0.0114 | 0.0026 | 0.041 | 0.0033 | 0.0004 | EXAMPLE |
| C | 0.174 | 1.87 | 1.87 | 0.0176 | 0.0028 | 0.064 | 0.0049 | 0.0013 | EXAMPLE |
| D | 0.087 | 1.00 | 2.41 | 0.0121 | 0.0028 | 0.024 | 0.0037 | 0.0023 | EXAMPLE |
| E | 0.335 | 0.64 | 2.10 | 0.0160 | 0.0023 | 0.130 | 0.0042 | 0.0014 | EXAMPLE |
| F | 0.119 | 0.45 | 2.55 | 0.0091 | 0.0053 | 0.228 | 0.0055 | 0.0008 | EXAMPLE |
| G | 0.264 | 0.07 | 2.91 | 0.0082 | 0.0060 | 1.139 | 0.0063 | 0.0022 | EXAMPLE |
| H | 0.135 | 1.37 | 1.34 | 0.0130 | 0.0053 | 0.018 | 0.0041 | 0.0018 | EXAMPLE |
| I | 0.239 | 1.66 | 1.58 | 0.0122 | 0.0010 | 0.006 | 0.0051 | 0.0007 | EXAMPLE |
| J | 0.172 | 0.58 | 2.70 | 0.0060 | 0.0042 | 0.747 | 0.0061 | 0.0007 | EXAMPLE |
| K | 0.244 | 0.52 | 0.95 | 0.0084 | 0.0047 | 0.576 | 0.0038 | 0.0023 | EXAMPLE |
| L | 0.119 | 1.43 | 1.55 | 0.0107 | 0.0029 | 0.022 | 0.0022 | 0.0011 | EXAMPLE |
| M | 0.142 | 0.98 | 1.93 | 0.0146 | 0.0047 | 0.069 | 0.0024 | 0.0004 | EXAMPLE |
| N | 0.239 | 1.11 | 2.38 | 0.0207 | 0.0038 | 0.042 | 0.0018 | 0.0022 | EXAMPLE |
| O | 0.203 | 1.80 | 0.89 | 0.0152 | 0.0006 | 0.025 | 0.0055 | 0.0018 | EXAMPLE |
| P | 0.178 | 0.70 | 1.76 | 0.0097 | 0.0039 | 0.231 | 0.0029 | 0.0025 | EXAMPLE |
| Q | 0.196 | 0.89 | 1.11 | 0.0048 | 0.0004 | 0.142 | 0.0053 | 0.0013 | EXAMPLE |
| R | 0.224 | 0.73 | 1.93 | 0.0116 | 0.0052 | 0.354 | 0.0026 | 0.0016 | EXAMPLE |
| S | 0.115 | 1.26 | 1.72 | 0.0103 | 0.0027 | 0.073 | 0.0021 | 0.0010 | EXAMPLE |
| T | 0.177 | 1.91 | 1.25 | 0.0096 | 0.0024 | 0.020 | 0.0024 | 0.0023 | EXAMPLE |
| U | 0.167 | 0.45 | 2.80 | 0.0147 | 0.0052 | 0.379 | 0.0038 | 0.0023 | EXAMPLE |
| V | 0.168 | 0.14 | 2.02 | 0.0187 | 0.0046 | 0.736 | 0.0037 | 0.0012 | EXAMPLE |
| W | 0.088 | 0.69 | 1.35 | 0.0105 | 0.0062 | 0.054 | 0.0041 | 0.0004 | EXAMPLE |
| X | 0.278 | 0.25 | 3.17 | 0.0117 | 0.0017 | 1.021 | 0.0041 | 0.0020 | EXAMPLE |
| Y | 0.210 | 0.95 | 1.96 | 0.0157 | 0.0027 | 0.072 | 0.0057 | 0.0019 | EXAMPLE |
| Z | 0.178 | 1.14 | 2.06 | 0.0075 | 0.0031 | 0.048 | 0.0042 | 0.0006 | EXAMPLE |
| AA | 0.176 | 0.89 | 2.31 | 0.0078 | 0.0043 | 0.044 | 0.0020 | 0.0009 | EXAMPLE |
| AB | 0.162 | 0.44 | 1.97 | 0.0078 | 0.0013 | 0.660 | 0.0019 | 0.0025 | EXAMPLE |
| AC | 0.124 | 0.94 | 2.13 | 0.0103 | 0.0036 | 0.066 | 0.0032 | 0.0006 | EXAMPLE |
| AD | 0.234 | 1.28 | 1.64 | 0.0071 | 0.0045 | 0.074 | 0.0019 | 0.0022 | EXAMPLE |
| AE | 0.061 | 1.28 | 2.25 | 0.0101 | 0.0043 | 0.036 | 0.0056 | 0.0018 | COMPARATIVE EXAMPLE |
| AF | 0.473 | 1.32 | 2.17 | 0.0091 | 0.0039 | 0.042 | 0.0048 | 0.0015 | COMPARATIVE EXAMPLE |
| AG | 0.184 | 1.26 | 0.12 | 0.0109 | 0.0036 | 0.037 | 0.0044 | 0.0013 | COMPARATIVE EXAMPLE |
| BA | 0.186 | 2.91 | 2.49 | 0.017 | 0.0042 | 0.028 | 0.0023 | 0.0009 | COMPARATIVE EXAMPLE |
| BB | 0.154 | 0.00 | 2.31 | 0.016 | 0.0022 | 0.019 | 0.0024 | 0.0013 | COMPARATIVE EXAMPLE |
| BC | 0.188 | 0.94 | 4.20 | 0.013 | 0.0038 | 0.106 | 0.0044 | 0.0011 | COMPARATIVE EXAMPLE |
| BD | 0.181 | 0.74 | 2.59 | 0.008 | 0.0045 | 2.57 | 0.0032 | 0.0015 | COMPARATIVE EXAMPLE |
| BE | 0.103 | 2.26 | 3.88 | 0.005 | 0.0008 | 0.068 | 0.0023 | 0.0003 | COMPARATIVE EXAMPLE |

TABLE 2

| CHEMICAL COMPONENT | Ti MASS % | Nb MASS % | V MASS % | Cr MASS % | Ni MASS % | Cu MASS % | Mo MASS % | B MASS % | W MASS % | |
|---|---|---|---|---|---|---|---|---|---|---|
| A | | | | | | | | | | EXAMPLE |
| B | | | | | | | | | | EXAMPLE |
| C | | | | | | | | | | EXAMPLE |
| D | | | | | | | | | | EXAMPLE |
| E | | | | | | | | | | EXAMPLE |
| F | 0.016 | 0.008 | | | | | | | | EXAMPLE |
| G | | | | | | | 0.14 | 0.0007 | | EXAMPLE |
| H | | | | | | | | | | EXAMPLE |

TABLE 2-continued

| CHEMICAL COMPONENT | Ti MASS % | Nb MASS % | V MASS % | Cr MASS % | Ni MASS % | Cu MASS % | Mo MASS % | B MASS % | W MASS % | |
|---|---|---|---|---|---|---|---|---|---|---|
| I | | | | | 0.50 | 0.69 | | | | EXAMPLE |
| J | | | 0.110 | | | | | | | EXAMPLE |
| K | | | | | | | 0.26 | | | EXAMPLE |
| L | | | | | | 0.29 | | | | EXAMPLE |
| M | 0.059 | | | | | | | 0.0010 | | EXAMPLE |
| N | | | | | | | | | | EXAMPLE |
| O | | | | 1.24 | | | | | | EXAMPLE |
| P | | | | | | | | | | EXAMPLE |
| Q | | | | | 0.80 | | | | | EXAMPLE |
| R | 0.003 | 0.054 | | | | | | 0.0017 | | EXAMPLE |
| S | 0.085 | | | | | | | | | EXAMPLE |
| T | | | | 0.25 | | | 0.05 | | | EXAMPLE |
| U | | | | | | | | | | EXAMPLE |
| V | | | | 0.88 | | | | | | EXAMPLE |
| W | | | | | 0.28 | 0.10 | | | | EXAMPLE |
| X | | | | | | | | 0.0043 | | EXAMPLE |
| Y | | | | | | | | | | EXAMPLE |
| Z | | | | | | | | | | EXAMPLE |
| AA | | | | | | | | | | EXAMPLE |
| AB | | | | | | | | | 0.11 | EXAMPLE |
| AC | | 0.039 | | | | | | | | EXAMPLE |
| AD | | | | | | | | | | EXAMPLE |
| AE | | | | | | | | | | COMPARATIVE EXAMPLE |
| AF | | | | | | | | | | COMPARATIVE EXAMPLE |
| AG | | | | | | | | | | COMPARATIVE EXAMPLE |
| BA | | | | | | | | | | COMPARATIVE EXAMPLE |
| BB | | | | | | | | | | COMPARATIVE EXAMPLE |
| BC | | | | | | | | | | COMPARATIVE EXAMPLE |
| BD | | | | | | | | | | COMPARATIVE EXAMPLE |
| BE | | | | | | | | | | COMPARATIVE EXAMPLE |

TABLE 3

| CHEMICAL COMPONENT | Ca MASS % | Ce MASS % | Mg MASS % | Zr MASS % | La MASS % | REM MASS % | |
|---|---|---|---|---|---|---|---|
| A | | | | | | | EXAMPLE |
| B | | | | | | | EXAMPLE |
| C | | | | | | | EXAMPLE |
| D | | | | | | | EXAMPLE |
| E | | | | | | | EXAMPLE |
| F | | | | | | | EXAMPLE |
| G | | | | | | | EXAMPLE |
| H | | | 0.0015 | | | | EXAMPLE |
| I | | 0.0038 | | | | | EXAMPLE |
| J | | | | | | | EXAMPLE |
| K | | | | | | | EXAMPLE |
| L | | | | | | | EXAMPLE |
| M | 0.0012 | | | | | | EXAMPLE |
| N | 0.0026 | | | | | | EXAMPLE |
| O | | | | | | | EXAMPLE |
| P | | 0.0040 | | | | | EXAMPLE |
| Q | | | | | | | EXAMPLE |
| R | | 0.0008 | | | | | EXAMPLE |
| S | | | | | | | EXAMPLE |
| T | | | | | | | EXAMPLE |
| U | | | | 0.0027 | | | EXAMPLE |
| V | | | | | | | EXAMPLE |
| W | | 0.0015 | | | | | EXAMPLE |
| X | | | | | | | EXAMPLE |
| Y | | | | | 0.0030 | | EXAMPLE |
| Z | 0.0016 | 0.0009 | | | | | EXAMPLE |
| AA | | | | | | 0.0018 | EXAMPLE |
| AB | | | | | | | EXAMPLE |
| AC | | | | | | | EXAMPLE |
| AD | | 0.0041 | | | | | EXAMPLE |

TABLE 3-continued

| CHEMICAL COMPONENT | Ca MASS % | Ce MASS % | Mg MASS % | Zr MASS % | La MASS % | REM MASS % | |
|---|---|---|---|---|---|---|---|
| AE | | | | | | | COMPARATIVE EXAMPLE |
| AF | | | | | | | COMPARATIVE EXAMPLE |
| AG | | | | | | | COMPARATIVE EXAMPLE |
| BA | | | | | | | COMPARATIVE EXAMPLE |
| BB | | | | | | | COMPARATIVE EXAMPLE |
| BC | | | | | | | COMPARATIVE EXAMPLE |
| BD | | | | | | | COMPARATIVE EXAMPLE |
| BE | | | | | | | COMPARATIVE EXAMPLE |

TABLE 4

| | | HOT-ROLLING STEP | | | | | COLD-ROLLING |
|---|---|---|---|---|---|---|---|
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | STEP REDUCTION RATIO % |
| 1 | A | 1265 | 0.70 | 941 | 31 | 578 | 65 |
| 2 | A | 1210 | 0.77 | 905 | 25 | 602 | 48 |
| 3 | A | 1235 | 0.85 | 907 | 49 | 549 | 39 |
| 4 | A | 1235 | 0.25 | 935 | 26 | 541 | 57 |
| 5 | B | 1260 | 0.75 | 910 | 15 | 604 | 45 |
| 6 | B | 1205 | 0.55 | 908 | 46 | 537 | 53 |
| 7 | B | 1185 | 0.28 | 944 | 32 | 562 | 45 |
| 8 | B | 1255 | 0.35 | 915 | 14 | 623 | 43 |
| 9 | C | 1270 | 0.68 | 943 | 21 | 600 | 61 |
| 10 | C | 1270 | 0.55 | 925 | 19 | 549 | 50 |
| 11 | C | 1200 | 0.64 | 887 | 45 | 564 | 56 |
| 12 | C | 1210 | 0.76 | 910 | 60 | 562 | 47 |
| 13 | D | 1205 | 0.32 | 920 | 21 | 575 | 50 |
| 14 | D | 1245 | 0.73 | 928 | 52 | 526 | 50 |
| 15 | D | 1215 | 0.50 | 898 | 26 | 547 | 43 |
| 16 | D | 1270 | 0.52 | 932 | 47 | 526 | 57 |
| 17 | E | 1250 | 0.56 | 922 | 33 | 592 | 45 |
| 18 | E | 1235 | 0.56 | 919 | 29 | 570 | 48 |
| 19 | E | 1190 | 0.58 | 927 | 23 | 590 | 53 |
| 20 | E | 1230 | 0.54 | 930 | 50 | 603 | 56 |
| 21 | F | 1220 | 0.94 | 937 | 20 | 607 | 48 |
| 22 | F | 1220 | 0.80 | 936 | 48 | 585 | 50 |
| 23 | F | 1265 | 0.18 | 880 | 16 | 580 | 50 |
| 24 | F | 1240 | 0.42 | 946 | 63 | 565 | 53 |
| 25 | G | 1205 | 0.78 | 942 | 19 | 626 | 50 |
| 26 | G | 1220 | 0.57 | 902 | 33 | 590 | 48 |
| 27 | G | 1235 | 0.74 | 942 | 24 | 573 | 54 |
| 28 | G | 1265 | 0.57 | 946 | 20 | 535 | 48 |
| 29 | H | 1215 | 0.87 | 937 | 40 | 565 | 60 |
| 30 | H | 1235 | 0.42 | 923 | 21 | 572 | 47 |

TABLE 5

| | | HOT-ROLLING STEP | | | | | COLD-ROLLING |
|---|---|---|---|---|---|---|---|
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | STEP REDUCTION RATIO % |
| 31 | H | 1210 | 0.78 | 946 | 17 | 610 | 45 |
| 32 | H | 1260 | 0.78 | 923 | 33 | 579 | <u>20</u> |
| 33 | I | 1265 | 0.37 | 931 | 23 | 601 | 54 |
| 34 | I | 1240 | 0.62 | 913 | 28 | 604 | 60 |

TABLE 5-continued

| | | HOT-ROLLING STEP | | | | | COLD-ROLLING |
|---|---|---|---|---|---|---|---|
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | STEP REDUCTION RATIO % |
| 35 | I | 1240 | 0.51 | 895 | 25 | 624 | 63 |
| 36 | I | 1215 | 0.41 | 897 | 13 | 633 | 53 |
| 37 | J | 1210 | 0.52 | 935 | 20 | 558 | 65 |
| 38 | J | 1215 | 0.58 | 915 | 58 | 565 | 39 |
| 39 | J | 1270 | 0.46 | 918 | 41 | 645 | 40 |
| 40 | J | 1240 | 0.49 | 918 | 25 | 568 | 60 |
| 41 | K | 1270 | 0.39 | 946 | 54 | 590 | 50 |
| 42 | K | 1220 | 0.55 | 892 | 28 | 536 | 54 |
| 43 | K | 1230 | 0.38 | 943 | 31 | 540 | 54 |
| 44 | K | <u>1015</u> | 0.72 | 884 | 30 | 586 | 41 |
| 45 | L | 1200 | 0.48 | 912 | 34 | 596 | 48 |
| 46 | L | 1205 | 0.37 | 914 | 32 | 560 | 68 |
| 47 | L | 1205 | 0.54 | 895 | 29 | 589 | 31 |
| 48 | L | 1200 | 0.59 | 947 | 41 | 599 | 48 |
| 49 | M | 1275 | 0.57 | 926 | 21 | 604 | 60 |
| 50 | M | 1245 | 0.67 | 916 | 16 | 563 | 61 |
| 51 | M | 1260 | 0.52 | 921 | 19 | 588 | 58 |
| 52 | M | 1250 | 0.44 | 923 | 48 | 515 | 45 |
| 53 | N | 1265 | 0.35 | 920 | 33 | 571 | 37 |
| 54 | N | 1190 | 0.62 | 921 | 30 | 562 | 46 |
| 55 | N | 1185 | 0.72 | 911 | 20 | 548 | 35 |
| 56 | N | 1260 | 0.77 | 911 | 25 | 564 | <u>85</u> |
| 57 | O | 1205 | 0.42 | 916 | 61 | 553 | 42 |
| 58 | O | 1260 | 0.51 | 912 | 24 | 566 | 48 |
| 59 | O | 1255 | 0.56 | 946 | 23 | 594 | 41 |
| 60 | O | 1250 | 0.69 | 920 | 45 | 604 | 62 |

TABLE 6

| | | HOT-ROLLING STEP | | | | | COLD-ROLLING |
|---|---|---|---|---|---|---|---|
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | STEP REDUCTION RATIO % |
| 61 | P | 1185 | 0.39 | 937 | 18 | 629 | 59 |
| 62 | P | 1240 | 0.57 | 925 | 40 | 552 | 58 |
| 63 | P | 1200 | 0.51 | 950 | 17 | 634 | 60 |
| 64 | P | 1235 | 0.50 | 931 | 17 | 566 | 59 |
| 65 | Q | 1215 | 0.67 | 947 | 20 | 548 | 38 |
| 66 | Q | 1270 | 0.32 | 911 | 26 | 509 | 63 |
| 67 | Q | 1210 | 0.48 | 928 | 22 | 574 | 70 |
| 68 | Q | 1250 | 0.82 | 930 | 20 | 573 | 41 |
| 69 | R | 1235 | 0.72 | 923 | 48 | 539 | 40 |
| 70 | R | 1185 | 0.57 | 939 | 24 | 579 | 57 |
| 71 | R | 1225 | 0.57 | 879 | 50 | 587 | 67 |
| 72 | R | 1275 | 0.42 | 906 | 21 | 570 | 50 |
| 73 | S | 1240 | 0.56 | 934 | 20 | 619 | 48 |
| 74 | S | 1255 | 0.71 | 912 | 52 | 546 | 50 |
| 75 | S | 1220 | 0.60 | 940 | 24 | 544 | 39 |
| 76 | S | 1220 | 0.60 | 949 | 24 | 591 | 57 |
| 77 | T | 1205 | 0.85 | 941 | 47 | 572 | 60 |
| 78 | T | 1210 | 0.45 | 895 | 35 | 521 | 44 |
| 79 | T | 1255 | 0.47 | 910 | 27 | 554 | 53 |
| 80 | T | 1260 | 0.58 | 921 | 29 | 558 | 55 |
| 81 | U | 1205 | 0.41 | 905 | 18 | 568 | 60 |
| 82 | U | 1245 | 0.82 | 930 | 33 | 558 | 46 |
| 83 | U | 1275 | 0.23 | 920 | 50 | 576 | 43 |
| 84 | U | 1200 | 0.31 | 903 | 51 | 586 | 53 |
| 85 | V | 1250 | 0.62 | 943 | 15 | 633 | 46 |
| 86 | V | 1215 | 0.44 | 926 | 20 | 613 | 63 |
| 87 | V | 1225 | 0.50 | 887 | 27 | 548 | 50 |
| 88 | V | 1230 | 0.78 | 933 | 26 | 625 | 48 |
| 89 | W | 1200 | 0.47 | 927 | 23 | 563 | 53 |
| 90 | W | 1220 | 0.70 | 890 | 18 | 606 | 50 |

TABLE 7

| EXPERIMENTAL EXAMPLE | CHEMICAL COMPONENT | HOT-ROLLING STEP ||||| COLD-ROLLING STEP REDUCTION RATIO % |
| --- | --- | --- | --- | --- | --- | --- | --- |
| | | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | |
| 91 | W | 1255 | 0.49 | 922 | 20 | 553 | 53 |
| 92 | W | 1280 | 0.36 | 902 | 30 | 550 | 60 |
| 93 | X | 1250 | 0.47 | 918 | 31 | 584 | 44 |
| 94 | X | 1205 | 0.65 | 920 | 15 | 623 | 48 |
| 95 | X | 1185 | 0.69 | 896 | 18 | 604 | 70 |
| 96 | X | 1260 | 2.35 | 922 | 30 | 570 | 38 |
| 97 | Y | 1225 | 0.18 | 901 | 12 | 622 | 47 |
| 98 | Y | 1210 | 0.62 | 916 | 12 | 621 | 59 |
| 99 | Y | 1245 | 0.55 | 922 | 66 | 548 | 56 |
| 100 | Y | 1270 | 0.50 | 932 | 22 | 548 | 72 |
| 101 | Z | 1265 | 0.45 | 950 | 34 | 575 | 55 |
| 102 | Z | 1210 | 0.41 | 900 | 24 | 531 | 45 |
| 103 | Z | 1180 | 0.56 | 925 | 22 | 538 | 47 |
| 104 | Z | 1225 | 0.77 | 930 | 26 | 602 | 47 |
| 105 | AA | 1225 | 0.49 | 915 | 15 | 605 | 60 |
| 106 | AA | 1245 | 0.36 | 909 | 25 | 600 | 61 |
| 107 | AA | 1240 | 0.47 | 937 | 36 | 566 | 48 |
| 108 | AA | 1215 | 0.84 | 920 | 34 | 545 | 47 |
| 109 | AB | 1200 | 0.84 | 931 | 18 | 599 | 65 |
| 110 | AB | 1255 | 0.75 | 940 | 18 | 579 | 58 |
| 111 | AB | 1235 | 0.51 | 932 | 36 | 556 | 40 |
| 112 | AB | 1255 | 0.72 | 909 | 19 | 518 | 57 |
| 113 | AC | 1265 | 0.60 | 915 | 19 | 552 | 43 |
| 114 | AC | 1230 | 0.34 | 931 | 26 | 606 | 59 |
| 115 | AC | 1195 | 0.66 | 915 | 25 | 593 | 53 |
| 116 | AC | 1245 | 0.04 | 932 | 29 | 578 | 48 |
| 117 | AD | 1215 | 0.55 | 889 | 20 | 608 | 44 |
| 118 | AD | 1215 | 0.61 | 898 | 55 | 541 | 53 |
| 119 | AD | 1185 | 0.34 | 928 | 40 | 559 | 54 |
| 120 | AD | 1275 | 0.53 | 909 | 16 | 588 | 54 |

TABLE 8

| EXPERIMENTAL EXAMPLE | CHEMICAL COMPONENT | HOT-ROLLING STEP ||||| COLD-ROLLING STEP REDUCTION RATIO % |
| --- | --- | --- | --- | --- | --- | --- | --- |
| | | SLAB HEATING TEMPERATURE ° C. | EXPRESSION 1 | ROLLING COMPLETION TEMPERATURE ° C. | AVERAGE COOLING RATE ° C./SECOND | COOLING STOP TEMPERATURE ° C. | |
| 121 | AE | 1235 | 0.61 | 907 | 36 | 569 | 50 |
| 122 | AF | 1220 | 0.65 | 924 | 38 | 617 | 39 |
| 123 | AG | 1235 | 0.34 | 941 | 39 | 572 | 54 |
| 124 | BA | 1230 | 0.28 | 892 | 33 | 587 | — |
| 125 | BB | 1220 | 0.49 | 919 | 20 | 596 | 73 |
| 126 | BC | TEST STOPPED DUE TO SLAB CRACK ||||||
| 127 | BD | 1220 | 0.42 | 880 | 31 | 609 | 73 |
| 128 | BE | 1255 | 0.54 | 920 | 26 | 589 | 53 |
| 129 | A | 1195 | 0.51 | 904 | 29 | 600 | 60 |
| 130 | B | 1240 | 0.03 | 793 | 37 | 603 | — |
| 131 | B | 1300 | 1.40 | 1004 | 34 | 593 | 47 |
| 132 | H | 1245 | 0.46 | 883 | 41 | 621 | 50 |
| 133 | F | 1230 | 0.38 | 907 | 37 | 620 | 60 |

Next, annealing was conducted under conditions presented in Table 9 to Table 13 (volume ratio between air and fuel gas in mixed gas used for heating of preheating zone (air volume/fuel gas volume), heating rate at 600 to 750° C., partial pressure ratio between $H_2O$ and $H_2$ in reduction zone atmosphere ($P(H_2O)/P(H_2)$), maximum heating temperature, average cooling rate in temperature region of 740° C. to 500° C., bending conditions (tension (load stress), bending radius, number of times of bending)), thereby obtaining base steel sheets of experimental examples 1 to 133 (note that the experiment was stopped in a part of experimental examples).

TABLE 9

| EXPERIMENTAL EXAMPLE | CHEMICAL COMPONENT | STEEL TYPE | ANNEALING STEP | | | | |
|---|---|---|---|---|---|---|---|
| | | | HEATING RATE AT 600 TO 750° C. ° C./SECOND | MAXIMUM HEATING TEMPERATURE ° C. | Ac3 ° C. | MAXIMUM HEATING TEMPERATURE − Ac3 ° C. | AVERAGE COOLING RATE AT 740 TO 500° C. ° C./SECOND |
| 1 | A | GI | 4.7 | 809 | 794 | 15 | 2.5 |
| 2 | A | GI | 4.7 | 813 | 794 | 19 | 5.2 |
| 3 | A | GA | 3.8 | 781 | 794 | −13 | 12.9 |
| 4 | A | GI | 4.4 | 807 | 794 | 13 | 5.6 |
| 5 | B | GI | 2.3 | 875 | 852 | 23 | 3.1 |
| 6 | B | GI | 17.2 | 841 | 852 | −11 | 17.0 |
| 7 | B | GA | 3.9 | 855 | 852 | 3 | 5.8 |
| 8 | B | GI | 1.8 | 862 | 852 | 10 | 5.4 |
| 9 | C | GI | 3.8 | 859 | 866 | −7 | 4.5 |
| 10 | C | GA | 2.8 | 893 | 866 | 27 | 4.7 |
| 11 | C | GA | 11.3 | 853 | 866 | −13 | 4.6 |
| 12 | C | GI | 4.5 | 875 | 866 | 9 | 6.0 |
| 13 | D | GI | 3.9 | 813 | 828 | −15 | 4.5 |
| 14 | D | GI | 3.7 | 862 | 828 | 34 | 52.9 |
| 15 | D | GA | 4.3 | 842 | 828 | 14 | 6.4 |
| 16 | D | GI | 2.9 | 857 | 828 | 29 | 5.8 |
| 17 | E | GI | 2.1 | 779 | 785 | −6 | 6.2 |
| 18 | E | GA | 2.4 | 827 | 785 | 42 | 3.0 |
| 19 | E | GA | 4.0 | 758 | 785 | −27 | 18.9 |
| 20 | E | GI | 4.6 | 807 | 785 | 22 | 2.9 |
| 21 | F | GI | 2.0 | 811 | 830 | −19 | 3.3 |
| 22 | F | GI | 2.2 | 839 | 830 | 9 | 16.7 |
| 23 | F | GA | 2.3 | 834 | 830 | 4 | 4.0 |
| 24 | F | GI | 4.7 | 798 | 830 | −32 | 17.1 |
| 25 | G | GI | 4.0 | 957 | 950 | 7 | 23.7 |
| 26 | G | GA | 9.8 | 922 | 950 | −28 | 28.2 |
| 27 | G | GA | 3.0 | 930 | 950 | −20 | 5.6 |
| 28 | G | GI | 3.8 | 931 | 950 | −19 | 41.1 |
| 29 | H | GI | 4.5 | 842 | 861 | −19 | 6.4 |
| 30 | H | GI | 3.0 | 877 | 861 | 16 | 16.5 |

| EXPERIMENTAL EXAMPLE | ANNEALING STEP | | | | |
|---|---|---|---|---|---|
| | LOAD STRESS MPa | BENDING RADIUS mm | NUMBER OF TIMES OF BENDING TIMES | PREHEATING ZONE VOLUME RATIO OF AIR AND FUEL GAS | REDUCTION ZONE $P(H_2O)/P(H_2)$ |
| 1 | 10 | 450 | 5 | 1.2 | 0.005 |
| 2 | 5 | 350 | 3 | 0.7 | 0.170 |
| 3 | 11 | 400 | 4 | 1.0 | 0.004 |
| 4 | 11 | 350 | 4 | 0.8 | 0.316 |
| 5 | 8 | 550 | 2 | 1.0 | 0.110 |
| 6 | 6 | 450 | 3 | 1.0 | 0.015 |
| 7 | 12 | 350 | 2 | 1.0 | 0.138 |
| 8 | <u>0</u> | 550 | 2 | 1.1 | 0.002 |
| 9 | 14 | 450 | 1 | 1.0 | 0.126 |
| 10 | 19 | 350 | 4 | 0.8 | 0.081 |
| 11 | 4 | 550 | 2 | 1.0 | 0.355 |
| 12 | 13 | 250 | 3 | 1.2 | 0.068 |
| 13 | 21 | 450 | 4 | 0.7 | 0.035 |
| 14 | 7 | 450 | 2 | 0.7 | 0.251 |
| 15 | 7 | 550 | 2 | 0.9 | 0.589 |
| 16 | 4 | 350 | 3 | 1.0 | 0.027 |
| 17 | 31 | 450 | 3 | 1.2 | 0.048 |
| 18 | 9 | 600 | 3 | 0.9 | 0.062 |
| 19 | 10 | 250 | 1 | 0.9 | 0.156 |
| 20 | 6 | 350 | 4 | 0.9 | 0.030 |
| 21 | 8 | 450 | 2 | 0.9 | 0.033 |
| 22 | 7 | 350 | 2 | 0.8 | 0.263 |
| 23 | 14 | 550 | 4 | 0.7 | 0.107 |
| 24 | 12 | <u>1250</u> | 2 | 0.9 | 0.050 |
| 25 | 9 | 550 | 2 | 0.9 | 0.389 |
| 26 | 6 | 550 | 2 | 0.7 | 0.447 |
| 27 | 9 | 500 | 5 | 0.9 | 0.129 |
| 28 | 9 | 450 | 3 | 0.8 | 0.062 |
| 29 | 8 | 400 | 4 | 0.9 | 0.024 |
| 30 | 11 | 450 | 2 | 0.9 | 0.0004 |

TABLE 10

| EXPERIMENTAL EXAMPLE | CHEMICAL COMPONENT | STEEL TYPE | ANNEALING STEP | | | | |
|---|---|---|---|---|---|---|---|
| | | | HEATING RATE AT 600 TO 750° C. ° C./SECOND | MAXIMUM HEATING TEMPERATURE ° C. | Ac3 ° C. | MAXIMUM HEATING TEMPERATURE − Ac3 ° C. | AVERAGE COOLING RATE AT 740 TO 500° C. ° C./SECOND |
| 31 | H | GA | 3.5 | 842 | 861 | −19 | 27.4 |
| 32 | H | GI | 1.6 | 860 | 861 | −1 | 4.4 |
| 33 | I | GI | 4.5 | 810 | 829 | −19 | 3.2 |
| 34 | I | GI | 3.2 | 806 | 829 | −23 | 9.0 |
| 35 | I | GA | 3.5 | 852 | 829 | 23 | 4.4 |
| 36 | I | GI | 2.2 | 839 | 829 | 10 | 4.1 |
| 37 | J | GI | 5.0 | 884 | 921 | −37 | 2.5 |
| 38 | J | GI | 1.6 | 891 | 921 | −30 | 5.1 |
| 39 | J | GA | 7.1 | 956 | 921 | 35 | 4.3 |
| 40 | J | GI | 2.8 | 902 | 921 | −19 | 4.2 |
| 41 | K | GI | 1.6 | 966 | 920 | 46 | 31.6 |
| 42 | K | GI | 3.3 | 890 | 920 | −30 | 4.1 |
| 43 | K | GA | 4.6 | 898 | 920 | −22 | 29.3 |
| 44 | K | GI | 2.8 | 925 | 920 | 5 | 33.1 |
| 45 | L | GI | 4.7 | 905 | 862 | 43 | 15.4 |
| 46 | L | GA | 9.9 | 893 | 862 | 31 | 12.0 |
| 47 | L | GA | 5.9 | 849 | 862 | −13 | 10.7 |
| 48 | L | GI | 3.3 | 856 | 862 | −6 | 4.4 |
| 49 | M | GI | 3.6 | 832 | 834 | −2 | 5.9 |
| 50 | M | GI | 4.6 | 847 | 834 | 13 | 4.9 |
| 51 | M | GA | 1.9 | 802 | 834 | −32 | 5.4 |
| 52 | M | GI | 2.4 | 887 | 834 | 53 | 4.3 |
| 53 | N | GI | 3.8 | 777 | 798 | −21 | 20.9 |
| 54 | N | GI | 2.0 | 786 | 798 | −12 | 2.8 |
| 55 | N | GA | 3.7 | 805 | 798 | 7 | 31.1 |
| 56 | N | GI | 2.5 | 833 | 798 | 35 | 11.1 |
| 57 | O | GI | 3.2 | 831 | 865 | −34 | 12.4 |
| 58 | O | GI | 3.5 | 873 | 885 | 8 | 11.3 |
| 59 | O | GA | 2.9 | 910 | 865 | 45 | 5.7 |
| 60 | O | GA | 2.5 | 821 | 865 | −44 | 5.6 |

| EXPERIMENTAL EXAMPLE | ANNEALING STEP | | | | |
|---|---|---|---|---|---|
| | LOAD STRESS MPa | BENDING RADIUS mm | NUMBER OF TIMES OF BENDING TIMES | PREHEATING ZONE VOLUME RATIO OF AIR AND FUEL GAS | REDUCTION ZONE P(H$_2$O)/P(H$_2$) |
| 31 | 10 | 300 | 2 | 1.1 | 0.015 |
| 32 | 10 | 550 | 3 | 0.8 | 0.026 |
| 33 | 27 | 550 | 3 | 1.1 | 0.021 |
| 34 | 21 | 350 | 2 | 0.9 | 0.331 |
| 35 | 10 | 250 | 7 | 0.8 | 0.031 |
| 36 | 10 | 300 | 6 | 0.9 | 0.002 |
| 37 | 8 | 550 | 1 | 0.9 | 0.038 |
| 38 | 11 | 550 | 2 | 0.8 | 1.74 |
| 39 | 14 | 450 | 3 | 1.0 | 0.069 |
| 40 | 11 | 200 | 3 | 1.0 | 0.007 |
| 41 | 6 | 550 | 1 | 0.9 | 0.029 |
| 42 | 8 | 550 | 7 | 0.8 | 0.011 |
| 43 | 8 | 400 | 3 | 0.8 | 0.102 |
| 44 | 8 | 350 | 2 | 0.8 | 0.004 |
| 45 | 10 | 300 | 3 | 1.0 | 0.083 |
| 46 | 11 | 550 | 3 | 0.9 | 0.603 |
| 47 | 12 | 450 | 4 | 0.9 | 0.003 |
| 48 | 9 | 550 | 4 | 1.0 | 0.013 |
| 49 | 5 | 550 | 4 | 0.8 | 0.030 |
| 50 | 9 | 550 | 1 | 1.2 | 0.028 |
| 51 | 8 | 400 | 5 | 0.8 | 0.019 |
| 52 | 10 | 550 | 1 | <u>1.8</u> | 0.050 |
| 53 | 18 | 250 | 4 | 1.0 | 0.017 |
| 54 | 32 | 250 | 3 | 0.8 | 0.010 |
| 55 | 11 | 550 | 3 | 1.2 | 1.023 |
| 56 | 7 | 450 | 4 | 0.8 | 0.955 |
| 57 | 9 | 350 | 3 | 0.8 | 0.148 |
| 58 | 34 | 450 | 5 | 0.9 | 0.007 |
| 59 | 8 | 450 | 3 | 1.1 | 1.33 |
| 60 | 11 | 450 | 4 | 0.9 | 0.049 |

TABLE 11

| EXPERIMENTAL EXAMPLE | CHEMICAL COMPONENT | STEEL TYPE | ANNEALING STEP | | | | |
|---|---|---|---|---|---|---|---|
| | | | HEATING RATE AT 600 TO 750° C. ° C./SECOND | MAXIMUM HEATING TEMPERATURE ° C. | Ac3 ° C. | MAXIMUM HEATING TEMPERATURE – Ac3 ° C. | AVERAGE COOLING RATE AT 740 TO 500° C. ° C./SECOND |
| 61 | P | GI | 4.0 | 864 | 850 | 14 | 3.6 |
| 62 | P | GA | 11.9 | 832 | 850 | −18 | 6.2 |
| 63 | P | GA | 3.3 | 819 | 850 | −31 | 6.4 |
| 64 | P | GI | 4.8 | 830 | 850 | −20 | 5.0 |
| 65 | Q | GI | 2.2 | 833 | 840 | −7 | 5.2 |
| 66 | Q | GI | 3.1 | 800 | 840 | −40 | 6.8 |
| 67 | Q | GA | 3.6 | 872 | 840 | 32 | 12.8 |
| 68 | Q | GI | 4.3 | 832 | 840 | −8 | 4.9 |
| 69 | R | GI | 4.0 | 915 | 860 | 55 | 19.4 |
| 70 | R | GA | 4.4 | 874 | 860 | 14 | 4.0 |
| 71 | R | GA | 2.1 | 842 | 860 | −18 | 24.1 |
| 72 | R | GI | 2.4 | 870 | 860 | 10 | 11.4 |
| 73 | S | GI | 3.3 | 849 | 861 | −12 | 5.2 |
| 74 | S | GI | 4.7 | 879 | 861 | 18 | 5.7 |
| 75 | S | GA | 9.7 | 860 | 861 | −1 | 28.4 |
| 76 | S | GI | 3.1 | 891 | 861 | 30 | 3.5 |
| 77 | T | GI | 1.9 | 849 | 874 | −25 | 4.2 |
| 78 | T | GI | 3.0 | 903 | 874 | 29 | 5.2 |
| 79 | T | GA | 7.0 | 914 | 874 | 40 | 28.6 |
| 80 | T | GI | 2.2 | 852 | 874 | −22 | 5.3 |
| 81 | U | GI | 4.2 | 833 | 839 | −6 | 4.2 |
| 82 | U | GA | 3.9 | 812 | 839 | −27 | 3.3 |
| 83 | U | GA | 4.6 | 873 | 839 | 34 | 25.4 |
| 84 | U | GI | 1.7 | <u>740</u> | 839 | <u>−99</u> | 5.3 |
| 85 | V | GI | 2.7 | 922 | 911 | 11 | 2.9 |
| 86 | V | GI | 3.8 | 910 | 911 | −1 | 5.4 |
| 87 | V | GA | 11.5 | 923 | 911 | 12 | 6.2 |
| 88 | V | GI | 2.4 | 906 | 911 | −5 | <u>0.3</u> |
| 89 | W | GI | 3.8 | 825 | 846 | −21 | 6.4 |
| 90 | W | GA | 1.8 | 852 | 846 | 6 | 5.1 |

| EXPERIMENTAL EXAMPLE | ANNEALING STEP | | | | |
|---|---|---|---|---|---|
| | LOAD STRESS MPa | BENDING RADIUS mm | NUMBER OF TIMES OF BENDING TIMES | PREHEATING ZONE VOLUME RATIO OF AIR AND FUEL GAS | REDUCTION ZONE $P(H_2O)/P(H_2)$ |
| 61 | 5 | 450 | 2 | 1.0 | 0.005 |
| 62 | 17 | 250 | 3 | 0.9 | 0.046 |
| 63 | 10 | 500 | 5 | 0.8 | 0.135 |
| 64 | 8 | 350 | 4 | 0.9 | 0.191 |
| 65 | 8 | 450 | 3 | 1.0 | 0.014 |
| 66 | 11 | 300 | 4 | 0.7 | 0.006 |
| 67 | 9 | 350 | 1 | 0.9 | 0.105 |
| 68 | — | — | <u>0</u> | 0.9 | 0.105 |
| 69 | 8 | 650 | 4 | 1.0 | 0.138 |
| 70 | 8 | 300 | 3 | 1.2 | 0.617 |
| 71 | 11 | 450 | 3 | 1.0 | 0.093 |
| 72 | 9 | 350 | 2 | 0.7 | 0.135 |
| 73 | 7 | 550 | 5 | 0.9 | 0.005 |
| 74 | 13 | 450 | 5 | 1.2 | 0.018 |
| 75 | 11 | 350 | 3 | 0.7 | 0.427 |
| 76 | 6 | 350 | 4 | 1.1 | <u>2.32</u> |
| 77 | 11 | 450 | 5 | 0.8 | 0.019 |
| 78 | 13 | 450 | 1 | 0.9 | 0.030 |
| 79 | 12 | 550 | 4 | 1.1 | 0.040 |
| 80 | 13 | 550 | 2 | <u>0.4</u> | 0.015 |
| 81 | 9 | 550 | 6 | 1.2 | 0.004 |
| 82 | 10 | 550 | 3 | 1.0 | 0.059 |
| 83 | 8 | 700 | 3 | 1.2 | 0.017 |
| 84 | 9 | 350 | 3 | 0.9 | 0.085 |
| 85 | 9 | 450 | 4 | 0.8 | 0.468 |
| 86 | 11 | 550 | 6 | 0.8 | 0.002 |
| 87 | 6 | 450 | 2 | 0.8 | 0.245 |
| 88 | 10 | 500 | 5 | 0.8 | 0.065 |
| 89 | 6 | 550 | 3 | 1.0 | 0.007 |
| 90 | 25 | 500 | 2 | 0.9 | 0.076 |

TABLE 12

| EXPERIMENTAL EXAMPLE | CHEMICAL COMPONENT | STEEL TYPE | ANNEALING STEP | | | | |
|---|---|---|---|---|---|---|---|
| | | | HEATING RATE AT 600 TO 750° C. ° C./SECOND | MAXIMUM HEATING TEMPERATURE ° C. | Ac3 ° C. | MAXIMUM HEATING TEMPERATURE − Ac3 ° C. | AVERAGE COOLING RATE AT 740 TO 500° C. ° C./SECOND |
| 91 | W | GA | 3.3 | 894 | 846 | 48 | 2.9 |
| 92 | W | GI | 2.8 | 840 | 846 | −6 | 21.1 |
| 93 | X | GI | 2.7 | 929 | 924 | 5 | 4.3 |
| 94 | X | GI | 4.6 | 936 | 924 | 12 | 41.2 |
| 95 | X | GA | 1.6 | 919 | 924 | −5 | 2.7 |
| 96 | X | GI | 2.6 | 890 | 924 | −34 | 2.8 |
| 97 | Y | GI | 2.5 | 794 | 816 | −22 | 37.7 |
| 98 | Y | GA | 3.9 | 819 | 816 | 3 | 7.3 |
| 99 | Y | GA | 4.0 | 816 | 816 | 0 | 5.6 |
| 100 | Y | GI | 3.6 | 795 | 816 | −21 | 4.2 |
| 101 | Z | GI | 3.2 | 826 | 824 | 2 | 6.1 |
| 102 | Z | GI | 1.8 | 795 | 824 | −29 | 21.4 |
| 103 | Z | GA | 4.5 | 853 | 824 | 29 | 4.7 |
| 104 | Z | GI | 3.6 | 850 | 824 | 26 | 14.9 |
| 105 | AA | GI | 3.2 | 777 | 805 | −28 | 2.9 |
| 106 | AA | GA | 3.2 | 808 | 805 | 3 | 4.2 |
| 107 | AA | GA | 8.3 | 822 | 805 | 17 | 2.9 |
| 108 | AA | GI | 2.9 | 785 | 805 | −20 | 5.9 |
| 109 | AB | GI | 6.1 | 923 | 921 | 2 | 2.5 |
| 110 | AB | GA | 1.9 | 903 | 921 | −18 | 4.8 |
| 111 | AB | GA | 3.3 | 956 | 921 | 35 | 5.7 |
| 112 | AB | GI | 2.0 | 920 | 921 | −1 | 38.3 |
| 113 | AC | GI | 3.8 | 821 | 830 | −9 | 21.5 |
| 114 | AC | GI | 1.8 | 861 | 830 | 31 | 8.7 |
| 115 | AC | GA | 3.4 | 798 | 830 | −32 | 4.6 |
| 116 | AC | GI | 1.7 | 856 | 830 | 26 | 6.4 |
| 117 | AD | GI | 1.7 | 859 | 835 | 24 | 5.7 |
| 118 | AD | GA | 1.8 | 794 | 835 | −41 | 40.2 |
| 119 | AD | GA | 6.1 | 814 | 835 | −21 | 4.7 |
| 120 | AD | GI | 3.7 | 838 | 835 | 3 | 3.4 |

| EXPERIMENTAL EXAMPLE | ANNEALING STEP | | | | |
|---|---|---|---|---|---|
| | LOAD STRESS MPa | BENDING RADIUS mm | NUMBER OF TIMES OF BENDING TIMES | PREHEATING ZONE VOLUME RATIO OF AIR AND FUEL GAS | REDUCTION ZONE P(H₂O)/P(H₂) |
| 91 | 6 | 550 | 5 | 0.9 | 0.161 |
| 92 | 14 | 500 | 3 | 0.9 | 0.0000 |
| 93 | 10 | 450 | 4 | 0.7 | 0.026 |
| 94 | 22 | 550 | 2 | 0.8 | 0.006 |
| 95 | 8 | 350 | 4 | 1.0 | 0.170 |
| 96 | 6 | 550 | 6 | 1.0 | 1.122 |
| 97 | 8 | 450 | 5 | 1.1 | 0.047 |
| 98 | 6 | 450 | 1 | 1.1 | 0.072 |
| 99 | 12 | 450 | 4 | 1.1 | 0.055 |
| 100 | 8 | 650 | 7 | 0.9 | 0.085 |
| 101 | 30 | 250 | 4 | 1.2 | 0.479 |
| 102 | 10 | 200 | 4 | 0.8 | 0.575 |
| 103 | 14 | 500 | 2 | 1.1 | 0.017 |
| 104 | 7 | 500 | 4 | 0.9 | 0.006 |
| 105 | 10 | 550 | 5 | 1.1 | 0.005 |
| 106 | 4 | 300 | 3 | 1.1 | 0.302 |
| 107 | 17 | 450 | 7 | 0.9 | 0.123 |
| 108 | 12 | 350 | 2 | 1.0 | 0.135 |
| 109 | 8 | 450 | 7 | 1.0 | 0.240 |
| 110 | 6 | 150 | 3 | 1.0 | 0.162 |
| 111 | 5 | 450 | 2 | 1.0 | 0.004 |
| 112 | 7 | 400 | 2 | 0.7 | 0.029 |
| 113 | 6 | 250 | 4 | 0.9 | 0.026 |
| 114 | 9 | 450 | 6 | 1.1 | 0.006 |
| 115 | 11 | 450 | 2 | 1.2 | 0.012 |
| 116 | 6 | 450 | 2 | 0.8 | 0.017 |
| 117 | 5 | 550 | 6 | 1.1 | 0.525 |
| 118 | 10 | 450 | 5 | 1.1 | 0.005 |
| 119 | 10 | 200 | 5 | 0.9 | 0.052 |
| 120 | 29 | 350 | 3 | 1.0 | 0.001 |

TABLE 13

| EXPERIMENTAL EXAMPLE | CHEMICAL COMPONENT | STEEL TYPE | ANNEALING STEP ||||| 
| --- | --- | --- | --- | --- | --- | --- | --- |
| | | | HEATING RATE AT 600 TO 750° C. ° C./SECOND | MAXIMUM HEATING TEMPERATURE ° C. | Ac3 ° C. | MAXIMUM HEATING TEMPERATURE − Ac3 ° C. | AVERAGE COOLING RATE AT 740 TO 500° C. ° C./SECOND |
| 121 | AE | GI | 2.0 | 837 | 857 | −20 | 6.0 |
| 122 | AF | GI | 2.9 | 756 | 773 | −17 | 6.7 |
| 123 | AG | GI | 2.8 | 854 | 884 | −30 | 6.7 |
| 124 | BA | — | TEST STOPPED DUE TO FRACTURE IN COLD-ROLLING STEP |||||
| 125 | BB | GA | 2.0 | 809 | 787 | 22 | 6.9 |
| 126 | BC | — | TEST STOPPED DUE TO SLAB CRACK |||||
| 127 | BD | — | TEST STOPPED DUE TO FRACTURE OF WELD ZONE IN ANNEALING STEP |||||
| 128 | BE | GA | 3.9 | 852 | 838 | 14 | 4.8 |
| 129 | A | GA | 2.6 | 816 | 794 | 22 | 4.0 |
| 130 | B | — | TEST STOPPED DUE TO DEFECTIVE SHAPE OF HOT-ROLLED STEEL SHEET |||||
| 131 | B | GA | 3.9 | 870 | 852 | 18 | 4.6 |
| 132 | H | GI | 3.0 | 865 | 861 | 4 | 0.5 |
| 133 | F | GA | 2.5 | 853 | 830 | 23 | 4.0 |

| EXPERIMENTAL EXAMPLE | ANNEALING STEP |||||
| --- | --- | --- | --- | --- | --- |
| | LOAD STRESS MPa | BENDING RADIUS mm | NUMBER OF TIMES OF BENDING TIMES | PREHEATING ZONE VOLUME RATIO OF AIR AND FUEL GAS | REDUCTION ZONE P(H$_2$O)/ P(H$_2$) |
| 121 | 11 | 250 | 3 | 0.8 | 0.093 |
| 122 | 10 | 650 | 3 | 0.8 | 0.005 |
| 123 | 9 | 550 | 3 | 0.9 | 0.028 |
| 124 | TEST STOPPED DUE TO FRACTURE IN COLD-ROLLING STEP |||||
| 125 | 14 | 460 | 4 | 1.1 | 0.062 |
| 126 | TEST STOPPED DUE TO SLAB CRACK |||||
| 127 | TEST STOPPED DUE TO FRACTURE OF WELD ZONE IN ANNEALING STEP |||||
| 128 | 17 | 460 | 4 | 1.1 | 1.33 |
| 129 | 25 | 460 | 4 | 0.5 | 0.134 |
| 130 | TEST STOPPED DUE TO DEFECTIVE SHAPE OF HOT-ROLLED STEEL SHEET |||||
| 131 | 15 | 460 | 4 | 1.0 | 0.080 |
| 132 | 21 | 460 | 4 | 1.0 | 0.051 |
| 133 | 20 | 460 | 4 | 0.9 | 0.083 |

The experimental example 124 is an example in which the content of Si was large, and a fracture of the steel sheet occurred in the cold-rolling step, resulting in that the test was stopped.

The experimental example 126 is an example in which the content of Mn was large, and the slab fractured up to when it was subjected to the hot-rolling step, resulting in that the test was stopped.

The experimental example 127 is an example in which the content of Al was large, and a fracture of weld zone between steel sheets in front of and at the rear of the steel sheet in the annealing step occurred, resulting in that the test was stopped.

Next, there was performed a bainite transformation process in which some base steel sheets out of the base steel sheets of the experimental examples 1 to 133 were heated to temperatures in a temperature range presented in Table 14 to Table 18 and retained for a period of time presented in Table 14 to Table 18.

Next, the base steel sheets at entering temperatures presented in Table 14 to Table 18 were made to enter and to be immersed in plating baths having effective Al amounts and temperatures presented in Table 14 to Table 18, thereby obtaining hot-dip galvanized steel sheets of the experimental examples 1 to 133.

Further, some hot-dip galvanized steel sheets out of the hot-dip galvanized steel sheets of the experimental examples 1 to 133 were subjected to alloying treatment in which they were heated to temperatures in a temperature range presented in Table 14 to Table 18 and retained for retention times presented in Table 14 to Table 18, thereby obtaining alloyed hot-dip galvanized steel sheets (GA) of the experimental examples 1 to 133. The steel sheets other than the above were formed as hot-dip galvanized steel sheets (GI) in which plating layers were not alloyed, by performing no alloying treatment or by setting a treatment temperature to less than 470° C.

TABLE 14

| EXPERI-MENTAL EXAMPLE | BAINITE TRANSFORMATION PROCESS RETENTION TIME SECOND | BAINITE TRANSFORMATION PROCESS TEMPERATURE °C | PLATING STEP EFFECTIVE Al AMOUNT MASS % | PLATING STEP PLATING BATH TEMPERATURE °C | PLATING STEP ENTERING TEMPERATURE OF STEEL SHEET °C | ALLOYING ALLOYING TEMPERATURE °C | ALLOYING TREATMENT TIME SECOND | AVERAGE COOLING RATE UP TO WHEN TEMPERATURE REACHES 150° C. OR LESS AFTER PLATING STEP OR ALLOYING °C/SECOND | TEMPERING STEP TEMPERING TEMPERATURE °C | COLD ROLLING REDUCTION RATIO % | |
|---|---|---|---|---|---|---|---|---|---|---|---|
| 1 | 47 | 439 | 0.07 | 468 | 469 | — | — | 3.2 | — | — | EXAMPLE |
| 2 | 191 | 419 | 0.12 | 463 | 443 | — | — | 3.6 | — | — | EXAMPLE |
| 3 | — | — | 0.07 | 452 | 442 | 527 | 16 | 4.0 | — | — | EXAMPLE |
| 4 | — | — | 0.10 | 461 | 471 | — | — | 4.0 | — | — | EXAMPLE |
| 5 | 72 | 373 | 0.07 | 457 | 460 | — | — | 2.2 | — | — | EXAMPLE |
| 6 | — | — | 0.10 | 464 | 480 | — | — | 2.7 | 360 | — | EXAMPLE |
| 7 | 491 | 437 | 0.12 | 459 | 454 | 499 | 15 | 4.1 | — | — | EXAMPLE |
| 8 | — | — | 0.11 | 456 | 467 | — | — | 5.2 | 320 | 0.10 | COMPARATIVE EXAMPLE |
| 9 | — | — | 0.11 | 459 | 468 | — | — | 4.2 | 260 | — | EXAMPLE |
| 10 | 130 | 411 | 0.09 | 466 | 472 | 541 | 40 | 2.7 | — | — | EXAMPLE |
| 11 | — | — | 0.08 | 452 | 484 | 596 | 11 | 3.8 | — | — | EXAMPLE |
| 12 | — | — | 0.11 | 461 | 458 | — | — | 3.4 | — | — | EXAMPLE |
| 13 | 325 | 435 | 0.07 | 459 | 440 | — | — | 5.7 | — | — | EXAMPLE |
| 14 | — | — | 0.08 | 462 | 479 | — | — | 3.1 | — | — | EXAMPLE |
| 15 | — | — | 0.10 | 462 | 454 | 537 | 31 | 3.5 | — | 0.06 | EXAMPLE |
| 16 | 63 | 416 | 0.11 | 455 | 441 | — | — | 3.2 | — | — | EXAMPLE |
| 17 | — | — | 0.10 | 456 | 459 | — | — | 0.9 | 300 | — | EXAMPLE |
| 18 | 287 | 452 | 0.08 | 452 | 441 | 526 | 13 | 1.7 | — | — | EXAMPLE |
| 19 | — | — | 0.07 | 464 | 444 | 516 | 20 | 2.8 | — | — | EXAMPLE |
| 20 | 184 | 453 | 0.25 | 458 | 452 | — | — | 4.2 | — | — | COMPARATIVE EXAMPLE |
| 21 | 31 | 407 | 0.11 | 460 | 446 | — | — | 2.7 | — | — | EXAMPLE |
| 22 | 179 | 469 | 0.10 | 459 | 437 | — | — | 2.9 | — | — | EXAMPLE |
| 23 | — | — | 0.08 | 460 | 452 | 498 | 27 | 4.1 | 400 | — | EXAMPLE |
| 24 | — | — | 0.10 | 460 | 468 | — | — | 3.8 | — | — | COMPARATIVE EXAMPLE |
| 25 | 172 | 439 | 0.11 | 456 | 468 | — | — | 1.4 | — | — | EXAMPLE |
| 26 | 207 | 387 | 0.07 | 458 | 436 | 491 | 10 | 2.0 | — | — | EXAMPLE |
| 27 | — | — | 0.12 | 465 | 465 | 528 | 4 | 3.1 | — | 0.15 | EXAMPLE |
| 28 | 650X | — | 0.07 | 462 | 460 | — | — | 3.3 | — | — | COMPARATIVE EXAMPLE |
| 29 | — | — | 0.09 | 462 | 441 | — | — | 5.4 | — | — | EXAMPLE |
| 30 | — | — | 0.12 | 461 | 444 | — | — | 3.4 | — | — | EXAMPLE |

TABLE 15

| EXPERI-MENTAL EXAMPLE | BAINITE TRANSFORMATION PROCESS | | PLATING STEP | | | ALLOYING | | AVERAGE COOLING RATE UP TO WHEN TEMPERATURE REACHES 150° C. OR LESS AFTER PLATING STEP OR ALLOYING ° C./SECOND | TEMPERING STEP | COLD ROLLING REDUCTION RATIO % | |
|---|---|---|---|---|---|---|---|---|---|---|---|
| | RETENTION TIME SECOND | TEMPERATURE ° C. | EFFECTIVE Al AMOUNT MASS % | PLATING BATH TEMPERATURE ° C. | ENTERING TEMPERATURE OF STEEL SHEET ° C. | ALLOYING TEMPERATURE ° C. | TREATMENT TIME SECOND | | TEMPERING TEMPERATURE ° C. | | |
| 31 | 330 | 409 | 0.10 | 461 | 452 | 554 | 34 | 3.2 | — | — | EXAMPLE |
| 32 | — | — | 0.07 | 462 | 433 | — | — | 2.9 | — | — | COMPARATIVE EXAMPLE |
| 33 | — | — | 0.09 | 453 | 464 | — | — | 3.7 | — | — | EXAMPLE |
| 34 | 43 | 433 | 0.11 | 460 | 454 | — | — | 4.1 | — | 0.55 | EXAMPLE |
| 35 | — | — | 0.11 | 464 | 481 | 570 | 10 | 2.5 | 335 | — | EXAMPLE |
| 36 | — | — | 0.11 | 457 | 459 | — | — | 4.9 | — | — | EXAMPLE |
| 37 | 31 | 421 | 0.10 | 464 | 472 | — | — | 1.9 | — | — | EXAMPLE |
| 38 | 45 | 447 | 0.09 | 468 | 465 | — | — | 3.0 | — | — | EXAMPLE |
| 39 | — | — | 0.11 | 462 | 462 | 536 | 24 | 2.0 | 380 | — | EXAMPLE |
| 40 | — | — | 0.07 | 463 | 452 | — | — | 2.7 | — | — | EXAMPLE |
| 41 | 44 | 444 | 0.07 | 457 | 450 | — | — | 5.0 | — | — | EXAMPLE |
| 42 | — | — | 0.14 | 469 | 448 | — | — | 3.1 | — | — | EXAMPLE |
| 43 | 92 | 439 | 0.10 | 461 | 456 | 542 | 15 | 2.0 | — | — | EXAMPLE |
| 44 | 52 | 466 | 0.10 | 467 | 458 | — | — | 2.3 | — | — | COMPARATIVE EXAMPLE |
| 45 | — | — | 0.08 | 455 | 481 | — | — | 4.5 | — | — | EXAMPLE |
| 46 | — | — | 0.17 | 465 | 438 | 608 | 9 | 1.5 | — | — | EXAMPLE |
| 47 | 60 | 441 | 0.10 | 458 | 448 | 510 | 19 | 3.8 | — | — | EXAMPLE |
| 48 | — | — | 0.11 | 460 | 456 | — | — | 3.2 | — | — | EXAMPLE |
| 49 | 213 | 381 | 0.11 | 456 | 459 | — | — | 2.3 | 380 | 0.04 | EXAMPLE |
| 50 | — | — | 0.12 | 461 | 449 | — | — | 2.0 | — | — | EXAMPLE |
| 51 | 60 | 456 | 0.11 | 465 | 461 | 542 | 42 | 4.5 | — | — | EXAMPLE |
| 52 | 40 | 449 | 0.10 | 458 | 456 | — | — | 3.1 | — | — | EXAMPLE |
| 53 | 308 | 407 | 0.09 | 461 | 462 | — | — | 4.5 | — | — | EXAMPLE |
| 54 | — | — | 0.10 | 465 | 475 | — | — | 2.9 | — | — | EXAMPLE |
| 55 | 62 | 440 | 0.12 | 460 | 479 | — | — | 2.5 | — | — | EXAMPLE |
| 56 | — | — | 0.10 | 468 | 464 | — | — | 3.0 | — | — | COMPARATIVE EXAMPLE |
| 57 | — | — | 0.12 | 466 | 439 | — | — | 3.0 | — | — | EXAMPLE |
| 58 | 286 | 384 | 0.04 | 451 | 454 | — | — | 3.3 | — | — | EXAMPLE |
| 59 | 76 | 464 | 0.09 | 467 | 470 | 505 | 48 | 3.5 | — | — | EXAMPLE |
| 60 | 35 | 447 | 0.10 | 462 | 438 | 520 | 1 | 3.8 | — | — | COMPARATIVE EXAMPLE |

TABLE 16

| EXPERI-MENTAL EXAMPLE | BAINITE TRANSFORMATION PROCESS | | PLATING STEP | | | ALLOYING | | AVERAGE COOLING RATE UP TO WHEN TEMPERATURE REACHES 150° C. OR LESS AFTER PLATING STEP OR ALLOYING °C./SECOND | TEMPERING STEP | COLD ROLLING REDUCTION RATIO % | |
|---|---|---|---|---|---|---|---|---|---|---|---|
| | RETENTION TIME SECOND | TEMPER-ATURE °C. | EFFECTIVE Al AMOUNT MASS % | PLATING BATH TEMPERATURE °C. | ENTERING TEMPERATURE OF STEEL SHEET °C. | ALLOYING TEMPERATURE °C. | TREATMENT TIME SECOND | | TEMPERING TEMPERATURE °C. | | |
| 61 | 44 | 441 | 0.11 | 462 | 442 | — | — | 3.4 | — | — | EXAMPLE |
| 62 | 105 | 368 | 0.09 | 469 | 464 | 526 | 15 | 2.2 | — | 0.75 | EXAMPLE |
| 63 | — | — | 0.07 | 460 | 446 | 478 | 136 | 1.7 | — | — | EXAMPLE |
| 64 | — | — | 0.07 | 454 | 451 | — | — | 3.6 | — | — | EXAMPLE |
| 65 | — | — | 0.11 | 461 | 447 | — | — | 4.8 | 260 | — | EXAMPLE |
| 66 | 192 | 448 | 0.09 | 464 | 458 | — | — | 3.3 | — | — | EXAMPLE |
| 67 | 46 | 371 | 0.09 | 467 | 447 | 543 | 20 | 2.2 | — | — | EXAMPLE |
| 68 | 171 | 457 | 0.07 | 466 | 446 | — | — | 1.7 | — | — | COMPARATIVE EXAMPLE |
| 69 | 192 | 448 | 0.11 | 465 | 465 | — | — | 4.4 | — | — | EXAMPLE |
| 70 | — | — | 0.10 | 459 | 466 | 482 | 53 | 2.0 | — | — | EXAMPLE |
| 71 | 49 | 375 | 0.10 | 457 | 445 | 532 | 36 | 1.9 | — | — | EXAMPLE |
| 72 | — | — | 0.07 | 461 | 473 | — | — | 5.1 | — | — | EXAMPLE |
| 73 | 140 | 378 | 0.07 | 452 | 463 | — | — | 2.3 | — | — | EXAMPLE |
| 74 | — | — | 0.08 | 455 | 476 | — | — | 3.7 | 330 | — | EXAMPLE |
| 75 | — | — | 0.12 | 463 | 464 | 564 | 18 | 0.7 | — | — | EXAMPLE |
| 76 | — | — | 0.09 | 462 | 444 | — | — | 4.0 | — | — | COMPARATIVE EXAMPLE |
| 77 | 54 | 452 | 0.11 | 464 | 487 | — | — | 4.4 | — | — | EXAMPLE |
| 78 | 49 | 449 | 0.11 | 463 | 468 | 587 | 7 | 3.4 | — | 0.20 | EXAMPLE |
| 79 | — | — | 0.07 | 458 | 441 | 516 | 52 | 2.3 | — | — | EXAMPLE |
| 80 | 45 | 457 | 0.11 | 453 | 476 | — | — | 4.6 | — | — | COMPARATIVE EXAMPLE |
| 81 | — | — | 0.11 | 461 | 470 | — | — | 4.7 | 280 | — | EXAMPLE |
| 82 | 40 | 462 | 0.08 | 468 | 474 | 535 | 25 | 2.6 | — | — | EXAMPLE |
| 83 | 188 | 446 | 0.11 | 459 | 439 | 481 | 40 | 2.6 | — | — | EXAMPLE |
| 84 | — | — | 0.10 | 464 | 484 | — | — | 3.3 | — | — | COMPARATIVE EXAMPLE |
| 85 | — | — | 0.09 | 463 | 438 | — | — | 3.2 | — | — | EXAMPLE |
| 86 | 67 | 377 | 0.09 | 459 | 434 | — | — | 4.2 | — | — | EXAMPLE |
| 87 | — | — | 0.11 | 454 | 451 | 554 | 23 | 3.7 | 450 | — | EXAMPLE |
| 88 | — | — | 0.09 | 459 | 438 | — | — | 4.5 | — | — | COMPARATIVE EXAMPLE |
| 89 | — | — | 0.12 | 451 | 432 | — | — | 5.3 | — | — | EXAMPLE |
| 90 | 82 | 459 | 0.08 | 459 | 476 | 500 | 44 | 2.4 | — | — | EXAMPLE |

TABLE 17

| EXPERI-MENTAL EXAMPLE | BAINITE TRANSFORMATION PROCESS RETENTION TIME SECOND | BAINITE TRANSFORMATION PROCESS TEMPERATURE °C | PLATING STEP EFFECTIVE Al AMOUNT MASS % | PLATING STEP PLATING BATH TEMPERATURE °C | PLATING STEP ENTERING TEMPERATURE OF STEEL SHEET °C | ALLOYING ALLOYING TEMPERATURE °C | ALLOYING TREATMENT TIME SECOND | AVERAGE COOLING RATE UP TO WHEN TEMPERATURE REACHES 150° C. OR LESS AFTER PLATING STEP OR ALLOYING °C/SECOND | TEMPERING STEP TEMPERING TEMPERATURE °C | COLD ROLLING REDUCTION RATIO % | |
|---|---|---|---|---|---|---|---|---|---|---|---|
| 91 | 208 | 368 | 0.11 | 462 | 460 | 562 | 18 | 2.6 | — | — | EXAMPLE |
| 92 | — | — | 0.11 | 463 | 464 | — | — | 5.5 | — | — | COMPARATIVE EXAMPLE |
| 93 | — | — | 0.08 | 460 | 475 | — | — | 3.4 | — | — | EXAMPLE |
| 94 | 100 | 462 | 0.11 | 459 | 439 | — | — | 1.8 | — | — | EXAMPLE |
| 95 | — | — | 0.09 | 462 | 452 | 536 | 36 | 1.5 | — | — | EXAMPLE |
| 96 | — | — | 0.09 | 465 | 451 | — | — | 4.7 | — | — | COMPARATIVE EXAMPLE |
| 97 | — | — | 0.12 | 458 | 469 | — | — | 3.4 | 350 | — | EXAMPLE |
| 98 | 66 | 461 | 0.12 | 453 | 439 | 559 | 8 | 2.2 | — | — | EXAMPLE |
| 99 | 150 | 451 | 0.09 | 459 | 440 | 493 | 107 | 3.7 | — | — | EXAMPLE |
| 100 | — | — | 0.10 | 465 | 485 | 526 | 290 | 3.3 | — | — | COMPARATIVE EXAMPLE |
| 101 | 178 | 467 | 0.09 | 456 | 465 | — | — | 3.2 | — | — | EXAMPLE |
| 102 | 32 | 391 | 0.08 | 462 | 483 | — | — | 5.3 | — | 0.10 | EXAMPLE |
| 103 | — | — | 0.08 | 462 | 477 | 529 | 38 | 4.3 | 370 | — | EXAMPLE |
| 104 | — | — | 0.08 | 453 | 457 | — | — | 0.7 | — | — | EXAMPLE |
| 105 | 195 | 467 | 0.10 | 465 | 447 | — | — | 3.2 | — | — | EXAMPLE |
| 106 | — | — | 0.09 | 466 | 451 | 537 | 40 | 4.7 | — | — | EXAMPLE |
| 107 | 305 | 341 | 0.11 | 452 | 446 | 571 | 19 | 5.6 | — | — | EXAMPLE |
| 108 | 332 | 397 | 0.00 | 456 | 460 | — | — | 1.8 | — | — | COMPARATIVE EXAMPLE |
| 109 | 332 | 410 | 0.11 | 459 | 477 | — | — | 4.8 | — | — | EXAMPLE |
| 110 | 61 | 438 | 0.09 | 457 | 473 | 564 | 18 | 2.1 | — | 0.65 | EXAMPLE |
| 111 | — | — | 0.08 | 454 | 447 | 510 | 29 | 4.0 | 260 | — | EXAMPLE |
| 112 | 178 | 439 | 0.12 | 461 | 480 | 659 | 17 | 4.3 | — | — | COMPARATIVE EXAMPLE |
| 113 | — | — | 0.07 | 461 | 447 | — | — | 3.7 | 380 | — | EXAMPLE |
| 114 | — | — | 0.09 | 457 | 438 | — | — | 1.9 | — | 0.35 | EXAMPLE |
| 115 | 94 | 439 | 0.11 | 454 | 454 | 560 | 33 | 1.4 | — | — | EXAMPLE |
| 116 | 55 | 463 | 0.07 | 458 | 445 | — | — | 4.0 | — | — | COMPARATIVE EXAMPLE |
| 117 | — | — | 0.11 | 461 | 481 | — | — | 2.8 | — | — | EXAMPLE |
| 118 | 68 | 372 | 0.11 | 464 | 440 | 566 | 15 | 2.5 | — | — | EXAMPLE |
| 119 | 51 | 437 | 0.07 | 459 | 447 | 480 | 81 | 5.2 | — | — | EXAMPLE |
| 120 | — | — | 0.07 | 463 | 483 | — | — | 2.7 | — | — | EXAMPLE |

TABLE 18

| EXPERI-MENTAL EXAMPLE | BAINITE TRANSFORMATION PROCESS | | PLATING STEP | | | | ALLOYING | | AVERAGE COOLING RATE UP TO WHEN TEMPERATURE REACHES 150° C. OR LESS AFTER PLATING STEP OR ALLOYING ° C./SECOND | TEMPERING STEP TEMPERING TEMPERATURE ° C. | COLD ROLLING REDUCTION RATIO % | |
|---|---|---|---|---|---|---|---|---|---|---|---|---|
| | RETENTION TIME SECOND | TEMPER-ATURE ° C. | EFFECTIVE Al AMOUNT MASS % | PLATING BATH TEMPERATURE ° C. | ENTERING TEMPERATURE OF STEEL SHEET ° C. | | ALLOYING TEMPERATURE ° C. | TREATMENT TIME SECOND | | | | |
| 121 | 132 | 437 | 0.12 | 462 | 448 | | — | — | 5.2 | — | — | COMPARATIVE EXAMPLE |
| 122 | 103 | 461 | 0.08 | 460 | 447 | | — | — | 5.0 | — | — | COMPARATIVE EXAMPLE |
| 123 | 54 | 439 | 0.09 | 452 | 473 | | — | — | 4.6 | — | — | COMPARATIVE EXAMPLE |
| 124 | | | | | | | | | | | | COMPARATIVE EXAMPLE |
| 125 | 79 | 451 | 0.10 | 462 | 458 | | 533 | 31 | 2.8 | — | — | COMPARATIVE EXAMPLE |
| 126 | | | | | | | | | | | | COMPARATIVE EXAMPLE |
| 127 | | | | | | | | | | | | COMPARATIVE EXAMPLE |
| 128 | 92 | 451 | 0.12 | 463 | 462 | | 569 | 21 | 2.8 | — | — | COMPARATIVE EXAMPLE |
| 129 | — | — | 0.11 | 461 | 468 | | 521 | 21 | 4.6 | — | — | COMPARATIVE EXAMPLE |
| 130 | | | | | | | | | | | | COMPARATIVE EXAMPLE |
| 131 | — | — | 0.11 | 460 | 461 | | 523 | 17 | 3.2 | — | — | COMPARATIVE EXAMPLE |
| 132 | — | — | 0.10 | 463 | 458 | | — | — | 1.9 | — | — | COMPARATIVE EXAMPLE |
| 133 | 94 | 255 | 0.10 | 464 | 467 | | 548 | 18 | 3.3 | — | — | COMPARATIVE EXAMPLE |

The hot-dip galvanized steel sheets (or the alloyed hot-dip galvanized steel sheets after the alloying treatment) of the experimental examples 1 to 133 after the plating step were cooled at average cooling rates presented in Table 14 to Table 18 until when temperatures thereof became 150° C. or less.

Note that some of the hot-dip galvanized steel sheets (or the alloyed hot-dip galvanized steel sheets after the alloying treatment) after the plating step of the experimental examples 1 to 133 were subjected to reheat treatment at reheating temperatures presented in Table 14 to Table 18, in the middle of cooling the steel sheets at the average cooling rates presented in Table 14 to Table 18 until when the temperatures of the steel sheets became 150° C. or less.

Further, some of the hot-dip galvanized steel sheets (or the alloyed hot-dip galvanized steel sheets) of the experimental examples 1 to 133 cooled to the room temperature were subjected to cold rolling at reduction ratios presented in Table 14 to Table 18.

In each of the hot-dip galvanized steel sheets (or the alloyed hot-dip galvanized steel sheets) of the experimental examples 1 to 133 obtained as above, microstructures in a range of ⅛ thickness to ⅜ thickness centered around ¼ thickness of a sheet thickness from a surface, were observed to measure volume fractions. Results thereof are presented in Table 19 to Table 23.

Out of the volume fractions of microstructures, an amount of retained austenite was measured based on X-ray analysis, and the volume fractions of the other microstructures were obtained by cutting out a thicknesswise cross section parallel to the rolling direction of the steel sheet, performing nital etching on the cross section polished to be a mirror surface, and observing the cross section using the FE-SEM (Field Emission Scanning Electron Microscope).

Further, a content of iron at ½ thickness of each of the alloyed galvanized layers was measured by using an EDX. Results thereof are presented in Table 19 to Table 23.

TABLE 19

| EXPERIMENTAL EXAMPLE | CHEMICAL COMPONENT | STEEL TYPE | MICROSTRUCTURE STRUCTURAL FRACTION | | | | | | | |
|---|---|---|---|---|---|---|---|---|---|---|
| | | | FERRITE % | BAINITE % | BAINITIC FERRITE % | FRESH MARTENSITE % | TEMPERED MARTENSITE % | RETAINED AUSTENITE % | TOTAL HARD STRUCTURE % | OTHERS % |
| 1 | A | GI | 17 | 33 | 36 | 10 | 0 | 2 | 79 | 1 |
| 2 | A | GI | 4 | 36 | 42 | 14 | 0 | 3 | 92 | 0 |
| 3 | A | GA | 23 | 27 | 24 | 23 | 0 | 0 | 74 | 2 |
| 4 | A | GI | 11 | 48 | 32 | 6 | 0 | 1 | 86 | 1 |
| 5 | B | GI | 17 | 11 | 55 | 13 | 0 | 3 | 79 | 0 |
| 6 | B | GI | 21 | 4 | 30 | 0 | 44 | 0 | 78 | 0 |
| 7 | B | GA | 17 | 15 | 52 | 13 | 2 | 0 | 82 | 1 |
| 8 | B | GI | 6 | 10 | 65 | 13 | 0 | 3 | 88 | 2 |
| 9 | C | GI | 5 | 27 | 43 | 0 | 24 | 0 | 94 | 1 |
| 10 | C | GA | 18 | 12 | 50 | 19 | 0 | 0 | 81 | 1 |
| 11 | C | GA | 23 | 7 | 58 | 11 | 0 | 1 | 76 | 0 |
| 12 | C | GI | 8 | 9 | 65 | 15 | 0 | 3 | 89 | 0 |
| 13 | D | GI | 34 | 22 | 32 | 8 | 0 | 2 | 62 | 2 |
| 14 | D | GI | 6 | 43 | 0 | 42 | 4 | 4 | 89 | 1 |
| 15 | D | GA | 8 | 30 | 46 | 12 | 0 | 2 | 88 | 2 |
| 16 | D | GI | 17 | 25 | 43 | 13 | 0 | 0 | 81 | 2 |
| 17 | E | GI | 20 | 34 | 38 | 0 | 8 | 0 | 80 | 0 |
| 18 | E | GA | 11 | 31 | 49 | 7 | 0 | 2 | 87 | 0 |
| 19 | E | GA | 13 | 22 | 23 | 42 | 0 | 0 | 87 | 0 |
| 20 | E | GI | 17 | 34 | 41 | 3 | 0 | 3 | 78 | 2 |
| 21 | F | GI | 42 | 19 | 30 | 6 | 0 | 2 | 55 | 1 |
| 22 | F | GI | 6 | 41 | 38 | 12 | 0 | 3 | 91 | 0 |
| 23 | F | GA | 17 | 30 | 40 | 0 | 13 | 0 | 83 | 0 |
| 24 | F | GI | 39 | 15 | 14 | 27 | 0 | 3 | 56 | 2 |
| 25 | G | GI | 3 | 41 | 24 | 28 | 2 | 2 | 95 | 0 |
| 26 | G | GA | 12 | 48 | 16 | 22 | 0 | 0 | 86 | 2 |
| 27 | G | GA | 20 | 34 | 24 | 18 | 0 | 3 | 76 | 1 |
| 28 | G | GI | 12 | 37 | 40 | 0 | 0 | <u>10</u> | 77 | 1 |
| 29 | H | GI | 31 | 0 | 53 | 13 | 0 | 3 | 66 | 0 |
| 30 | H | GI | 9 | 11 | 38 | 37 | 4 | 0 | 90 | 1 |

| EXPERIMENTAL EXAMPLE | MICROSTRUCTURE EFFECTIVE CRYSTAL GRAIN DIAMETER | | SURFACE LAYER PORTION | | | SHEET THICKNESS mm |
|---|---|---|---|---|---|---|
| | AVERAGE μm | MAXIMUM μm | DECARBURIZED LAYER THICKNESS μm | OXIDE DENSITY $10^{12}$ OXIDES/m$^2$ | OXIDE AVERAGE GRAIN DIAMETER nm | |
| 1 | 2.4 | 7.0 | 0.52 | 17.0 | 51 | 1.3 |
| 2 | 1.9 | 11.0 | 3.32 | 22.0 | 71 | 1.3 |
| 3 | 1.4 | 12.7 | 0.24 | 9.4 | 57 | 1.6 |
| 4 | 2.5 | 9.6 | 2.84 | 11.6 | 92 | 1.6 |
| 5 | 1.8 | 7.5 | 1.67 | 116.6 | 42 | 1.8 |
| 6 | 2.5 | 9.4 | 0.78 | 75.8 | 45 | 1.6 |
| 7 | 4.2 | 11.0 | 2.37 | 136.5 | 46 | 1.6 |
| 8 | <u>6.5</u> | 12.8 | 0.20 | 36.1 | 38 | 1.3 |

TABLE 19-continued

| | | | | | | |
|---|---|---|---|---|---|---|
| 9 | 2.1 | 6.4 | 2.19 | 296.4 | 40 | 1.0 |
| 10 | 2.5 | 7.3 | 2.70 | 321.2 | 37 | 1.5 |
| 11 | 3.7 | 11.0 | 3.30 | 442.5 | 43 | 1.7 |
| 12 | 1.3 | 9.4 | 1.40 | 121.2 | 50 | 1.6 |
| 13 | 2.9 | 9.0 | 1.87 | 46.2 | 50 | 1.6 |
| 14 | 1.0 | 8.4 | 4.26 | 91.2 | 50 | 1.6 |
| 15 | 2.8 | 8.8 | 5.26 | 69.0 | 60 | 1.3 |
| 16 | 2.1 | 8.0 | 1.30 | 96.9 | 45 | 1.6 |
| 17 | 1.9 | 12.3 | 1.50 | 10.7 | 83 | 1.8 |
| 18 | 1.7 | 10.5 | 2.04 | 16.5 | 82 | 2.4 |
| 19 | 1.3 | 10.7 | 2.95 | 20.1 | 78 | 1.7 |
| 20 | 2.6 | 10.4 | 1.09 | 22.1 | 68 | 1.4 |
| 21 | 0.7 | 7.8 | 1.89 | 24.7 | 63 | 1.3 |
| 22 | 1.4 | 12.6 | 4.78 | 30.0 | 76 | 1.3 |
| 23 | 2.7 | 8.7 | 2.20 | 15.6 | 82 | 1.5 |
| 24 | <u>5.7</u> | 13.6 | 2.08 | 25.3 | 65 | 1.7 |
| 25 | 1.3 | 10.6 | 3.41 | 80.2 | 52 | 1.5 |
| 26 | 3.7 | 9.0 | 3.76 | 49.3 | 58 | 1.2 |
| 27 | 0.9 | 8.3 | 2.68 | 41.2 | 58 | 1.3 |
| 28 | 1.5 | 10.1 | 1.86 | 96.0 | 37 | 1.3 |
| 29 | 1.2 | 4.4 | 0.83 | 40.4 | 56 | 1.8 |
| 30 | 1.2 | 6.7 | 0.25 | 24.7 | 33 | 1.6 |

TABLE 20

| | | | MICROSTRUCTURE STRUCTURAL FRACTION | | | | | | |
|---|---|---|---|---|---|---|---|---|---|
| EXPERI-MENTAL EXAMPLE | CHEMICAL COMPONENT | STEEL TYPE | FERRITE % | BAINITE % | BAINITIC FERRITE % | FRESH MARTENS-ITE % | TEMPERED MARTENS-ITE % | RETAINED AUSTEN-ITE % | TOTAL HARD STRUCTURE % | OTHERS % |
| 31 | H | GA | 26 | 10 | 58 | 4 | 0 | 2 | 72 | 0 |
| 32 | H | GI | 23 | 10 | 59 | 6 | 0 | 0 | 75 | 2 |
| 33 | I | GI | 25 | 13 | 49 | 11 | 0 | 2 | 73 | 0 |
| 34 | I | GI | 19 | 8 | 59 | 13 | 0 | 0 | 80 | 1 |
| 35 | I | GA | 9 | 23 | 52 | 0 | 16 | 0 | 91 | 0 |
| 36 | I | GI | 16 | 10 | 59 | 13 | 0 | 1 | 82 | 1 |
| 37 | J | GI | 31 | 21 | 35 | 13 | 0 | 0 | 69 | 0 |
| 38 | J | GI | 24 | 53 | 9 | 13 | 0 | 0 | 75 | 1 |
| 39 | J | GA | 9 | 34 | 40 | 0 | 17 | 0 | 91 | 0 |
| 40 | J | GI | 27 | 31 | 28 | 14 | 0 | 0 | 73 | 0 |
| 41 | K | GI | 0 | 32 | 25 | 39 | 0 | 4 | 96 | 0 |
| 42 | K | GI | 25 | 33 | 37 | 5 | 0 | 0 | 75 | 0 |
| 43 | K | GA | 12 | 29 | 35 | 19 | 0 | 3 | 83 | 2 |
| 44 | K | GI | 0 | 31 | 25 | 42 | 0 | 2 | 98 | 0 |
| 45 | L | GI | 10 | 18 | 51 | 19 | 0 | 0 | 88 | 2 |
| 46 | L | GA | 0 | 16 | 56 | 26 | 0 | 2 | 98 | 0 |
| 47 | L | GA | 26 | 7 | 61 | 5 | 0 | 0 | 73 | 1 |
| 48 | L | GI | 18 | 24 | 51 | 7 | 0 | 0 | 82 | 0 |
| 49 | M | GI | 22 | 18 | 48 | 0 | 12 | 0 | 78 | 0 |
| 50 | M | GI | 7 | 33 | 46 | 11 | 0 | 3 | 90 | 0 |
| 51 | M | GA | 40 | 19 | 32 | 8 | 0 | 1 | 59 | 0 |
| 52 | M | GI | 15 | 24 | 48 | 12 | 0 | 0 | 84 | 1 |
| 53 | N | GI | 14 | 21 | 49 | 15 | 0 | 0 | 85 | 1 |
| 54 | N | GI | 28 | 15 | 44 | 13 | 0 | 0 | 72 | 0 |
| 55 | N | GA | 4 | 24 | 40 | 29 | 0 | 3 | 93 | 0 |
| 56 | N | GI | 4 | 20 | 45 | 30 | 0 | 1 | 95 | 0 |
| 57 | O | GI | 30 | 5 | 39 | 23 | 0 | 1 | 67 | 2 |
| 58 | O | GI | 0 | 15 | 66 | 15 | 0 | 3 | 96 | 1 |
| 59 | O | GA | 0 | 35 | 46 | 17 | 0 | 2 | 98 | 0 |
| 60 | O | GA | 39 | 9 | 40 | 10 | 0 | 0 | 59 | 2 |

| EXPERI-MENTAL EXAMPLE | MICROSTRUCTURE EFFECTIVE CRYSTAL GRAIN DIAMETER | | SURFACE LAYER PORTION | | | SHEET THICKNESS mm |
|---|---|---|---|---|---|---|
| | AVERAGE μm | MAXIMUM μm | DECARBURIZED LAYER THICKNESS μm | OXIDE DENSITY $10^{12}$ OXIDES/$m^2$ | OXIDE AVERAGE GRAIN DIAMETER nm | |
| 31 | 1.2 | 9.4 | 0.51 | 31.7 | 58 | 1.8 |
| 32 | 4.2 | <u>21.4</u> | 1.77 | 70.7 | 46 | 2.6 |
| 33 | 3.3 | 7.7 | 0.98 | 64.6 | 50 | 1.3 |
| 34 | 2.1 | 7.4 | 4.00 | 178.8 | 52 | 1.2 |

TABLE 20-continued

|   |   |   |   |   |   |   |
|---|---|---|---|---|---|---|
| 35 | 1.4 | 8.7 | 1.53 | 86.1 | 52 | 1.9 |
| 36 | 1.9 | 6.5 | 0.72 | 61.0 | 30 | 1.3 |
| 37 | 2.7 | 5.6 | 1.24 | 80.0 | 52 | 1.3 |
| 38 | 2.3 | 9.2 | 5.79 | 62.6 | 70 | 1.5 |
| 39 | 3.1 | 9.9 | 1.37 | 49.3 | 62 | 1.8 |
| 40 | 3.1 | 8.2 | 0.31 | 17.5 | 54 | 0.8 |
| 41 | 1.2 | 9.2 | 1.65 | 8.6 | 84 | 1.8 |
| 42 | 1.2 | 9.9 | 1.28 | 8.0 | 74 | 1.5 |
| 43 | 1.5 | 6.0 | 1.96 | 9.5 | 88 | 1.3 |
| 44 | 3.9 | <u>20.5</u> | 0.78 | 7.0 | 64 | 1.3 |
| 45 | 3.0 | 7.7 | 2.79 | 99.0 | 58 | 1.3 |
| 46 | 3.4 | 7.8 | 3.43 | 116.8 | 55 | 1.8 |
| 47 | 2.5 | 7.1 | 0.48 | 32.3 | 47 | 1.6 |
| 48 | 2.3 | 9.8 | 1.17 | 27.9 | 59 | 1.6 |
| 49 | 2.6 | 9.5 | 1.28 | 1.8 | 77 | 1.4 |
| 50 | 2.5 | 8.3 | 1.13 | 30.0 | 60 | 1.4 |
| 51 | 1.8 | 10.4 | 1.77 | 19.9 | 70 | 1.3 |
| 52 | 1.7 | 10.1 | <u>19.50</u> | 32.2 | 61 | 1.3 |
| 53 | 2.3 | 10.7 | 0.60 | 33.5 | 58 | 1.3 |
| 54 | 1.3 | 6.5 | 0.74 | 45.2 | 47 | 1.2 |
| 55 | 0.7 | 5.1 | 6.03 | 107.0 | 64 | 1.6 |
| 56 | 3.9 | <u>22.4</u> | 4.26 | 271.1 | 50 | 2.0 |
| 57 | 2.9 | 6.8 | 2.76 | 46.1 | 66 | 1.5 |
| 58 | 1.7 | 9.1 | 0.82 | 95.1 | 32 | 1.4 |
| 59 | 1.9 | 12.8 | 6.16 | 62.4 | 65 | 1.4 |
| 60 | 1.6 | 6.0 | 1.27 | 68.1 | 55 | 1.3 |

TABLE 21

| | | | | | | | | | | |
|---|---|---|---|---|---|---|---|---|---|---|
| | | | | | | MICROSTRUCTURE STRUCTURAL FRACTION | | | | |
| EXPERI-MENTAL EXAMPLE | CHEMICAL COMPONENT | STEEL TYPE | FERRITE % | BAINITE % | BAINITE FERRITE % | FRESH MARTENS-ITE % | TEMPERED MARTENS-ITE % | RETAINED AUSTEN-ITE % | TOTAL HARD STRUCTURE % | OTHERS % |
| 61 | P | GI | 14 | 30 | 53 | 0 | 0 | 3 | 83 | 0 |
| 62 | P | GA | 33 | 58 | 0 | 7 | 0 | 0 | 65 | 2 |
| 63 | P | GA | 33 | 35 | 30 | 2 | 0 | 0 | 67 | 0 |
| 64 | P | GI | 28 | 28 | 42 | 0 | 0 | 2 | 70 | 0 |
| 65 | Q | GI | 15 | 31 | 24 | 0 | 28 | 2 | 83 | 0 |
| 66 | Q | GI | 35 | 20 | 45 | 0 | 0 | 0 | 65 | 0 |
| 67 | Q | GA | 0 | 31 | 69 | 0 | 0 | 0 | 100 | 0 |
| 68 | Q | GI | 19 | 32 | 49 | 0 | 0 | 0 | 81 | 0 |
| 69 | R | GI | 3 | 29 | 54 | 12 | 0 | 2 | 95 | 0 |
| 70 | R | GA | 13 | 34 | 40 | 10 | 0 | 3 | 84 | 0 |
| 71 | R | GA | 12 | 38 | 27 | 20 | 0 | 3 | 85 | 0 |
| 72 | R | GI | 13 | 19 | 49 | 17 | 0 | 0 | 85 | 2 |
| 73 | S | GI | 17 | 21 | 55 | 5 | 0 | 2 | 81 | 0 |
| 74 | S | GI | 10 | 23 | 60 | 0 | 7 | 0 | 90 | 0 |
| 75 | S | GA | 6 | 47 | 25 | 17 | 0 | 3 | 89 | 2 |
| 76 | S | GI | 18 | 11 | 64 | 4 | 0 | 0 | 79 | 3 |
| 77 | T | GI | 26 | 0 | 64 | 8 | 0 | 0 | 72 | 2 |
| 78 | T | GI | 0 | 0 | 86 | 12 | 0 | 2 | 98 | 0 |
| 79 | T | GA | 10 | 30 | 30 | 20 | 5 | 3 | 85 | 2 |
| 80 | T | GI | 33 | 0 | 58 | 7 | 0 | 0 | 65 | 2 |
| 81 | U | GI | 13 | 39 | 31 | 15 | 0 | 0 | 85 | 2 |
| 82 | U | GA | 45 | 44 | 0 | 9 | 0 | 2 | 53 | 0 |
| 83 | U | GA | 3 | 35 | 43 | 17 | 0 | 0 | 95 | 2 |
| 84 | U | GI | <u>76</u> | 2 | 6 | 16 | 0 | 0 | <u>24</u> | 0 |
| 85 | V | GI | 15 | 49 | 20 | 13 | 0 | 2 | 82 | 1 |
| 86 | V | GI | 16 | 25 | 43 | 15 | 0 | 0 | 83 | 1 |
| 87 | V | GA | 7 | 48 | 33 | 10 | 0 | 2 | 91 | 0 |
| 88 | V | GI | <u>56</u> | 20 | 10 | 0 | 0 | 0 | <u>30</u> | <u>14</u> |
| 89 | W | GI | 40 | 30 | 21 | 9 | 0 | 0 | 60 | 0 |
| 90 | W | GA | 12 | 43 | 40 | 4 | 0 | 1 | 87 | 0 |

TABLE 21-continued

| | MICROSTRUCTURE EFFECTIVE CRYSTAL GRAIN DIAMETER | | SURFACE LAYER PORTION | | | |
|---|---|---|---|---|---|---|
| EXPERI-MENTAL EXAMPLE | AVERAGE μm | MAXIMUM μm | DECARBURIZED LAYER THICKNESS μm | OXIDE DENSITY $10^{12}$ OXIDES/$m^2$ | OXIDE AVERAGE GRAIN DIAMETER nm | SHEET THICKNESS mm |
| 61 | 3.4 | 8.6 | 0.76 | 18.6 | 54 | 1.3 |
| 62 | 4.6 | 8.0 | 2.15 | 26.3 | 65 | 1.5 |
| 63 | 3.4 | 8.7 | 2.98 | 28.3 | 73 | 1.5 |
| 64 | 3.1 | 8.7 | 2.75 | 48.2 | 61 | 1.4 |
| 65 | 0.7 | 5.6 | 1.56 | 10.9 | 72 | 1.6 |
| 66 | 2.8 | 7.5 | 1.23 | 7.9 | 69 | 1.6 |
| 67 | 2.7 | 7.4 | 2.89 | 24.1 | 70 | 1.8 |
| 68 | <u>6.1</u> | <u>20.2</u> | 2.47 | 17.6 | 85 | 1.8 |
| 69 | 1.7 | 9.8 | 2.94 | 47.0 | 56 | 2.0 |
| 70 | 2.8 | 7.3 | 5.56 | 56.9 | 72 | 1.0 |
| 71 | 1.2 | 6.5 | 2.31 | 49.2 | 61 | 1.0 |
| 72 | 1.6 | 7.4 | 2.51 | 27.1 | 71 | 1.0 |
| 73 | 3.3 | 7.4 | 0.80 | 25.5 | 45 | 1.0 |
| 74 | 1.8 | 9.2 | 0.98 | 3.5 | 55 | 1.3 |
| 75 | 3.1 | 9.9 | 5.62 | 148.4 | 45 | 1.5 |
| 76 | 1.8 | 7.6 | <u>18.30</u> | 32.9 | 109 | 1.6 |
| 77 | 0.8 | 6.2 | 1.00 | 43.7 | 58 | 1.4 |
| 78 | 2.5 | 6.0 | 1.33 | 55.0 | 49 | 1.7 |
| 79 | 3.5 | 9.0 | 1.00 | 44.3 | 58 | 1.6 |
| 80 | 1.9 | 6.7 | <u>0.00</u> | — | — | <u>1.7</u> |
| 81 | 4.5 | 7.8 | 0.48 | 23.2 | 46 | 1.5 |
| 82 | 1.0 | 9.1 | 1.25 | 22.5 | 70 | 1.3 |
| 83 | 3.6 | 10.9 | 0.94 | 31.5 | 52 | 1.3 |
| 84 | 1.3 | 10.1 | 2.48 | 28.2 | 70 | 1.3 |
| 85 | 2.0 | 14.0 | 3.91 | 21.8 | 78 | 0.8 |
| 86 | 3.9 | 11.8 | 1.08 | 12.5 | 41 | 1.2 |
| 87 | 4.5 | 8.5 | 3.48 | 9.3 | 86 | 1.4 |
| 88 | <u>5.4</u> | 12.3 | 1.59 | 18.5 | 65 | 1.6 |
| 89 | 1.6 | 10.0 | 0.80 | 19.5 | 56 | 1.6 |
| 90 | 1.0 | 9.1 | 2.11 | 13.5 | 79 | 1.3 |

TABLE 22

| | | | MICROSTRUCTURE STRUCTURAL FRACTION | | | | | | |
|---|---|---|---|---|---|---|---|---|---|
| EXPERI-MENTAL EXAMPLE | CHEMICAL COMPONENT | STEEL TYPE | FERRITE % | BAINITE % | BAINITIC FERRITE % | FRESH MARTENS-ITE % | TEMPERED MARTENS-ITE % | RETAINED AUSTEN-ITE % | TOTAL HARD STRUCTURE % | OTHERS % |
| 91 | W | GA | 21 | 55 | 24 | 0 | 0 | 0 | 79 | 0 |
| 92 | W | GI | 14 | 16 | 29 | 38 | 0 | 0 | 83 | 3 |
| 93 | X | GI | 4 | 36 | 37 | 19 | 0 | 3 | 92 | 1 |
| 94 | X | GI | 0 | 42 | 33 | 19 | 3 | 0 | 97 | 3 |
| 95 | X | GA | 17 | 31 | 28 | 17 | 4 | 2 | 80 | 1 |
| 96 | X | GI | 14 | 32 | 25 | 24 | 0 | 3 | 81 | 2 |
| 97 | Y | GI | 23 | 9 | 17 | 0 | 47 | 3 | 73 | 1 |
| 98 | Y | GA | 14 | 34 | 43 | 7 | 0 | 0 | 84 | 2 |
| 99 | Y | GA | 14 | 24 | 53 | 5 | 0 | 3 | 82 | 1 |
| 100 | Y | GA | 29 | 17 | 47 | 7 | 0 | 0 | 71 | 0 |
| 101 | Z | GI | 3 | 25 | 59 | 10 | 0 | 3 | 94 | 0 |
| 102 | Z | GI | 20 | 11 | 36 | 30 | 0 | 2 | 77 | 1 |
| 103 | Z | GA | 16 | 21 | 52 | 9 | 0 | 2 | 82 | 0 |
| 104 | Z | GI | 0 | 29 | 37 | 29 | 0 | 0 | 95 | 5 |
| 105 | AA | GI | 37 | 15 | 38 | 7 | 0 | 2 | 60 | 1 |
| 106 | AA | GA | 20 | 45 | 23 | 11 | 0 | 0 | 79 | 1 |
| 107 | AA | GA | 8 | 37 | 41 | 10 | 0 | 4 | 88 | 0 |
| 108 | AA | GI | 34 | 19 | 37 | 10 | 0 | 0 | 66 | 0 |
| 109 | AB | GI | 23 | 38 | 35 | 0 | 0 | 3 | 73 | 1 |
| 110 | AB | GA | 24 | 42 | 30 | 3 | 0 | 0 | 75 | 1 |
| 111 | AB | GA | 4 | 36 | 55 | 5 | 0 | 0 | 96 | 0 |
| 112 | AB | GI | 5 | 50 | 32 | 0 | 0 | 0 | 82 | <u>13</u> |
| 113 | AC | GI | 13 | 9 | 24 | 0 | 49 | 5 | 82 | 0 |
| 114 | AC | GI | 8 | 30 | 49 | 10 | 0 | 3 | 89 | 0 |
| 115 | AC | GA | 47 | 15 | 31 | 7 | 0 | 0 | 53 | 0 |
| 116 | AC | GI | 16 | 24 | 49 | 11 | 0 | 0 | 84 | 0 |
| 117 | AD | GI | 2 | 17 | 74 | 7 | 0 | 0 | 98 | 0 |

TABLE 22-continued

| | | | | | | | | | | |
|---|---|---|---|---|---|---|---|---|---|---|
| 118 | AD | GA | 29 | 10 | 33 | 20 | 5 | 3 | 68 | 0 |
| 119 | AD | GA | 33 | 19 | 44 | 0 | 0 | 4 | 63 | 0 |
| 120 | AD | GI | 5 | 18 | 70 | 4 | 0 | 3 | 92 | 0 |

| EXPERI-MENTAL EXAMPLE | MICROSTRUCTURE EFFECTIVE CRYSTAL GRAIN DIAMETER | | SURFACE LAYER PORTION | | | SHEET THICKNESS mm |
|---|---|---|---|---|---|---|
| | AVERAGE µm | MAXIMUM µm | DECARBURIZED LAYER THICKNESS µm | OXIDE DENSITY $10^{12}$ OXIDES/m² | OXIDE AVERAGE GRAIN DIAMETER nm | |
| 91 | 2.5 | 8.9 | 1.85 | 15.1 | 82 | 1.0 |
| 92 | 2.5 | 6.5 | 0.00 | — | — | 1.0 |
| 93 | 2.1 | 11.0 | 3.19 | 110.8 | 31 | 1.5 |
| 94 | 2.2 | 9.6 | 0.89 | 53.0 | 34 | 1.3 |
| 95 | 2.0 | 7.3 | 1.95 | 74.9 | 54 | 1.3 |
| 96 | 6.9 | 21.9 | 6.76 | 103.2 | 53 | 1.0 |
| 97 | 1.7 | 10.8 | 2.00 | 48.6 | 48 | 2.3 |
| 98 | 2.1 | 10.7 | 1.14 | 29.3 | 69 | 1.3 |
| 99 | 2.1 | 8.8 | 1.17 | 38.1 | 58 | 1.3 |
| 100 | 2.3 | 8.5 | 2.37 | 49.2 | 65 | 1.5 |
| 101 | 2.5 | 9.4 | 4.13 | 58.5 | 75 | 1.5 |
| 102 | 1.8 | 8.2 | 7.04 | 81.5 | 53 | 1.8 |
| 103 | 2.1 | 9.4 | 0.62 | 27.5 | 66 | 2.0 |
| 104 | 1.7 | 7.8 | 0.98 | 26.9 | 54 | 0.7 |
| 105 | 3.7 | 7.3 | 0.29 | 20.9 | 48 | 1.6 |
| 106 | 1.6 | 8.8 | 2.98 | 34.0 | 83 | 1.4 |
| 107 | 4.1 | 12.6 | 2.15 | 54.2 | 61 | 1.6 |
| 108 | 1.5 | 7.3 | 2.46 | 27.1 | 73 | 1.6 |
| 109 | 2.6 | 8.6 | 3.92 | 22.3 | 75 | 1.4 |
| 110 | 2.0 | 7.0 | 3.09 | 29.1 | 65 | 1.3 |
| 111 | 1.4 | 8.9 | 0.26 | 8.5 | 63 | 1.3 |
| 112 | 0.8 | 8.9 | 2.45 | 20.6 | 65 | 1.3 |
| 113 | 1.5 | 8.9 | 2.15 | 55.7 | 42 | 1.2 |
| 114 | 1.5 | 8.6 | 0.24 | 16.0 | 61 | 1.2 |
| 115 | 2.7 | 7.8 | 0.29 | 20.0 | 61 | 1.2 |
| 116 | 4.3 | 21.8 | 1.44 | 41.5 | 54 | 1.5 |
| 117 | 2.0 | 10.6 | 4.63 | 60.2 | 72 | 1.3 |
| 118 | 1.2 | 6.8 | 0.37 | 18.8 | 55 | 1.3 |
| 119 | 4.8 | 9.9 | 2.82 | 42.2 | 61 | 1.5 |
| 120 | 2.3 | 7.3 | 0.42 | 30.6 | 34 | 1.6 |

TABLE 23

| EXPERI-MENTAL EXAMPLE | CHEMICAL COMPONENT | STEEL TYPE | MICROSTRUCTURE STRUCTURAL FRACTION | | | | | | | |
|---|---|---|---|---|---|---|---|---|---|---|
| | | | FERRITE % | BAINITE % | BAINITIC FERRITE % | FRESH MARTENS-ITE % | TEMPERED MARTENS-ITE % | RETAINED AUSTEN-ITE % | TOTAL HARD STRUCTURE % | OTHERS % |
| 121 | AE | GI | 43 | 11 | 36 | 8 | 0 | 0 | 55 | 2 |
| 122 | AF | GI | 25 | 13 | 30 | 27 | 0 | 4 | 70 | 1 |
| 123 | AG | GI | 34 | 19 | 37 | 0 | 0 | 0 | 56 | 10 |
| 124 | BA | — | TEST STOPPED DUE TO FRACTURE IN COLD-ROLLING STEP | | | | | | | |
| 125 | BB | GA | 17 | 57 | 10 | 2 | 0 | 2 | 69 | 12 |
| 126 | BC | — | TEST STOPPED DUE TO SLAB CRACK | | | | | | | |
| 127 | BD | — | TEST STOPPED DUE TO FRACTURE OF WELD ZONE IN ANNEALING STEP | | | | | | | |
| 128 | BE | GA | 36 | 5 | 19 | 28 | 7 | 3 | 59 | 2 |
| 129 | A | GA | 32 | 15 | 6 | 25 | 20 | 2 | 66 | 0 |
| 130 | B | — | TEST STOPPED DUE TO DEFECTIVE SHAPE OF HOT-ROLLED STEEL SHEET | | | | | | | |
| 131 | B | GA | 13 | 11 | 45 | 20 | 10 | 1 | 86 | 0 |
| 132 | H | GI | 67 | 5 | 8 | 17 | 0 | 3 | 30 | 0 |
| 133 | F | GA | 24 | 3 | 6 | 0 | 62 | 2 | 71 | 3 |

TABLE 23-continued

| EXPERI-MENTAL EXAMPLE | MICROSTRUCTURE EFFECTIVE CRYSTAL GRAIN DIAMETER | | SURFACE LAYER PORTION | | | SHEET THICKNESS mm |
|---|---|---|---|---|---|---|
| | AVERAGE μm | MAXIMUM μm | DECARBURIZED LAYER THICKNESS μm | OXIDE DENSITY $10^{12}$ OXIDES/m² | OXIDE AVERAGE GRAIN DIAMETER nm | |
| 121 | 1.9 | 8.4 | 2.73 | 65.9 | 54 | 1.3 |
| 122 | 2.4 | 8.5 | 1.00 | 24.6 | 48 | 1.3 |
| 123 | 2.1 | 10.1 | 1.27 | 8.9 | 83 | 1.3 |
| 124 | TEST STOPPED DUE TO FRACTURE IN COLD-ROLLING STEP | | | | | |
| 125 | 4.1 | 13.2 | 2.74 | 0.2 | 97 | 1.1 |
| 126 | TEST STOPPED DUE TO SLAB CRACK | | | | | |
| 127 | TEST STOPPED DUE TO FRACTURE OF WELD ZONE IN ANNEALING STEP | | | | | |
| 128 | 3.8 | 13.5 | 4.15 | 10300 | 31 | 1.5 |
| 129 | 3.9 | 15.6 | 1.23 | 0.1 | 512 | 1.3 |
| 130 | TEST STOPPED DUE TO DEFECTIVE SHAPE OF HOT-ROLLED STEEL SHEET | | | | | |
| 131 | 7.3 | 22.0 | 1.75 | 26.4 | 61 | 1.7 |
| 132 | 4.5 | 16.2 | 2.29 | 49.5 | 85 | 1.8 |
| 133 | 1.2 | 9.3 | 1.67 | 36.0 | 65 | 1.4 |

Further, an average effective crystal grain diameter, a maximum effective crystal grain diameter, and a decarburized layer (thickness, density of oxides, average grain diameter of oxides) of each of the experimental examples 1 to 133 were measured through a method to be described below. Results thereof are presented in Table 19 to Table 23.

"Average Effective Crystal Grain Diameter, Maximum Effective Crystal Grain Diameter"

A thicknesswise cross section parallel to the rolling direction of each of the hot-dip galvanized steel sheets (or the alloyed hot-dip galvanized steel sheets) of the experimental examples 1 to 133 was finished to be a mirror surface, and a crystal orientation of iron of BCC (body-centered cubic structure) was measured by performing a high-resolution crystal orientation analysis based on an EBSD method using the FE-SEM in regions of 50000 μm² in total in a range of ⅛ thickness to ⅜ thickness centered around ¼ thickness of a sheet thickness from a surface, by setting a measuring step to 0.5 μm or less.

Further, a boundary at which a misorientation of (100) plane became 10° or more at the minimum, between adjacent measurement points, was defined as an effective crystal grain boundary. A grain boundary map was created by using the measured effective crystal grain boundary, lines, whose lengths were 300 μm or more in total, parallel to the rolling direction were written on the grain boundary map, and a value obtained by dividing the total lengths of the lines by a number of intersection points of the lines and the effective crystal grain boundary was set to the average effective crystal grain diameter. Further, a grain diameter at a position at which a distance between adjacent intersection points was the largest, was set to the maximum effective crystal grain diameter.

"Thickness of Decarburized Layer"

The thicknesswise cross section parallel to the rolling direction of each of the hot-dip galvanized steel sheets (or the alloyed hot-dip galvanized steel sheets) of the experimental examples 1 to 133 was finished to be a mirror surface, and observed by using the FE-SEM to measure a thickness of the decarburized layer. Note that thicknesses of the decarburized layer were measured at three positions or more per one steel sheet, and an average value of the thicknesses was set to a thickness of the decarburized layer.

"Density of Oxides", "Average Grain Diameter of Oxides"

The thicknesswise cross section parallel to the rolling direction of each of the hot-dip galvanized steel sheets (or the alloyed hot-dip galvanized steel sheets) of the experimental examples 1 to 133 was finished to be a mirror surface, and a density of oxides was calculated by observing the cross section of 7 μm² with the use of the FE-SEM to count a number of the oxides, or by using an observation area required up to when 1000 oxides were counted. Further, the average grain diameter of oxides was calculated by averaging circle-equivalent diameters of randomly selected 100 to 1000 oxides.

Further, the toughness of each of the experimental examples 1 to 133 was measured through a method to be described below. Results thereof are presented in Table 24 to Table 28.

"Toughness (Impact Absorption Energy (−40° C.), Brittle Fracture Rate)"

Since a sheet thickness of each of the hot-dip galvanized steel sheets (or the alloyed hot-dip galvanized steel sheets) of the experimental examples 1 to 133 is thin to be 0.5 to 3.5 mm, it is difficult to conduct an accurate test by using one piece of the steel sheet. Accordingly, the steel sheets were overlapped, fastened by a bolt, and processed in a predetermined shape after confirming that there was no gap between the steel sheets, thereby preparing a stacked Charpy test piece. A number N of the steel sheets to be overlapped was set so that [sheet thickness]×N became closest to 10 mm. For example, when the sheet thickness was 1.8 mm, N was set to 6, and a total sheet thickness was set to 10.8 mm.

The stacked Charpy test piece has a thicknesswise cross section parallel to the rolling direction which is a fracture surface, so that it was collected by setting a sheet width direction to a longitudinal direction. The impact absorption energy of the steel sheet was obtained by dividing a total absorption energy in an impact test by a fracture surface area 0.8×[sheet thickness]×N, and evaluated as an absorption energy per unit area (−40° C.).

A fracture surface of the steel sheet has fine crystal grain diameters, so that it is not possible to distinguish a brittle fracture surface and a ductile fracture surface by using an optical microscope or a loupe. Accordingly, the fracture surface was observed by using SEM, to thereby determine the brittle fracture rate.

The measurement was conducted based on conditions other than the above in accordance with JIS Z 2242.

TABLE 24

| EXPERIMENTAL EXAMPLE | EXTERNAL APPEARANCE | PLATING PEELING | TENSILE PROPERTY | | | IMPACT RESISTANCE PROPERTY AT LOW TEMPERATURE | | STEEL TYPE |
|---|---|---|---|---|---|---|---|---|
| | | | YIELD STRESS MPa | TENSILE STRENGTH MPa | TOTAL ELONGATION % | BRITTLE FRACTURE RATE % | ABSORPTION ENERGY (−40° C.) J/cm$^2$ | |
| 1 | ○ | ○ | 854 | 1204 | 17 | 0 | 50 | EXAMPLE |
| 2 | ○ | ○ | 1127 | 1441 | 12 | 0 | 65 | EXAMPLE |
| 3 | ○ | ○ | 968 | 1452 | 13 | 0 | 47 | EXAMPLE |
| 4 | ○ | ○ | 797 | 1081 | 20 | 0 | 57 | EXAMPLE |
| 5 | ○ | ○ | 996 | 1425 | 10 | 0 | 47 | EXAMPLE |
| 6 | ○ | ○ | 1321 | 1480 | 9 | 0 | 42 | EXAMPLE |
| 7 | ○ | ○ | 897 | 1278 | 13 | 0 | 49 | EXAMPLE |
| 8 | ○ | ○ | 931 | 1213 | 13 | 64 | 35 | COMPARATIVE EXAMPLE |
| 9 | ○ | ○ | 1220 | 1502 | 11 | 0 | 51 | EXAMPLE |
| 10 | ○ | ○ | 1002 | 1430 | 10 | 0 | 45 | EXAMPLE |
| 11 | ○ | ○ | 800 | 1196 | 16 | 0 | 47 | EXAMPLE |
| 12 | ○ | ○ | 1029 | 1370 | 12 | 0 | 46 | EXAMPLE |
| 13 | ○ | ○ | 797 | 1324 | 14 | 0 | 51 | EXAMPLE |
| 14 | ○ | ○ | 1367 | 1760 | 9 | 0 | 44 | EXAMPLE |
| 15 | ○ | ○ | 951 | 1293 | 14 | 0 | 53 | EXAMPLE |
| 16 | ○ | ○ | 648 | 949 | 23 | 0 | 62 | EXAMPLE |
| 17 | ○ | ○ | 923 | 1295 | 15 | 0 | 58 | EXAMPLE |
| 18 | ○ | ○ | 946 | 1276 | 14 | 0 | 43 | EXAMPLE |
| 19 | ○ | ○ | 1343 | 1868 | 6 | 0 | 47 | EXAMPLE |
| 20 | x | ○ | 811 | 1171 | 19 | 0 | 42 | COMPARATIVE EXAMPLE |
| 21 | ○ | ○ | 685 | 1151 | 19 | 0 | 52 | EXAMPLE |
| 22 | ○ | ○ | 999 | 1263 | 16 | 0 | 44 | EXAMPLE |
| 23 | ○ | ○ | 1014 | 1284 | 15 | 0 | 47 | EXAMPLE |
| 24 | ○ | ○ | 748 | 1148 | 17 | 29 | 27 | COMPARATIVE EXAMPLE |
| 25 | ○ | ○ | 1016 | 1305 | 13 | 0 | 68 | EXAMPLE |
| 26 | ○ | ○ | 996 | 1343 | 14 | 0 | 41 | EXAMPLE |
| 27 | ○ | ○ | 1033 | 1516 | 9 | 0 | 36 | EXAMPLE |
| 28 | ○ | ○ | 842 | 1172 | 20 | 100 | 13 | COMPARATIVE EXAMPLE |
| 29 | ○ | ○ | 813 | 1342 | 13 | 0 | 45 | EXAMPLE |
| 30 | ○ | ○ | 1207 | 1621 | 8 | 0 | 47 | EXAMPLE |

TABLE 25

| EXPERIMENTAL EXAMPLE | EXTERNAL APPEARANCE | PLATING PEELING | TENSILE PROPERTY | | | IMPACT RESISTANCE PROPERTY AT LOW TEMPERATURE | | STEEL TYPE |
|---|---|---|---|---|---|---|---|---|
| | | | YIELD STRESS MPa | TENSILE STRENGTH MPa | TOTAL ELONGATION % | BRITTLE FRACTURE RATE % | ABSORPTION ENERGY (−40° C.) J/cm$^2$ | |
| 31 | ○ | ○ | 821 | 1236 | 16 | 0 | 45 | EXAMPLE |
| 32 | ○ | ○ | 723 | 1072 | 13 | 55 | 45 | COMPARATIVE EXAMPLE |
| 33 | ○ | ○ | 929 | 1341 | 12 | 0 | 36 | EXAMPLE |
| 34 | ○ | ○ | 1047 | 1496 | 13 | 0 | 56 | EXAMPLE |
| 35 | ○ | ○ | 1233 | 1389 | 10 | 0 | 46 | EXAMPLE |
| 36 | ○ | ○ | 1145 | 1420 | 9 | 0 | 41 | EXAMPLE |
| 37 | ○ | ○ | 924 | 1473 | 11 | 0 | 54 | EXAMPLE |
| 38 | ○ | ○ | 839 | 1294 | 13 | 0 | 42 | EXAMPLE |
| 39 | ○ | ○ | 1122 | 1456 | 11 | 0 | 39 | EXAMPLE |
| 40 | ○ | ○ | 885 | 1367 | 11 | 0 | 54 | EXAMPLE |
| 41 | ○ | ○ | 1087 | 1493 | 10 | 0 | 60 | EXAMPLE |
| 42 | ○ | ○ | 784 | 1185 | 14 | 0 | 52 | EXAMPLE |
| 43 | ○ | ○ | 1074 | 1315 | 12 | 0 | 44 | EXAMPLE |
| 44 | ○ | ○ | 1289 | 1625 | 5 | 100 | 8 | COMPARATIVE EXAMPLE |

TABLE 25-continued

| | | | TENSILE PROPERTY | | | IMPACT RESISTANCE PROPERTY AT LOW TEMPERATURE | | |
| --- | --- | --- | --- | --- | --- | --- | --- | --- |
| | | | | | | BRITTLE | ABSORPTION | |
| EXPERIMENTAL EXAMPLE | EXTERNAL APPEARANCE | PLATING PEELING | YIELD STRESS MPa | TENSILE STRENGTH MPa | TOTAL ELONGATION % | FRACTURE RATE % | ENERGY (−40° C.) J/cm² | STEEL TYPE |
| 45 | ○ | ○ | 956 | 1263 | 14 | 0 | 52 | EXAMPLE |
| 46 | ○ | ○ | 1153 | 1418 | 11 | 0 | 78 | EXAMPLE |
| 47 | ○ | ○ | 813 | 1218 | 13 | 0 | 55 | EXAMPLE |
| 48 | ○ | ○ | 797 | 1158 | 17 | 0 | 55 | EXAMPLE |
| 49 | ○ | ○ | 981 | 1275 | 13 | 0 | 51 | EXAMPLE |
| 50 | ○ | ○ | 841 | 1104 | 16 | 0 | 47 | EXAMPLE |
| 51 | ○ | ○ | 806 | 1201 | 17 | 0 | 55 | EXAMPLE |
| 52 | x | ○ | 656 | 876 | 18 | 0 | 45 | COMPARATIVE EXAMPLE |
| 53 | ○ | ○ | 866 | 1216 | 15 | 0 | 62 | EXAMPLE |
| 54 | ○ | ○ | 978 | 1333 | 12 | 0 | 47 | EXAMPLE |
| 55 | ○ | ○ | 1035 | 1520 | 8 | 0 | 57 | EXAMPLE |
| 56 | ○ | ○ | 978 | 1380 | 13 | 13 | 47 | COMPARATIVE EXAMPLE |
| 57 | ○ | ○ | 998 | 1452 | 7 | 0 | 46 | EXAMPLE |
| 58 | ○ | ○ | 973 | 1330 | 14 | 0 | 80 | EXAMPLE |
| 59 | ○ | ○ | 1057 | 1540 | 8 | 0 | 53 | EXAMPLE |
| 60 | ○ | x | 703 | 1236 | 16 | 0 | 43 | COMPARATIVE EXAMPLE |

TABLE 26

| | | | TENSILE PROPERTY | | | IMPACT RESISTANCE PROPERTY AT LOW TEMPERATURE | | |
| --- | --- | --- | --- | --- | --- | --- | --- | --- |
| | | | | | | BRITTLE | ABSORPTION | |
| EXPERIMENTAL EXAMPLE | EXTERNAL APPEARANCE | PLATING PEELING | YIELD STRESS MPa | TENSILE STRENGTH MPa | TOTAL ELONGATION % | FRACTURE RATE % | ENERGY (−40° C.) J/cm² | STEEL TYPE |
| 61 | ○ | ○ | 742 | 1022 | 20 | 0 | 51 | EXAMPLE |
| 62 | ○ | ○ | 580 | 982 | 22 | 0 | 53 | EXAMPLE |
| 63 | ○ | ○ | 594 | 1001 | 21 | 0 | 60 | EXAMPLE |
| 64 | ○ | ○ | 615 | 988 | 23 | 0 | 46 | EXAMPLE |
| 65 | ○ | ○ | 923 | 1292 | 14 | 0 | 55 | EXAMPLE |
| 66 | ○ | ○ | 519 | 937 | 22 | 0 | 70 | EXAMPLE |
| 67 | ○ | ○ | 952 | 1164 | 14 | 0 | 88 | EXAMPLE |
| 68 | ○ | ○ | 720 | 1009 | 16 | 89 | 23 | COMPARATIVE EXAMPLE |
| 69 | ○ | ○ | 972 | 1296 | 14 | 0 | 61 | EXAMPLE |
| 70 | ○ | ○ | 891 | 1237 | 13 | 0 | 58 | EXAMPLE |
| 71 | ○ | ○ | 860 | 1294 | 15 | 0 | 45 | EXAMPLE |
| 72 | ○ | ○ | 1035 | 1361 | 10 | 0 | 46 | EXAMPLE |
| 73 | ○ | ○ | 778 | 1058 | 19 | 0 | 48 | EXAMPLE |
| 74 | ○ | ○ | 957 | 1222 | 15 | 0 | 59 | EXAMPLE |
| 75 | ○ | ○ | 1006 | 1334 | 15 | 0 | 48 | EXAMPLE |
| 76 | ○ | ○ | 582 | 865 | 18 | 0 | 48 | COMPARATIVE EXAMPLE |
| 77 | ○ | ○ | 899 | 1359 | 12 | 0 | 54 | EXAMPLE |
| 78 | ○ | ○ | 980 | 1255 | 13 | 0 | 89 | EXAMPLE |
| 79 | ○ | ○ | 1020 | 1387 | 12 | 0 | 40 | EXAMPLE |
| 80 | ○ | ○ | 722 | 1209 | 16 | 10 | 35 | COMPARATIVE EXAMPLE |
| 81 | ○ | ○ | 977 | 1375 | 13 | 0 | 45 | EXAMPLE |
| 82 | ○ | ○ | 636 | 1031 | 15 | 0 | 56 | EXAMPLE |
| 83 | ○ | ○ | 1094 | 1417 | 9 | 0 | 53 | EXAMPLE |
| 84 | ○ | ○ | 580 | 1090 | 18 | 100 | 12 | COMPARATIVE EXAMPLE |
| 85 | ○ | ○ | 954 | 1330 | 16 | 0 | 48 | EXAMPLE |
| 86 | ○ | ○ | 1022 | 1416 | 13 | 0 | 54 | EXAMPLE |
| 87 | ○ | ○ | 885 | 1182 | 18 | 0 | 46 | EXAMPLE |

TABLE 26-continued

| | | | | | PROPERTY | | | |
| | | | | TENSILE PROPERTY | | | IMPACT RESISTANCE PROPERTY AT LOW TEMPERATURE | | |
| | | | | | | | BRITTLE | ABSORPTION | |
| EXPERIMENTAL EXAMPLE | EXTERNAL APPEARANCE | PLATING PEELING | YIELD STRESS MPa | TENSILE STRENGTH MPa | TOTAL ELONGATION % | FRACTURE RATE % | ENERGY (−40° C.) J/cm² | STEEL TYPE |
|---|---|---|---|---|---|---|---|---|
| 88 | ○ | ○ | 346 | 813 | 16 | 34 | 29 | COMPARATIVE EXAMPLE |
| 89 | ○ | ○ | 627 | 1107 | 18 | 0 | 44 | EXAMPLE |
| 90 | ○ | ○ | 689 | 979 | 20 | 0 | 52 | EXAMPLE |

TABLE 27

| | | | | | PROPERTY | | | |
| | | | | TENSILE PROPERTY | | | IMPACT RESISTANCE PROPERTY AT LOW TEMPERATURE | | |
| | | | | | | | BRITTLE | ABSORPTION | |
| EXPERIMENTAL EXAMPLE | EXTERNAL APPEARANCE | PLATING PEELING | YIELD STRESS MPa | TENSILE STRENGTH MPa | TOTAL ELONGATION % | FRACTURE RATE % | ENERGY (−40° C.) J/cm² | STEEL TYPE |
|---|---|---|---|---|---|---|---|---|
| 91 | ○ | ○ | 484 | 926 | 22 | 0 | 56 | EXAMPLE |
| 92 | x | x | 861 | 1203 | 15 | 9 | 40 | COMPARATIVE EXAMPLE |
| 93 | ○ | ○ | 863 | 1323 | 13 | 0 | 48 | EXAMPLE |
| 94 | ○ | ○ | 1000 | 1300 | 9 | 0 | 64 | EXAMPLE |
| 95 | ○ | ○ | 998 | 1372 | 13 | 0 | 39 | EXAMPLE |
| 96 | ○ | ○ | 906 | 1324 | 10 | 26 | 35 | COMPARATIVE EXAMPLE |
| 97 | ○ | ○ | 1077 | 1418 | 11 | 0 | 40 | EXAMPLE |
| 98 | ○ | ○ | 811 | 1131 | 16 | 0 | 55 | EXAMPLE |
| 99 | ○ | ○ | 988 | 1362 | 16 | 0 | 46 | EXAMPLE |
| 100 | ○ | x | 902 | 1407 | 11 | 0 | 39 | COMPARATIVE EXAMPLE |
| 101 | ○ | ○ | 938 | 1217 | 16 | 0 | 67 | EXAMPLE |
| 102 | ○ | ○ | 1086 | 1557 | 11 | 0 | 36 | EXAMPLE |
| 103 | ○ | ○ | 861 | 1239 | 14 | 0 | 59 | EXAMPLE |
| 104 | ○ | ○ | 582 | 950 | 16 | 0 | 73 | EXAMPLE |
| 105 | ○ | ○ | 633 | 1109 | 19 | 0 | 48 | EXAMPLE |
| 106 | ○ | ○ | 840 | 1210 | 13 | 0 | 63 | EXAMPLE |
| 107 | ○ | ○ | 1020 | 1380 | 12 | 0 | 43 | EXAMPLE |
| 108 | ○ | x | 636 | 1038 | 17 | 0 | 52 | COMPARATIVE EXAMPLE |
| 109 | ○ | ○ | 654 | 992 | 19 | 0 | 41 | EXAMPLE |
| 110 | ○ | ○ | 584 | 929 | 23 | 0 | 67 | EXAMPLE |
| 111 | ○ | ○ | 916 | 1159 | 18 | 0 | 52 | EXAMPLE |
| 112 | x | x | 560 | 784 | 11 | 0 | 44 | COMPARATIVE EXAMPLE |
| 113 | ○ | ○ | 1041 | 1390 | 11 | 0 | 42 | EXAMPLE |
| 114 | ○ | ○ | 974 | 1267 | 15 | 0 | 41 | EXAMPLE |
| 115 | ○ | ○ | 657 | 1077 | 18 | 0 | 55 | EXAMPLE |
| 116 | ○ | ○ | 930 | 1271 | 14 | 7 | 45 | COMPARATIVE EXAMPLE |
| 117 | ○ | ○ | 1163 | 1508 | 10 | 0 | 61 | EXAMPLE |
| 118 | ○ | ○ | 1000 | 1514 | 12 | 0 | 47 | EXAMPLE |
| 119 | ○ | ○ | 576 | 961 | 25 | 0 | 38 | EXAMPLE |
| 120 | ○ | ○ | 1013 | 1293 | 16 | 0 | 48 | EXAMPLE |

TABLE 28

| | | | | | IMPACT RESISTANCE PROPERTY AT LOW TEMPERATURE | | |
|---|---|---|---|---|---|---|---|
| | | | TENSILE PROPERTY | | | BRITTLE | ABSORPTION |
| EXPERIMENTAL EXAMPLE | EXTERNAL APPEARANCE | PLATING PEELING | YIELD STRESS MPa | TENSILE STRENGTH MPa | TOTAL ELONGATION % | FRACTURE RATE % | ENERGY (−40° C.) J/cm² | STEEL TYPE |
|---|---|---|---|---|---|---|---|---|
| 121 | ○ | ○ | 403 | 806 | 19 | 0 | 45 | COMPARATIVE EXAMPLE |
| 122 | ○ | ○ | 1083 | 2047 | 7 | 100 | 16 | COMPARATIVE EXAMPLE |
| 123 | ○ | ○ | 506 | 837 | 18 | 0 | 65 | COMPARATIVE EXAMPLE |
| 124 | | | | | | | | COMPARATIVE EXAMPLE |
| 125 | ○ | ○ | 621 | 849 | 15 | 11 | 36 | COMPARATIVE EXAMPLE |
| 126 | | | | | | | | COMPARATIVE EXAMPLE |
| 127 | | | | | | | | COMPARATIVE EXAMPLE |
| 128 | x | x | 499 | 1450 | 12 | 35 | 21 | COMPARATIVE EXAMPLE |
| 129 | ○ | ○ | 791 | 1236 | 15 | 100 | 12 | COMPARATIVE EXAMPLE |
| 130 | | | | | | | | COMPARATIVE EXAMPLE |
| 131 | ○ | ○ | 697 | 1078 | 14 | 78 | 17 | COMPARATIVE EXAMPLE |
| 132 | ○ | ○ | 599 | 1106 | 17 | 100 | 15 | COMPARATIVE EXAMPLE |
| 133 | ○ | ○ | 804 | 839 | 12 | 0 | 38 | COMPARATIVE EXAMPLE |

Table 24 to Table 28 represent results obtained by evaluating properties of the hot-dip galvanized steel sheets (or the alloyed hot-dip galvanized steel sheets) of the experimental examples 1 to 133 through methods to be described below.

A tensile test piece based on JIS Z 2201 was collected from each of the hot-dip galvanized steel sheets (or the alloyed hot-dip galvanized steel sheets) of the experimental examples 1 to 133, and a tensile test was conducted based on JIS Z 2241 to measure a yield stress "YS", a tensile strength "TS", and a total elongation "EL".

An external appearance of a surface of the steel sheet was evaluated through visual determination of a state of occurrence of unplating. "X" indicates a steel sheet in which unplating with a diameter of 0.5 mm or more was observed, and thus the steel sheet was out of a tolerance range in terms of external appearance, and "○" indicates a steel sheet other than the above, having an external appearance which is practically tolerable.

Further, in order to evaluate a plating adhesiveness during processing in which a compressive stress is applied, a 60° V bending test was performed, and after that, a tape was attached to an inside of bent portion, and the tape was peeled off. The plating adhesiveness was evaluated from a peeled state of plating layer peeled off together with the tape. "X" indicates a steel sheet which is not practically tolerable since a peeling width is 7.0 mm or more, and "○" indicates a steel sheet other than the above, having a plating adhesiveness which is practically tolerable.

As presented in Table 24 to Table 28, all of the experimental examples being the examples of the present invention out of the experimental examples 1 to 133 had a good external appearance with no occurrence of unplating, had the tensile strength "TS" of 900 MPa or more, and had no brittle fracture surface. Further, in all of the experimental examples being the examples of the present invention, the evaluation regarding plating peeling was "○", the plating adhesiveness was excellent, and sufficient yield stress and total elongation were obtained.

On the contrary, in the experimental examples being comparative examples out of the experimental examples 1 to 133, there was no example in which the plating peeling and the unplating did not occur, the tensile strength "TS" was 900 MPa or more, and the brittle fracture surface was not observed.

In the experimental example 121, the added amount of C was small, and the hard structures could not be obtained, so that the strength was inferior.

In the experimental example 122, the added amount of C was large, the toughness was insufficient, and the brittle fracture rate was 100%.

In the experimental example 123, the added amount of Mn was small, and a large amount of soft structures was formed during the cooling after the annealing, so that the strength was insufficient.

The experimental example 32 is an example in which the reduction ratio in the cold rolling was low, in which the maximum effective crystal grain diameter was large, the toughness was insufficient, and the brittle fracture surface was observed.

The experimental example 44 is an example in which the slab heating temperature in the hot rolling was low, in which the maximum effective crystal grain diameter was large, the toughness was insufficient, and the brittle fracture surface was observed.

The experimental example 56 is an example in which the reduction ratio in the cold rolling was high, in which the maximum effective crystal grain diameter was large, the toughness was insufficient, and the brittle fracture surface was observed.

The experimental example 96 is an example in which the rolling reduction in the hot rolling was large, in which the average effective crystal grain diameter and the maximum effective crystal grain diameter were large, the toughness was insufficient, and the brittle fracture surface was observed.

The experimental example 116 is an example in which the rolling reduction in the hot rolling was low, in which the maximum effective crystal grain diameter was large, the toughness was insufficient, and the brittle fracture surface was observed.

The experimental example 8 is an example in which no load stress was applied in the annealing step, in which the average effective crystal grain diameter was large, the toughness was insufficient, and the brittle fracture surface was observed.

The experimental example 20 is an example in which the effective Al amount in the plating bath was excessive in the plating step, in which the unplating occurred, and the external appearance was not good.

The experimental example 24 is an example in which the bending radius in the bending was large in the annealing step, in which the average effective crystal grain diameter was large, the toughness was insufficient, and the brittle fracture surface was observed.

The experimental example 28 is an example in which the bainite transformation process was conducted after immersing the steel sheet in the plating bath, so that the steel sheet was cooled to the room temperature in a state where carbon was concentrated in non-transformed austenite, in which the amount of retained austenite was large, the toughness was insufficient, and the brittle fracture surface was observed. For this reason, although the retention time in the bainite transformation process is in the range of the present invention, the experimental example 28 is not the example but a comparative example (indicated by "*" in the Table).

The experimental example 52 is an example in which the volume ratio between the fuel gas and the air was large, in which the thickness of the decarburized layer was thick, the unplating occurred, and the strength was insufficient.

The experimental example 60 is an example in which the alloying treatment time was short, in which the plating peeling occurred.

The experimental example 68 is an example in which no bending was conducted, in which the average effective crystal grain diameter and the maximum effective crystal grain diameter were large, the toughness was insufficient, and the brittle fracture surface was observed.

The experimental example 76 is an example in which the partial pressure ratio between $H_2O$ and $H_2$ was high, in which the thickness of the decarburized layer was thick, and the strength was insufficient.

The experimental example 80 is an example in which the volume ratio between the fuel gas and the air was small, in which the decarburized layer was not formed, the toughness was insufficient, and the brittle fracture surface was observed.

The experimental example 84 is an example in which the maximum heating temperature in the annealing step was low, in which the amount of hard structures was small, the toughness was insufficient, and the brittle fracture surface was observed.

The experimental example 88 is an example in which the average cooling rate at 740° C. to 500° C. in the annealing step was small, in which the amount of hard structures was small, the average effective crystal grain diameter was large, the toughness was insufficient, and the brittle fracture surface was observed.

The experimental example 92 is an example in which the partial pressure ratio between $H_2O$ and $H_2$ was low, in which the decarburized layer was not formed, the toughness was insufficient, and the brittle fracture surface was observed. Further, in the experimental example 92, the plating peeling and the unplating occurred.

The experimental example 100 is an example in which the alloying treatment time was long, in which the plating peeling occurred.

The experimental example 108 is an example in which the effective Al amount in the plating bath was small in the plating step, in which the plating peeling occurred.

The experimental example 112 is an example in which the alloying treatment temperature was high, in which the plating peeling and the unplating occurred, and the strength was insufficient.

In the alloyed hot-dip galvanized steel sheet of the experimental example 125, the content of Si was small, the density of oxides dispersed in the decarburized layer became insufficient, and a large amount of iron-based carbides was generated through the alloying treatment, so that the steel sheet was inferior in terms of the toughness and the strength.

In the alloyed hot-dip galvanized steel sheet of the experimental example 128, the density of oxides in the decarburized layer was significantly high, and thus the toughness and the plating adhesiveness of the steel sheet were inferior.

In the alloyed hot-dip galvanized steel sheet of the experimental example 129, a size of oxide in the decarburized layer was significantly large, and thus the toughness of the steel sheet was inferior.

The experimental example 130 is an example in which the hot-rolling completion temperature was low, a flatness of the steel sheet was significantly inferior, and the cold rolling was difficult to be performed, resulting in that the test was stopped.

The alloyed hot-dip galvanized steel sheet of the experimental example 131 is an example in which the hot-rolling completion temperature was high, and the value of the expression 1 was out of the specified range, resulting in that the grain diameter became coarse, and the toughness was deteriorated.

The hot-dip galvanized steel sheet of the experimental example 132 is an example in which the average cooling rate at 740 to 500° C. was small, and the ferrite fraction was increased too much, resulting in that the toughness was deteriorated.

The alloyed hot-dip galvanized steel sheet of the experimental example 133 is an example in which the temperature of the bainite transformation process was low, martensite was generated in the bainite transformation process, and then the tempering was performed at high temperature through the alloying, so that the strength was significantly lowered.

Although the respective embodiments of the present invention have been described in detail, the above-described embodiments merely illustrate concrete examples of implementing the present invention. The technical scope of the present invention is not to be construed in a restrictive manner by these embodiments. That is, the present invention may be implemented in various forms without departing from the technical spirit or main features thereof.

INDUSTRIAL APPLICABILITY

The present invention is an effective technique for a high-strength hot-dip galvanized steel sheet excellent in impact resistance property and a manufacturing method thereof, and a high-strength alloyed hot-dip galvanized steel sheet and a manufacturing method thereof. Further, according to the present invention, it is possible to provide a high-strength hot-dip galvanized steel sheet and a high-strength alloyed hot-dip galvanized steel sheet excellent in impact resistance property at low temperature and capable of obtaining a tensile strength of 900 MPa or more, and manufacturing methods thereof.

The invention claimed is:

1. A manufacturing method of a hot-dip galvanized steel sheet, comprising:
a step of obtaining a base steel sheet, the step comprising:
a hot-rolling step of performing hot rolling in which a slab containing, by mass %,
C: 0.075 to 0.400%,
Si: 0.01 to 2.00%,
Mn: 0.80 to 3.50%,
P: 0.0001 to 0.100%,
S: 0.0001 to 0.0100%,
Al: 0.001 to 2.00%,
O: 0.0001 to 0.0100%,
N: 0.0001 to 0.0100%, and
a balance composed of Fe and inevitable impurities is heated to 1080° C. or more, the hot rolling is completed at a temperature of 850° C. to 950° C., and a rolling reduction in a temperature region of 1050° C. to a hot-rolling completion temperature satisfies the following Expression 1 to obtain a hot-rolled steel sheet;
a cold-rolling step of performing cold rolling at a reduction ratio of 30% to 75% on the hot-rolled steel sheet to obtain a cold-rolled steel sheet; and
an annealing step of performing annealing in which the cold-rolled steel sheet is made to pass through a preheating zone in which heating is performed by using mixed gas whose air ratio being a ratio between a volume of air contained in the mixed gas per unit volume and a volume of air which is theoretically required to cause complete combustion of fuel gas contained in the mixed gas per unit volume in the mixed gas of air and fuel gas used for preheating, is 0.7 to 1.2, to generate an oxide coating film on a surface layer portion, the steel sheet is made to pass through a reduction zone in an atmosphere in which a partial pressure ratio between $H_2O$ and $H_2$, $P(H_2O)/P(H_2)$, is 0.0001 to 2.00 at a maximum heating temperature of Ac3 point—50° C. or more to reduce the oxide coating film to form a decarburized layer, and bending with a bending radius of 800 mm or less is performed one time or more while applying a tension of 3 to 100 MPa, while performing cooling in a temperature region of 740° C. to 500° C. at an average cooling rate of 1.0° C./s or more; and
a plating step of making the base steel sheet to be immersed in a plating bath in which an effective Al amount is 0.01 to 0.18 mass % to form a hot-dip galvanized layer on a surface of the base steel sheet to produce a hot-dip galvanized steel sheet:

Expression 1

$$0.10 \leq \left\{ \sum_{i=1}^{N} \left( \begin{array}{c} 5.20 \times 10^{-6} \cdot T_i^3 - 1.06 \times 10^{-2} \cdot T_i^2 + \\ 1.68 \times 10 \cdot T_i - 5.67 \times 10^3 \end{array} \right)^2 \cdot \\ \left( \frac{h_{i-1}}{h_i} \right)^2 \cdot \exp\left( -\frac{2.20 \times 10^4}{T_i} \right) \cdot t_i \right\}^{0.5} \leq 1.00 \quad (1)$$

wherein in Expression 1, N indicates a total number of passes from a start of the hot rolling to a completion of the hot rolling, i indicates an order of pass, $T_i$ indicates a rolling temperature in ° C. at i-th pass, $h_i$ indicates a sheet thickness after processing in mm at the i-th pass, and $t_i$ indicates an elapsed time from the i-th pass to a next pass; wherein when i equals to 1, h0 equals to a slab thickness; and wherein an elapsed time from a final pass to a next pass is set to an elapsed time from the final pass to a point of time at which cooling is started after the completion of hot rolling;
wherein the base steel sheet has a steel sheet structure in a range of ⅛ thickness to ⅜ thickness centered around ¼ thickness of a sheet thickness from a surface, in which a volume fraction of a retained austenite phase is 5% or less, and a total volume fraction of a bainite phase, a bainitic ferrite phase, a fresh martensite phase and a tempered martensite phase is 40% or more;
an average effective crystal grain diameter and a maximum effective crystal grain diameter in the range of ⅛ thickness to ⅜ thickness centered around ¼ thickness of the sheet thickness from the surface are 5.0 μm or less and 20 μm or less, respectively; and
the decarburized layer has a thickness of 0.01 μm to 10.0 μm and is formed on a surface layer portion, in which a density of oxides dispersed in the decarburized layer is $1.0 \times 10^{12}$ to $1.0 \times 10^{16}$ oxides/m², and an average grain diameter of the oxides is 500 nm or less.

2. The manufacturing method of the hot-dip galvanized steel sheet according to claim 1, wherein
the slab further contains, by mass %, one or two or more selected from
Ti: 0.001 to 0.150%,
Nb: 0.001 to 0.100%, and
V: 0.001 to 0.300%.

3. The manufacturing method of the hot-dip galvanized steel sheet according to claim 1, wherein
the slab further contains, by mass %, one or two or more selected from
Cr: 0.01 to 2.00%,
Ni: 0.01 to 2.00%,
Cu: 0.01 to 2.00%,
Mo: 0.01 to 2.00%,
B: 0.0001 to 0.0100%, and
W: 0.01 to 2.00%.

4. The manufacturing method of the hot-dip galvanized steel sheet according to claim 1, wherein
the slab further contains 0.0001 to 0.0100% in total of one or two or more selected from Ca, Ce, Mg, Zr, La, and REM.

5. The manufacturing method of the hot-dip galvanized steel sheet according to claim 1, wherein
the plating step is a step of making the base steel sheet of 430 to 490° C. enter and to be immersed in a plating bath of 450 to 470° C.

6. The manufacturing method of the hot-dip galvanized steel sheet according to claim 1, wherein a bainite transformation process of retaining, before and/or after immersing the base steel sheet in the plating bath, the base steel sheet in a temperature range of 300 to 470° C. for 10 to 1000 seconds is performed.

7. A manufacturing method of a alloyed hot-dip galvanized steel sheet, comprising performing alloying treatment of retaining the high-strength hot-dip galvanized steel sheet according to claim 1 in a temperature range of 470 to 620° C. for 2 seconds to 200 seconds.

* * * * *